(12) United States Patent
Wang et al.

(10) Patent No.: US 12,745,250 B2
(45) Date of Patent: Sep. 22, 2026

(54) DEFAULT SPATIAL RELATION FOR PUCCH AND SRS WITH MULTI-TRP

(71) Applicant: Intel Corporation, Santa Clara, CA (US)

(72) Inventors: Guotong Wang, Beijing (CN); Alexei Davydov, Nizhny Novgorod (RU); Bishwarup Mondal, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 857 days.

(21) Appl. No.: 17/919,607

(22) PCT Filed: Jul. 9, 2021

(86) PCT No.: PCT/US2021/041131
§ 371 (c)(1),
(2) Date: Oct. 18, 2022

(87) PCT Pub. No.: WO2022/015595
PCT Pub. Date: Jan. 20, 2022

(65) Prior Publication Data

US 2023/0164786 A1 May 25, 2023

(30) Foreign Application Priority Data

Jul. 17, 2020 (WO) ................ PCT/CN2020/102652
Jul. 17, 2020 (WO) ................ PCT/CN2020/102853

(51) Int. Cl.
*H04W 72/21* (2023.01)
*H04B 7/06* (2006.01)
(Continued)

(52) U.S. Cl.
CPC ........ *H04W 72/21* (2023.01); *H04B 7/06968* (2023.05); *H04L 5/0048* (2013.01); *H04W 72/046* (2013.01)

(58) Field of Classification Search
CPC ............... H04B 7/06968; H04B 7/024; H04W 72/1268; H04W 72/23; H04W 72/21; H04L 5/0048
See application file for complete search history.

(56) References Cited

U.S. PATENT DOCUMENTS 11,564,229 B2 * 1/2023 Jin ........................ H04W 72/53
2019/0280835 A1 9/2019 Määttänen et al.
(Continued)

FOREIGN PATENT DOCUMENTS

WO WO-2020091474 A1 5/2020
WO WO-2022015595 A1 1/2022

OTHER PUBLICATIONS

"Discussion on Multi-beam Operation Enhancements", R1-1911844, 3GPP TSG RAN WG1 #99, Reno, USA, (Nov. 17, 2019).
(Continued)

*Primary Examiner* — Raj Jain
(74) *Attorney, Agent, or Firm* — Schwegman Lundberg & Woessner, P.A.

(57) ABSTRACT

Systems, devices, and methods to enable multi-TRP operation with a single DCI and with multiple DCI are described. A single DCI or multiple DCIs for the TRPs are used for PUCCH transmissions and SRS transmissions. The spatial relations between CORESET reception and PUCCH transmission or between SRS repetition are provided. The association for PUCCH transmission is dependent on whether a single spatial relation is used or multiple spatial relations are
(Continued)

used. The association is a default association, an explicit association, and an implicit association between TRP and CORESET or TCI state.

20 Claims, 40 Drawing Sheets

(51) Int. Cl.
*H04L 5/00* (2006.01)
*H04W 72/044* (2023.01)

(56) References Cited

U.S. PATENT DOCUMENTS

2020/0120656 A1 4/2020 Zhou et al.
2023/0164786 A1* 5/2023 Wang .................... H04L 5/0023 370/329
2023/0239114 A1* 7/2023 Kim ........................ H04L 5/005 370/329
2023/0262696 A1* 8/2023 Chen ..................... H04L 5/0023 370/329
2023/0379108 A1* 11/2023 Grossmann ........... H04L 5/0048
2025/0119914 A1* 4/2025 Yuan ..................... H04L 5/0023

OTHER PUBLICATIONS

"Enhancements to multi-beam operation", R1-1901164, 3GPP TSG RAN WG1 Ad-Hoc Meeting 1901, Taipei, Taiwan,, (Jan. 11, 2019), 13 pgs.
"International Application Serial No. PCT/US2021/041131, International Search Report mailed Nov. 4, 2021", 3 pgs.
"International Application Serial No. PCT/US2021/041131, Written Opinion mailed Nov. 4, 2021", 4 pgs.
"Japanese Application Serial No. 2022-562404, Notification of Reasons for Refusal mailed Jul. 1, 2025", w/ English Translation, 5 pgs.
Moderator (LG Electronics), "FL summary#1 on Rel-16 MB1 maintenance", 3GPP TSG RAN WG1 #101-e R1-2003930, (May 19, 2020), 21 pgs.
OPPO, "Text proposals for enhancements on Multi-TRP and panel Transmission", 3GPP TSG RAN WG1 #101-e R1-2004047, (May 15, 2020), 15 pgs.

* cited by examiner

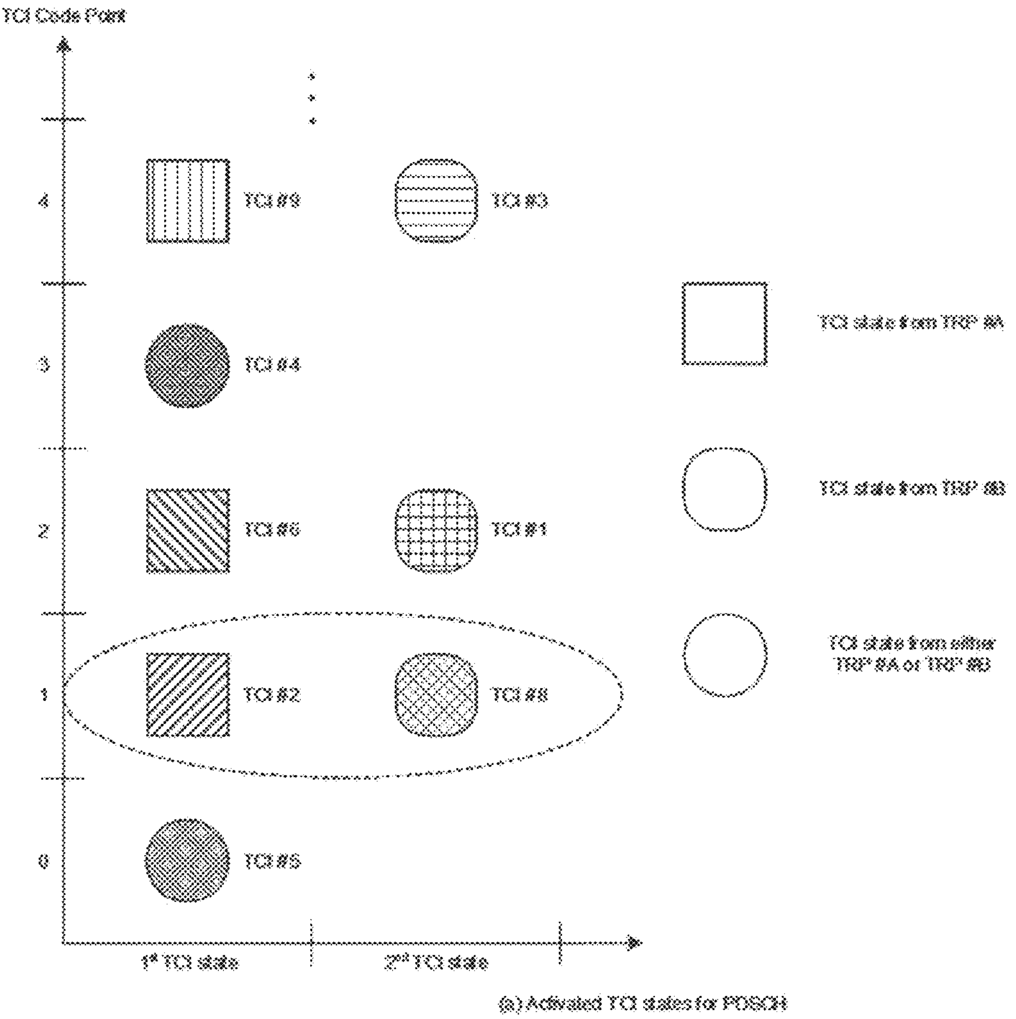
(a) Activated TCI states for PDSCH
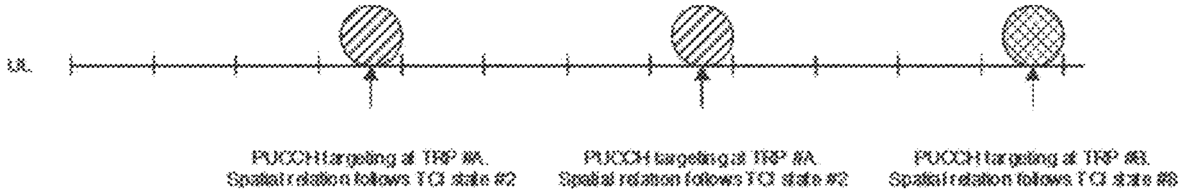
(b) Default spatial relation for PUCCH
FIG. 12

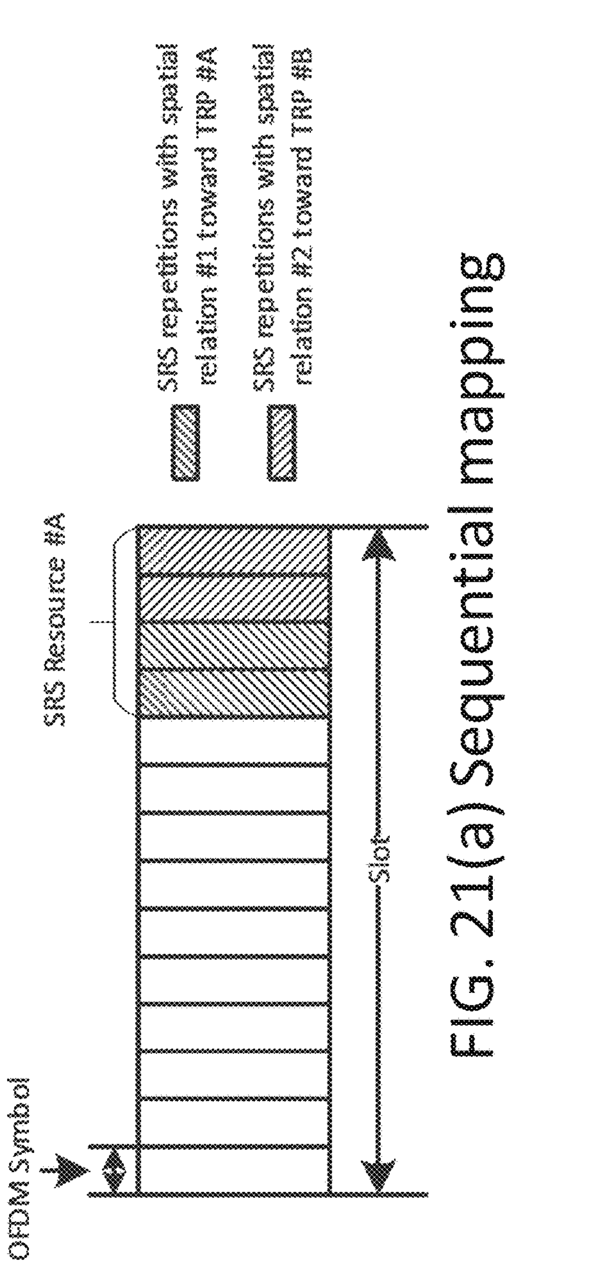
FIG. 21(a) Sequential mapping
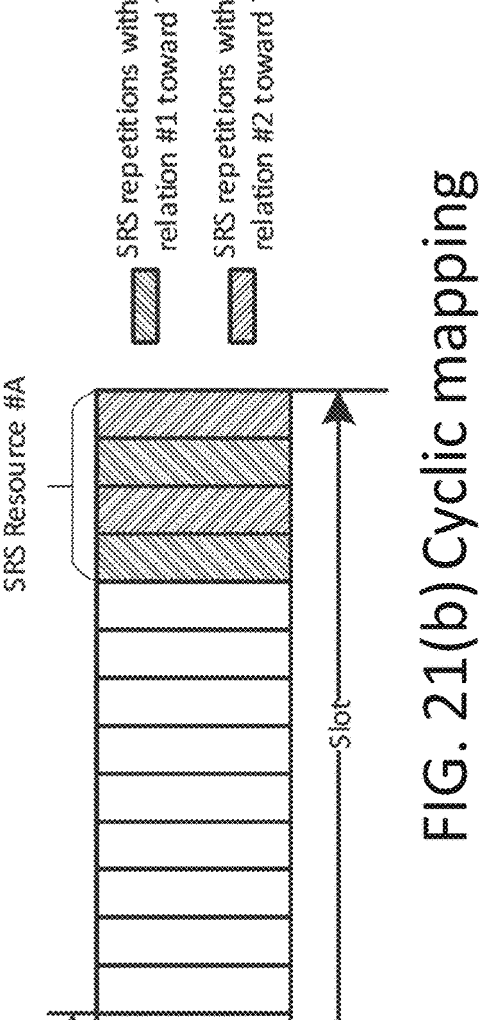
FIG. 21(b) Cyclic mapping

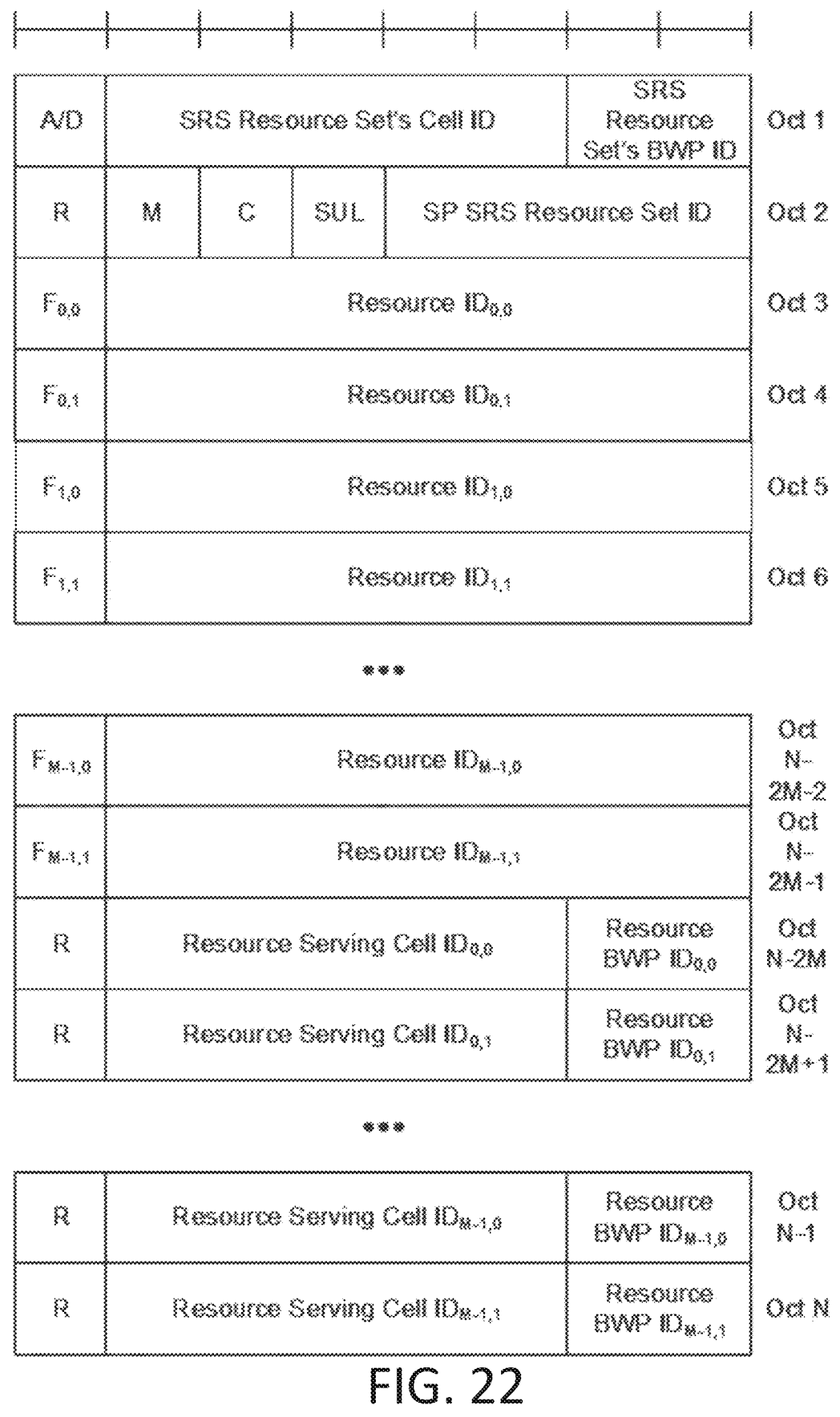

| | | | | | |
|---|---|---|---|---|---|
| A/D | SRS Resource Set's Cell ID | | | SRS Resource Set's BWP ID | Oct 1 |
| R | M | C | SUL | SP SRS Resource Set ID | Oct 2 |
| $F_{0,0}$ | Resource $ID_{0,0}$ | | | | Oct 3 |
| $F_{0,1}$ | Resource $ID_{0,1}$ | | | | Oct 4 |
| $F_{1,0}$ | Resource $ID_{1,0}$ | | | | Oct 5 |
| $F_{1,1}$ | Resource $ID_{1,1}$ | | | | Oct 6 |

•••

| | | | |
|---|---|---|---|
| $F_{M-1,0}$ | Resource $ID_{M-1,0}$ | | Oct N-2M-2 |
| $F_{M-1,1}$ | Resource $ID_{M-1,1}$ | | Oct N-2M-1 |
| R | Resource Serving Cell $ID_{0,0}$ | Resource BWP $ID_{0,0}$ | Oct N-2M |
| R | Resource Serving Cell $ID_{0,1}$ | Resource BWP $ID_{0,1}$ | Oct N-2M+1 |

•••

| | | | |
|---|---|---|---|
| R | Resource Serving Cell $ID_{M-1,0}$ | Resource BWP $ID_{M-1,0}$ | Oct N-1 |
| R | Resource Serving Cell $ID_{M-1,1}$ | Resource BWP $ID_{M-1,1}$ | Oct N |

FIG. 22

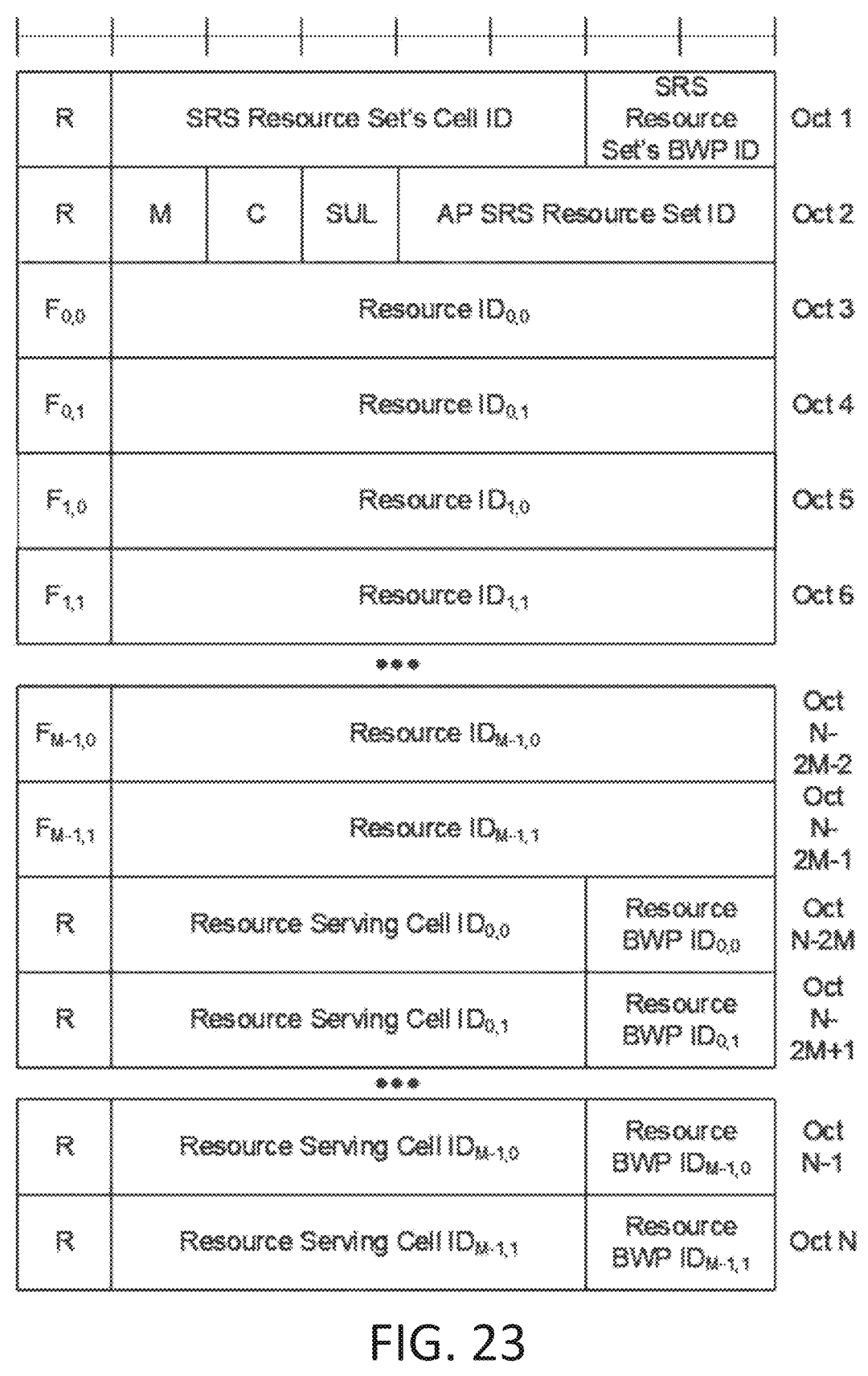

| | | | | | | | | |
|---|---|---|---|---|---|---|---|---|
| R | SRS Resource Set's Cell ID | | | | | | SRS Resource Set's BWP ID | Oct 1 |
| R | M | C | SUL | AP SRS Resource Set ID | | | | Oct 2 |
| $F_{0,0}$ | Resource $ID_{0,0}$ | | | | | | | Oct 3 |
| $F_{0,1}$ | Resource $ID_{0,1}$ | | | | | | | Oct 4 |
| $F_{1,0}$ | Resource $ID_{1,0}$ | | | | | | | Oct 5 |
| $F_{1,1}$ | Resource $ID_{1,1}$ | | | | | | | Oct 6 |
| ••• | | | | | | | | |
| $F_{M-1,0}$ | Resource $ID_{M-1,0}$ | | | | | | | Oct N-2M-2 |
| $F_{M-1,1}$ | Resource $ID_{M-1,1}$ | | | | | | | Oct N-2M-1 |
| R | Resource Serving Cell $ID_{0,0}$ | | | | | | Resource BWP $ID_{0,0}$ | Oct N-2M |
| R | Resource Serving Cell $ID_{0,1}$ | | | | | | Resource BWP $ID_{0,1}$ | Oct N-2M+1 |
| ••• | | | | | | | | |
| R | Resource Serving Cell $ID_{M-1,0}$ | | | | | | Resource BWP $ID_{M-1,0}$ | Oct N-1 |
| R | Resource Serving Cell $ID_{M-1,1}$ | | | | | | Resource BWP $ID_{M-1,1}$ | Oct N |

FIG. 23

DEFAULT SPATIAL RELATION FOR PUCCH AND SRS WITH MULTI-TRP

PRIORITY CLAIM

This application is a U.S. National Stage Filing under 35 U.S.C. 371 from International Application No. PCT/US2021/041131, filed Jul. 9, 2021 and published in English as WO 2022/015595 on Jan. 20, 2022, which claims the benefit of priority to International Application No. PCT/CN2020/102652, filed Jul. 17, 2020, and International Application No. PCT/CN2020/102853, filed Jul. 17, 2020, each of which is incorporated herein by reference in its entirety.

TECHNICAL FIELD

Embodiments pertain to wireless communications in $5^{th}$ generation (5G)/new radio (NR) systems. Some embodiments relate to multi-Transmission/Reception Point (TRP) operation in 5G systems.

BACKGROUND

The use and complexity of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of 5G systems. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 12 illustrates another example of PUCCH default spatial relation with implicit association in accordance with some embodiments.

FIG. 21(*a*) illustrates an example of an SRS with multiple spatial relations with sequential mapping in accordance with some embodiments.

FIG. 21(*b*) illustrates an example of an SRS with multiple spatial relations with cyclical mapping in accordance with some embodiments.

FIG. 22 illustrates an example of a semi-persistent SRS activation/deactivation MAC CE with multiple spatial relations in accordance with some embodiments.

FIG. 23 illustrates an example of an aperiodic SRS spatial relation indication MAC CE in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
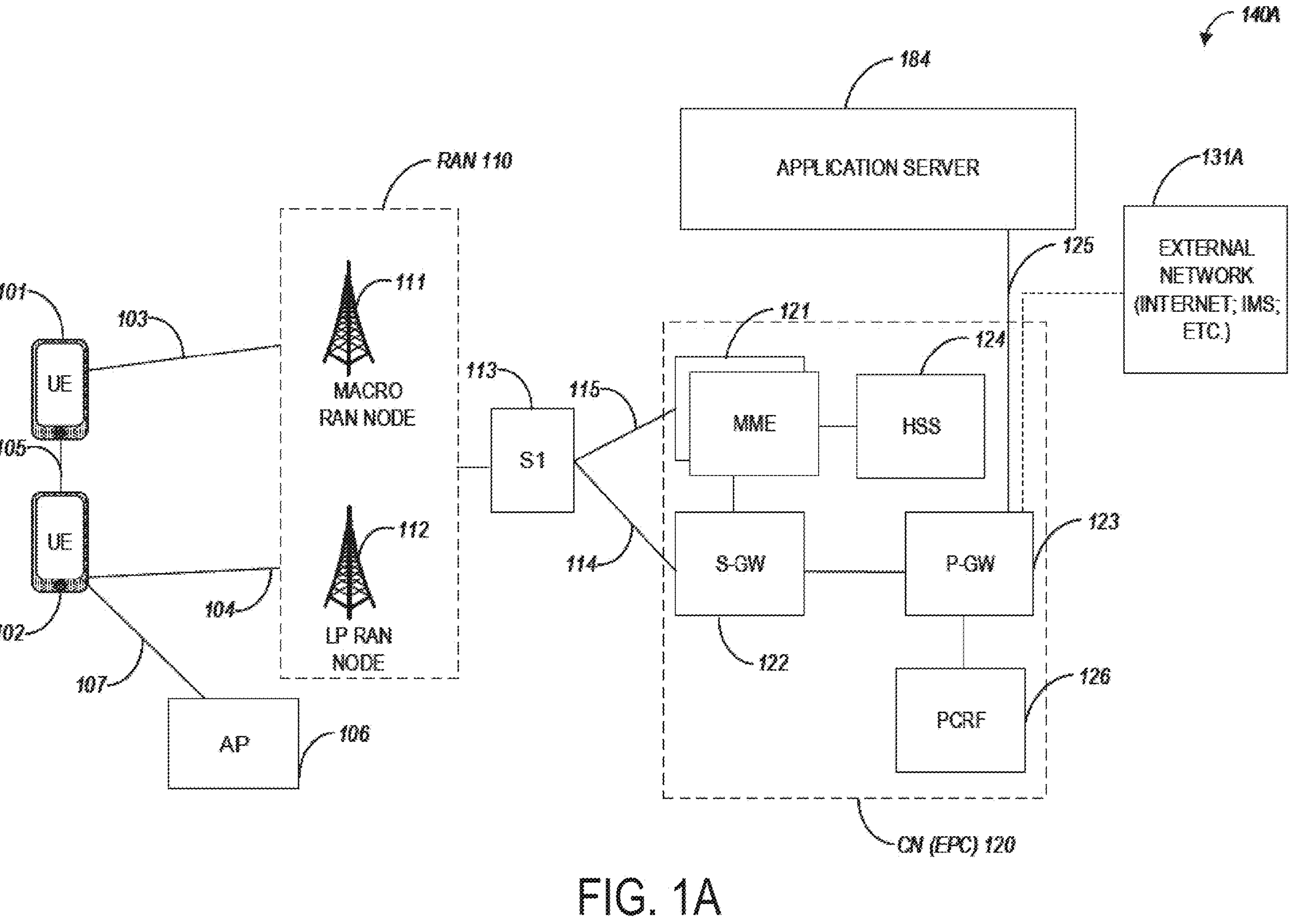
FIG. 1A illustrates an architecture of a network, in accordance with some aspects.

FIG. 1A illustrates an architecture of a network in accordance with some aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
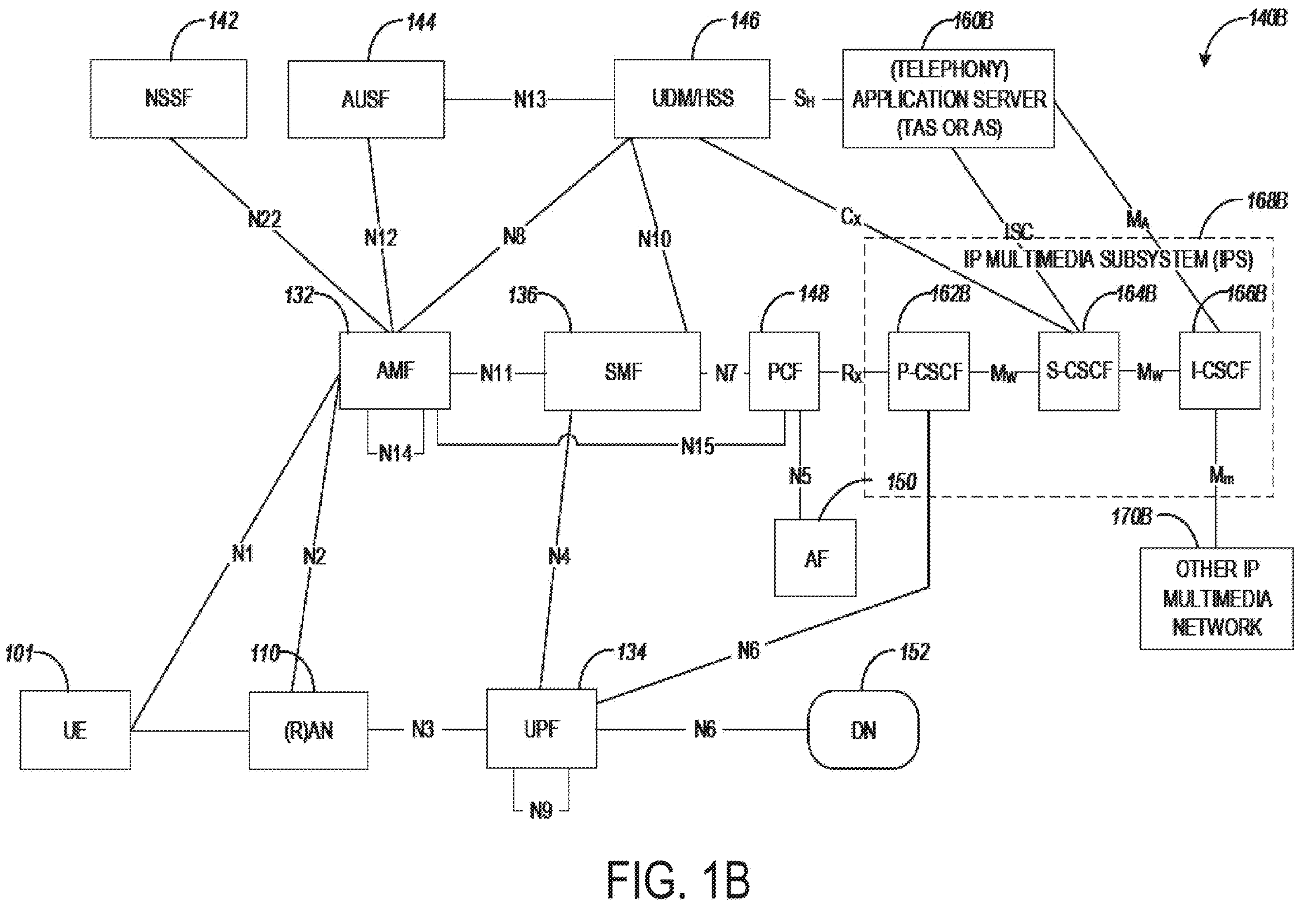
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
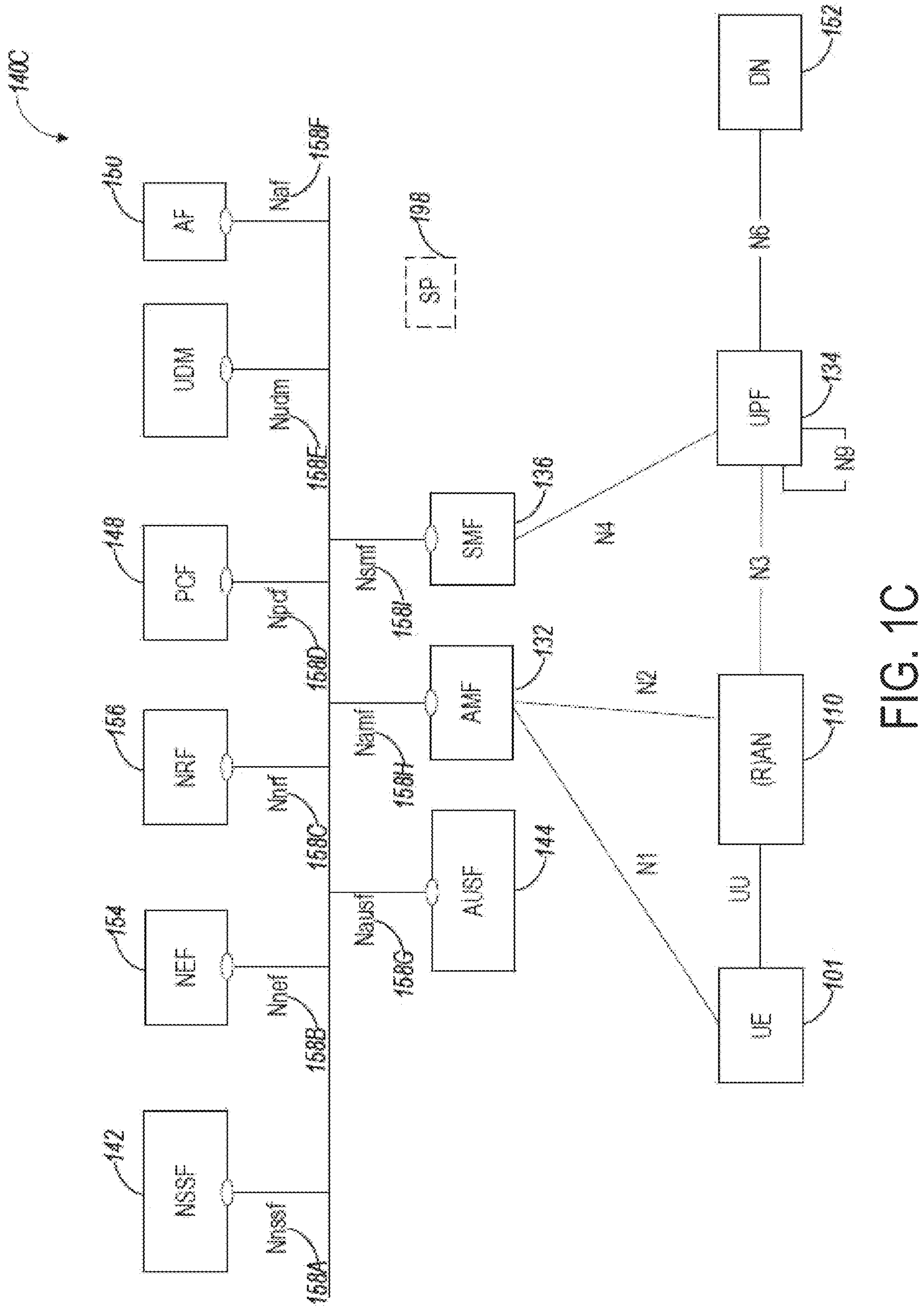
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
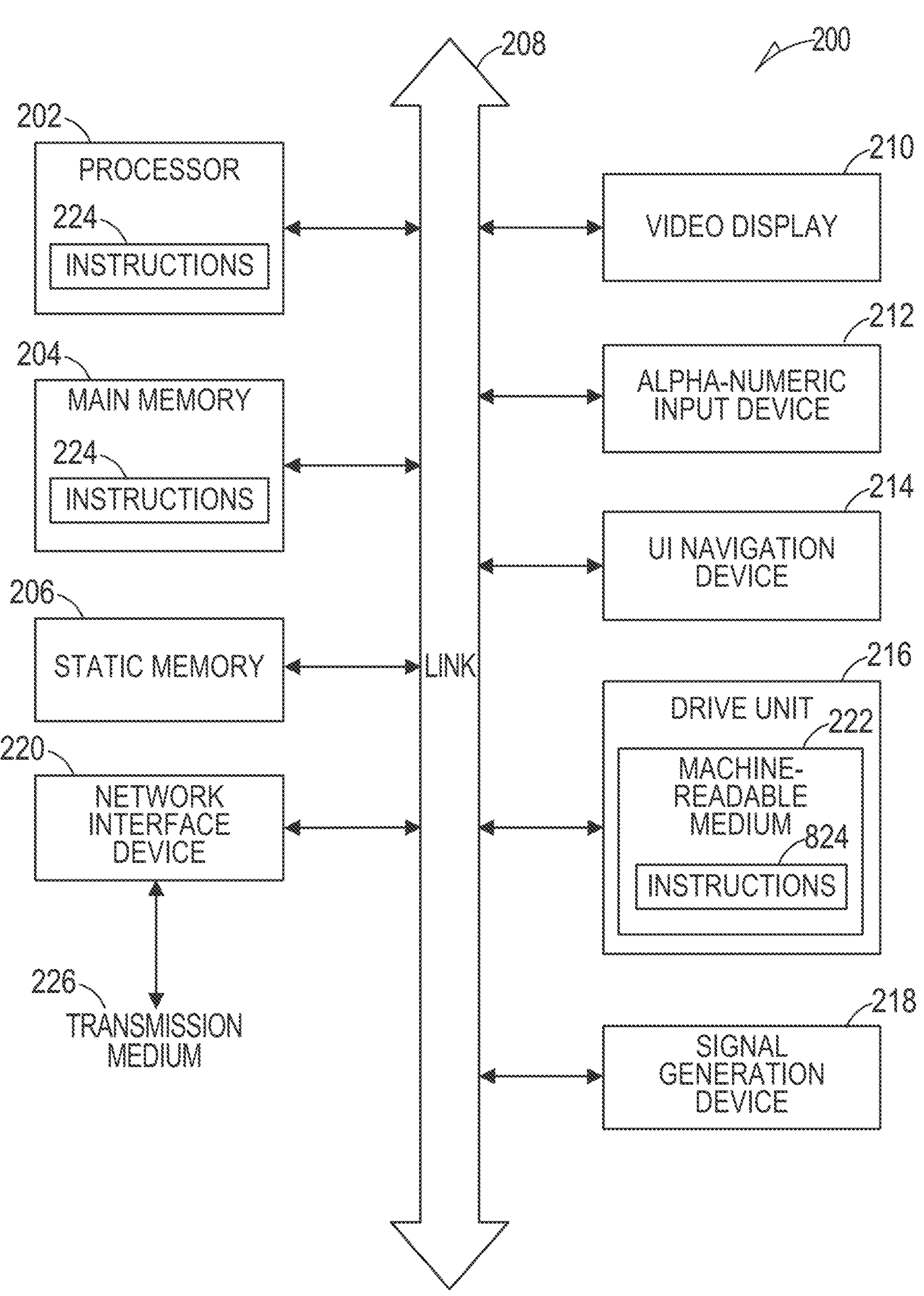
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Figure 3A:
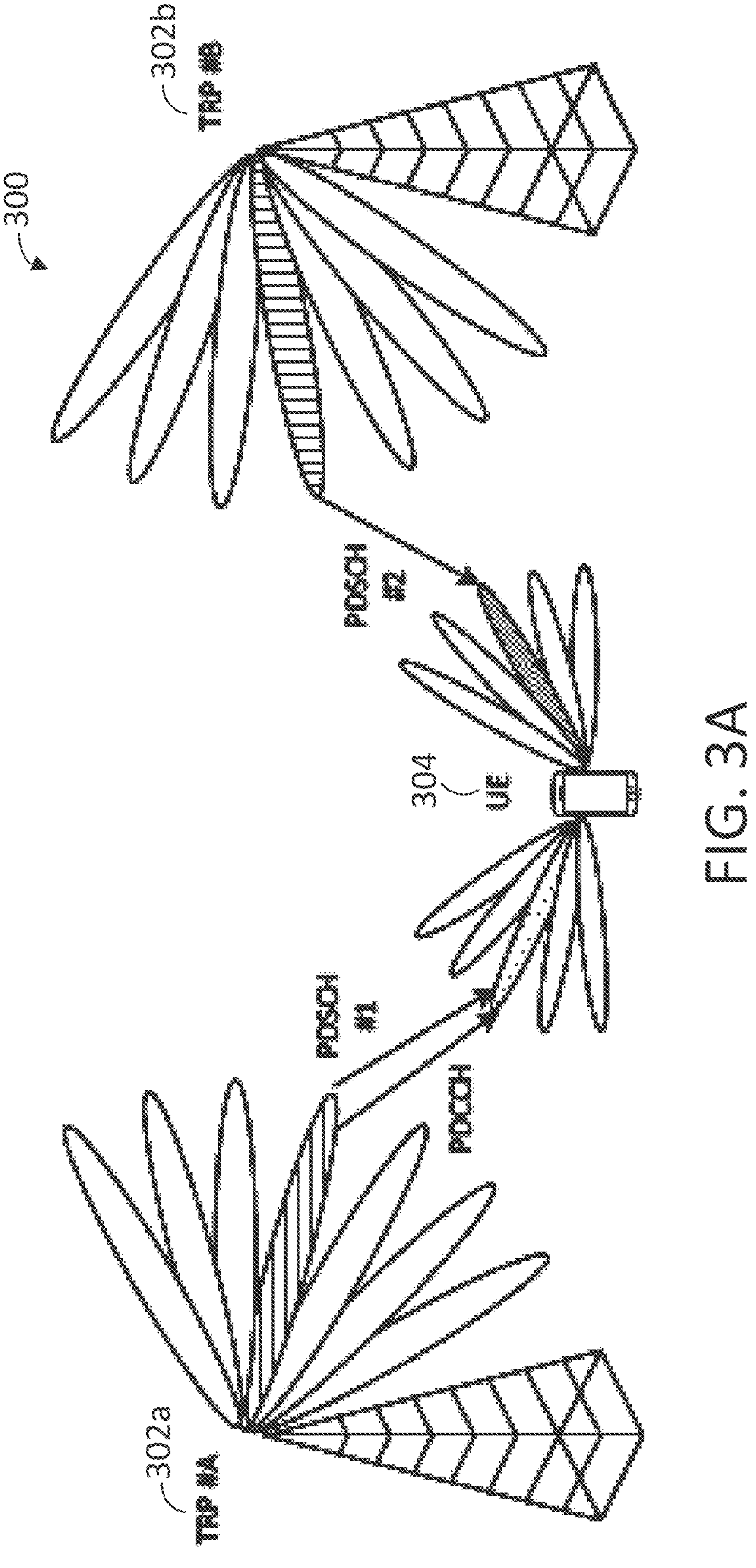
FIG. 3A illustrates single Downlink Control Information (DCI) TRP operation in accordance with some embodiments.
Figure 3B:
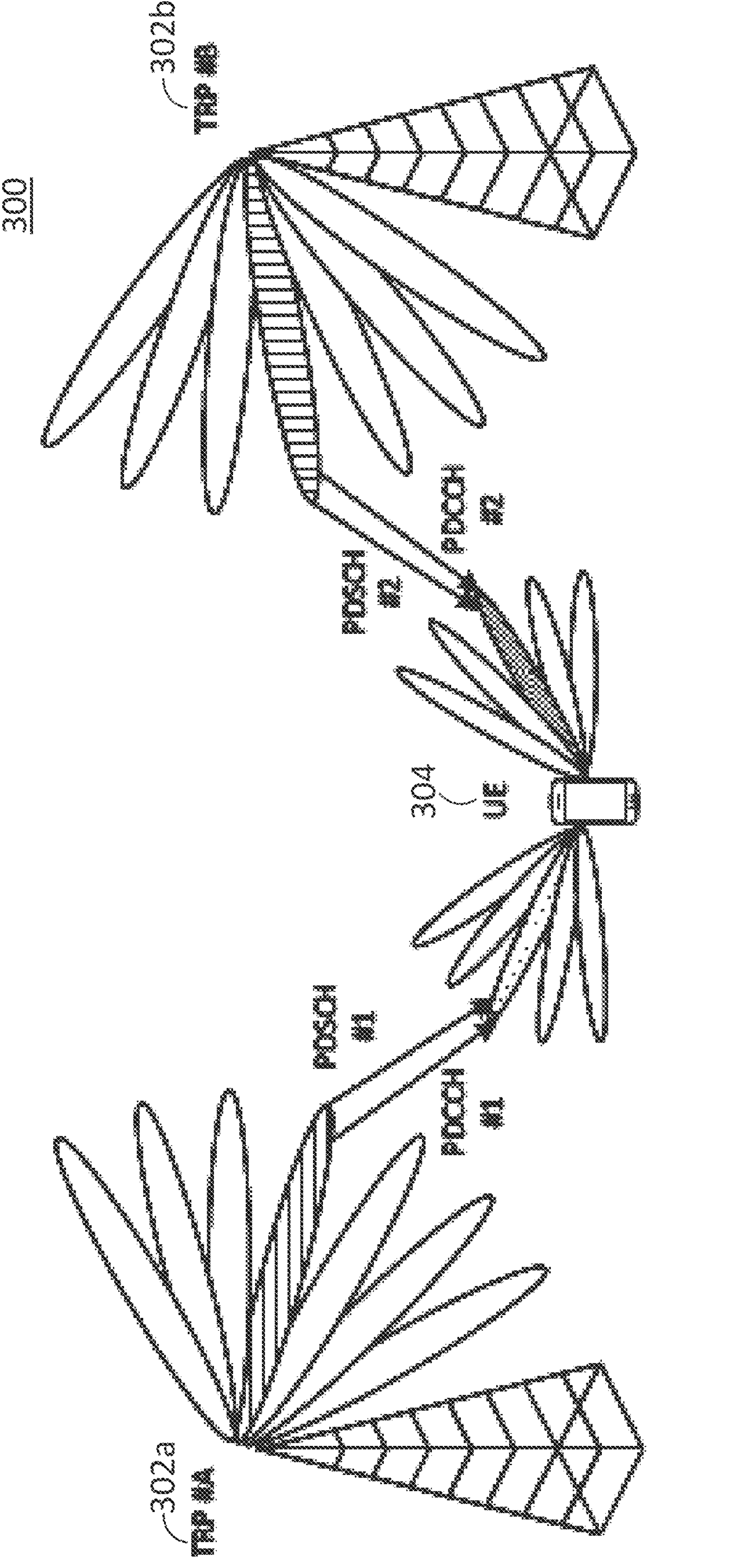
FIG. 3B illustrates multi-DCI TRP operation in accordance with some embodiments.

Multi-TRP operation was introduced in 5G NR Rel-16. In 5G NR Rel-16, multi-TRP operation was used for the physical downlink shared channel (PDSCH). Depending on different backhaul assumptions (ideal backhaul or non-ideal backhaul), multi-TRP operation includes single DCI operation and multi-DCI operation. FIG. 3A illustrates single Downlink Control Information (DCI) TRP operation in accordance with some embodiments. FIG. 3B illustrates multi-DCI TRP operation in accordance with some embodiments. Note that for convenience, only some elements are shown; others may be present. As shown in FIGS. 3A and 3B, the system 300 includes multiple TRPs (TRP #A 302*a*, TRP #B 302*b*) in communication with a UE 304. TRP #A 302*a* and TRP #B 302*b* may each transmit PDSCHs using different beams. One of the PDSCHs from each TRP #A 302*a* and TRP #B 302*b* may be received by UE 304.

Single-DCI operation, such as that shown in FIG. 3A, can be employed with the assumption of the ideal backhaul. With single-DCI operation, a single physical downlink control channel (PDCCH) transmission may schedule the PDSCH transmissions from multiple TRPs. This is shown in FIG. 3A as PDSCH #1 from TRP #A 302*a* scheduling following PDCCH from TRP #A 302*a*. Multi-DCI operation, such as that shown in FIG. 3B, can be employed with the assumption of the non-ideal backhaul. With multi-DCI operation, each TRP may use a single PDCCH to schedule the corresponding PDSCH transmission. This is shown in FIG. 3B as PDSCH #1 from TRP #A 302*a* scheduling PDCCH #1 from TRP #A 302*a* and PDSCH #2 from TRP #B 302*b* scheduling PDCCH #2 from TRP #B 302*b*.

With multi-DCI multi-TRP operation, multiple control resource set (CORESET) pools may be present. Each CORESET is a set of physical resources and a set of parameters that is used to carry the PDCCH/DCI. One CORESET may be configured with a parameter (CORESETPoolIndex, which can differentiate TRPs. For example, the value of 0 for CORESETPoolIndex may correspond to TRP #A, and the value of 1 may correspond to TRP #B.

Figure 4:
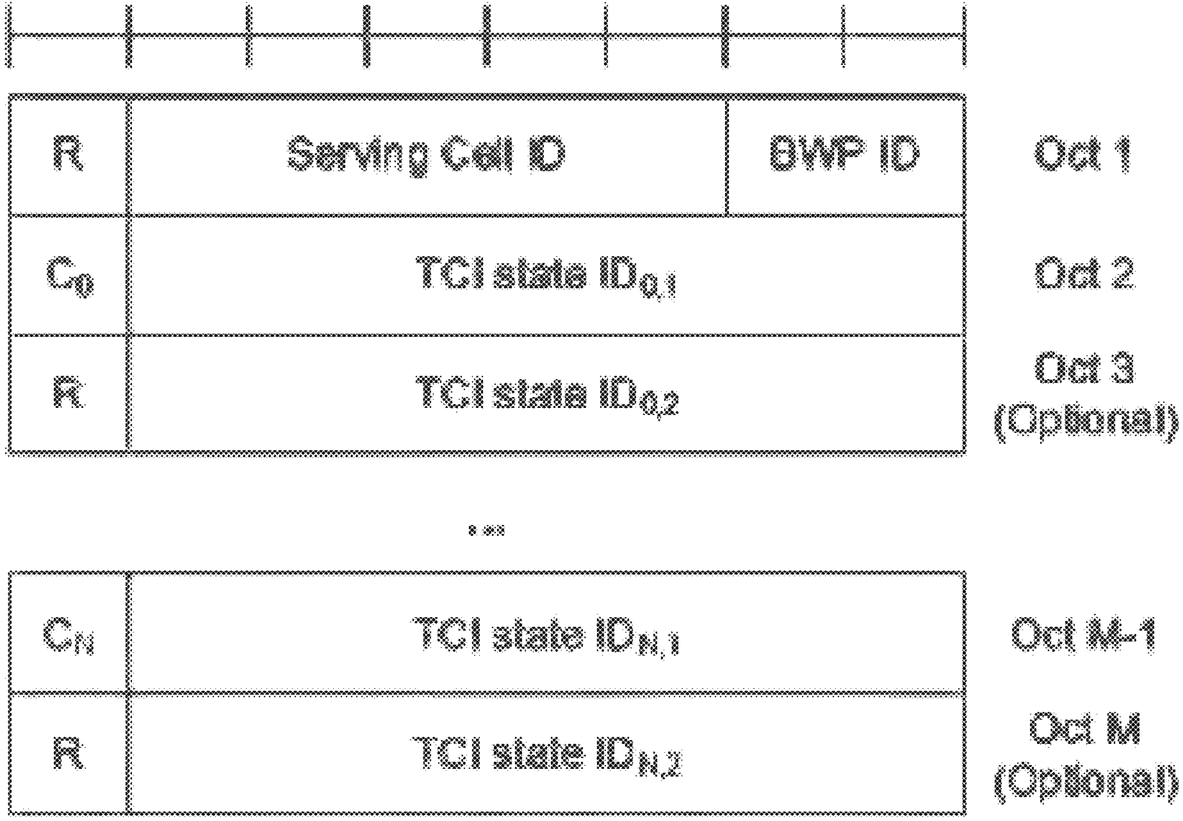
FIG. 4 illustrates a medium access control (MAC) control element (MAC-CE) in accordance with some embodiments.

With single DCI multi-TRP operation, the code point of the Transmission Configuration Indication (TCI) field in the DCI can be associated with one or two TCI states. FIG. 4 shows a MAC-CE in accordance with some embodiments. The MAC-CE may be used configure the TCI code point with multiple TCI states. The fields of the MAC-CE are defined as below:

Serving Cell ID: This field indicates the identity of the Serving Cell for which the MAC CE applies. The length of the field is 5 bits.

Bandwidth Part Indicator (BWP) ID: This field indicates a DL BWP for which the MAC CE applies as the codepoint of the DCI bandwidth part indicator field as specified in TS 38.212. The length of the BWP ID field is 2 bits.

$C_i$: This field indicates whether the octet containing TCI state $ID_{i,2}$ is present. If this field is set to "1", the octet containing TCI state $ID_{i,2}$ is present. If this field is set to "0", the octet containing TCI state $ID_{i,2}$ is not present.

TCI state $ID_{i,j}$: This field indicates the TCI state identified by TCI-StateId as specified in TS 38.331, where i is the index of the codepoint of the DCI Transmission configuration indication field as specified in TS 38.212 and TCI state $ID_{i,j}$ denotes the $j^{th}$ TCI state indicated for the $i^{th}$ codepoint in the DCI Transmission Configuration Indication field. The TCI codepoint to which the TCI States are mapped is determined by its ordinal position among all the TCI codepoints with sets of TCI state $ID_{i,j}$ fields, i.e. the first TCI codepoint with TCI state $ID_{0,1}$ and TCI state $ID_{0,2}$ is mapped to the codepoint value 0, the second TCI codepoint with TCI state $ID_{1,1}$ and TCI state $ID_{1,2}$ is mapped to the codepoint value 1 and so on. The TCI state $ID_{i,2}$ is optional based on the indication of the $C_i$ field. The maximum number of activated TCI codepoint is 8 and the maximum number of TCI states mapped to a TCI codepoint is 2.

R: Reserved bit, set to "0".

Figure 5:
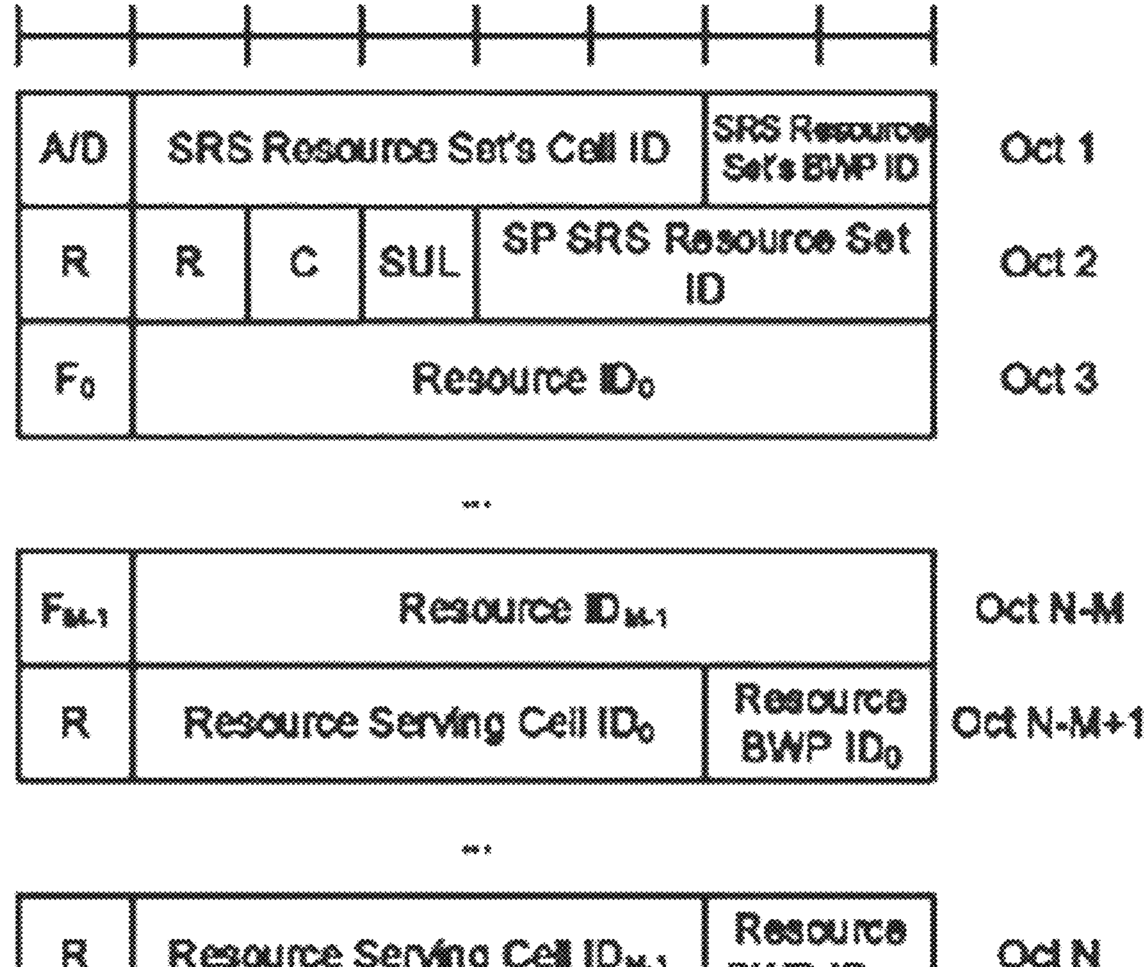
FIG. 5 illustrates a MAC-CE to update spatial relation for semi-persistent sounding reference signals (SRS) in accordance with some embodiments.

In NR Rel-15, the MAC-CE is defined to update the spatial relation for semi-persistent SRS. In Rel-16, another MAC-CE is defined to update the spatial relation for aperiodic SRS. FIG. 5 illustrates a MAC-CE to update spatial relation for semi-persistent SRS in accordance with some embodiments. The MAC-CE in FIG. 5 is for semi-persistent (SP) SRS activation/deactivation. The fields of the MAC-CE in FIG. 5 are defined as below:

A/D: This field indicates whether to activate or deactivate the indicated SP SRS resource set. The field is set to 1 to indicate activation, otherwise it indicates deactivation.

SRS Resource Set's Cell ID: This field indicates the identity of the Serving Cell, which contains activated/deactivated SP SRS Resource Set. If the C field is set to 0, this field also indicates the identity of the Serving Cell which contains all resources indicated by the Resource ID; fields. The length of the field is 5 bits.

SRS Resource Set's BWP ID: This field indicates a UL BWP as the codepoint of the DCI bandwidth part indicator field as specified in TS 38.212, which contains the activated/deactivated SP SRS Resource Set. If the C field is set to 0, this field also indicates the identity of the BWP that contains all resources indicated by the Resource ID; fields. The length of the field is 2 bits.

C: This field indicates whether the octets containing the Resource Serving Cell ID field(s) and Resource BWP ID field(s) are present. If this field is set to 1, the octets containing the Resource Serving Cell ID field(s) and Resource BWP ID field(s) are present, otherwise they are not present.

Supplementary Uplink (SUL): This field indicates whether the MAC CE applies to the normal uplink (NUL) carrier or SUL carrier configuration. This field is set to 1 to indicate that it applies to the SUL carrier configuration, and it is set to 0 to indicate that it applies to the NUL carrier configuration.

SP SRS Resource Set ID: This field indicates the SP SRS Resource Set ID identified by SRS-ResourceSetId as specified in TS 38.331, which is to be activated or deactivated. The length of the field is 4 bits.

$F_i$: This field indicates the type of a resource used as a spatial relationship for SRS resource within SP SRS Resource Set indicated with SP SRS Resource Set ID field. $F_0$ refers to the first SRS resource within the resource set, $F_i$ to the second one and so on. The field is set to 1 to indicate the non-zero power (NZP) Channel Status Information (CSI)-RS resource index is used, and it is set to 0 to indicate either the synchronization signal block (SSB) index or SRS resource index is used. The length of the field is 1 bit. This field is only present if MAC CE is used for activation, i.e. the A/D field is set to 1.

Resource $ID_i$: This field contains an identifier of the resource used for spatial relationship derivation for SRS resource i. Resource $ID_0$ refers to the first SRS resource within the resource set, Resource $ID_1$ to the second one and so on. If $F_i$ is set to 0, and the first bit of this field is set to 1, the remainder of this field contains the SSB-Index as specified in TS 38.331. If $F_i$ is set to 0, and the first bit of this field is set to 0, the remainder of this field contains the SRS-ResourceId as specified in TS 38.331. The length of the field is 7 bits. This field is only present if MAC CE is used for activation, i.e., the A/D field is set to 1.

Resource Serving Cell $ID_i$: This field indicates the identity of the Serving Cell on which the resource used for the spatial relationship derivation where the SRS resource i is located. The length of the field is 5 bits.

Resource BWP $ID_i$: This field indicates a UL BWP as the codepoint of the DCI bandwidth part indicator field as specified in TS 38.212, on which the resource used for the spatial relationship derivation where SRS resource i is located. The length of the field is 2 bits.

R: Reserved bit, set to 0.

Figure 6:
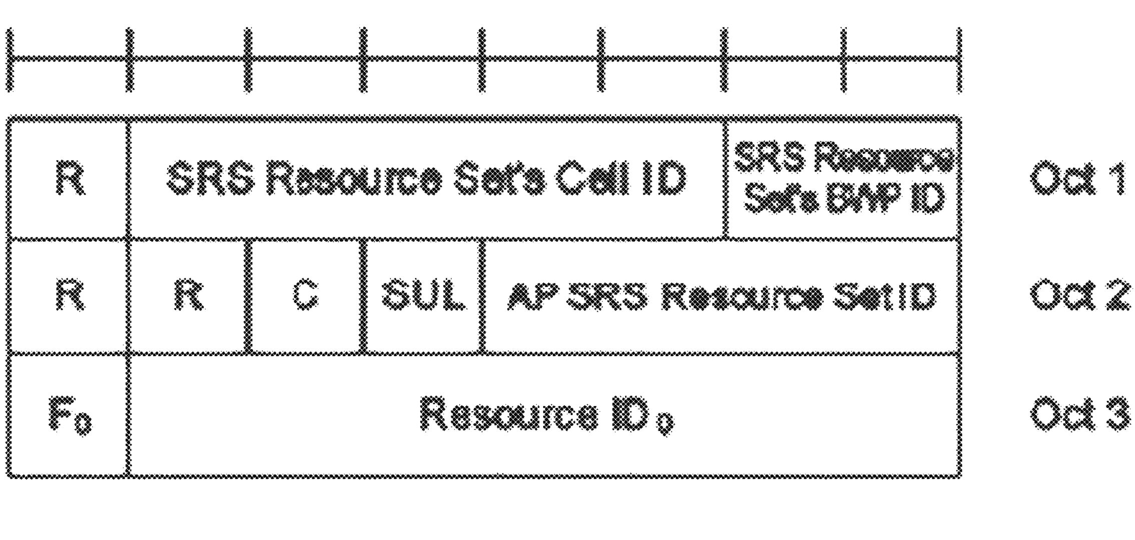
FIG. 6 illustrates a MAC-CE to update spatial relation for aperiodic SRS in accordance with some embodiments.

FIG. 6 illustrates a MAC-CE to update spatial relation for aperiodic SRS in accordance with some embodiments. The fields of the MAC-CE are defined as below:

SRS Resource Set's Cell ID: This field indicates the identity of the Serving Cell, which contains the indicated access point (AP) SRS Resource Set. If the C field is set to 0, this field also indicates the identity of the Serving Cell which contains all resources indicated by the Resource $ID_i$ fields. The length of the field is 5 bits.

SRS Resource Set's BWP ID: This field indicates a UL BWP as the codepoint of the DCI bandwidth part indicator field as specified in TS 38.212, which contains the indicated AP SRS Resource Set. If the C field is set to 0, this field also indicates the identity of the BWP that contains all resources indicated by the Resource $ID_i$ fields. The length of the field is 2 bits.

C: This field indicates whether the octets containing the Resource Serving Cell ID field(s) and Resource BWP ID field(s) are present. If this field is set to 1, the octets containing the Resource Serving Cell ID field(s) and Resource BWP ID field(s) are present, otherwise they are not present.

SUL: This field indicates whether the MAC CE applies to the NUL carrier or SUL carrier configuration. This field is set to 1 to indicate that it applies to the SUL carrier configuration, and it is set to 0 to indicate that it applies to the NUL carrier configuration.

AP SRS Resource Set ID: This field indicates the AP SRS Resource Set ID identified by the SRS-ResourceSetId as specified in TS 38.331. The length of the field is 4 bits.

$F_i$: This field indicates the type of a resource used as a spatial relationship for SRS resource within the AP SRS Resource Set indicated with AP SRS Resource Set ID field. $F_0$ refers to the first SRS resource within the resource set, $F_1$ to the second one and so on. The field is set to 1 to indicate the NZP CSI-RS resource index is used, and it is set to 0 to indicate either the SSB index or SRS resource index is used. The length of the field is 1 bit. This field is only present if MAC CE is used for activation, i.e. the A/D field is set to 1.

Resource $ID_i$: This field contains an identifier of the resource used for spatial relationship derivation for SRS resource i. Resource $ID_0$ refers to the first SRS resource within the resource set, Resource $ID_1$ to the second one and so on. If $F_i$ is set to 0, and the first bit of this field is set to 1, the remainder of this field contains SSB-Index as specified in TS 38.331. If $F_i$ is set to 0, and the first bit of this field is set to 0, the remainder of this field contains the SRS-ResourceId as specified in TS 38.331. The length of the field is 7 bits.

Resource Serving Cell $ID_i$: This field indicates the identity of the Serving Cell on which the resource used for spatial relationship derivation for SRS resource i is located. The length of the field is 5 bits.

Resource BWP $ID_i$: This field indicates a UL BWP as the codepoint of the DCI bandwidth part indicator field as specified in TS 38.212, on which the resource used for spatial relationship derivation for SRS resource i is located. The length of the field is 2 bits.

R: Reserved bit, set to 0.

In NR Rel-16, another MAC-CE is defined to update the spatial relation for PUCCH. The details are found in TS 38.321.

In NR Rel-15, for a PUSCH scheduled by DCI format 0_0, a default spatial relation could be applied. This default spatial relation may be the spatial relation of the PUCCH resource with the lowest resource ID on the component carrier (CC). If the PUCCH resource is not configured on the CC or if the PUCCH resource is configured but without a spatial relation, then the UE is not expected to be scheduled by DCI 0_0.

In NR Rel-16, the default beam operation is defined for SRS, PUCCH, and PUSCH scheduled by DCI 0_0, in order to reduce the overhead. If the default beam is enabled for SRS/PUCCH, then the SRS/PUCCH could be configured without spatial relation information and the MAC-CE to update spatial relation for SRS/PUCCH may not be transmitted so that the overhead of MAC-CE is reduced. If the default beam is enabled for a PUSCH, then the PUSCH could be scheduled by DCI format 0_0 even if the PUCCH resource is not configured on the CC or if the PUCCH resource is configured but without the spatial relation.

If the parameter enableDefaultBeamPlForSRS is set to 'enabled', then the default spatial relation/pathloss reference signal for SRS operation is: the TCI state/QCL assumption of the CORESET with the lowest ID if the CORESET(s) is configured on the CC; or the activated TCI state with the lowest ID for the PDSCH if no CORESET is configured on the CC.

If the parameter enableDefaultBeamPlForPUCCH is set to 'enabled', then the default spatial relation/pathloss reference signal for the PUCCH is: the TCI state/QCL assumption of the CORESET with the lowest ID if the CORESET(s) is configured on the CC.

If the parameter enableDefaultBeamPlForPUSCH0_0 is set to 'enabled', then the default spatial relation/pathloss reference signal for the PUSCH scheduled by DCI 0_0 is: if no PUCCH resource is configured on the active BWP in the CC, the default spatial relation/pathloss reference signal is the TCI state/QCL assumption of the CORESET with the lowest ID; or if the PUCCH resources are configured but without spatial relation, then the default spatial relation/pathloss reference signal may follow the default spatial relation/pathloss reference signal of those PUCCH resources.

However, the existing default spatial relation design for the SRS/PUCCH/PUSCH is applied to a single TRP. In order to support multi-TRP operation, the default spatial relation design is further enhanced as described below for both single DCI and multi-DCI transmission.

Default PUCCH Spatial Relation in Multi-TRP with Single DCI

1. Single Spatial Relation Associated with One PUCCH Resource

In single DCI multi-TRP operations, one PUCCH resource may be associated with only one spatial relation. In order to reduce overhead, the default beam/spatial relation may be applied for PUCCH transmission. The existing parameter, e.g. enableDefaultBeamPlForPUCCH, can be reused to indicate whether a default spatial relation/beam for PUCCH transmission is enabled. If this parameter is enabled, then the spatial relations and pathloss reference signals are not configured for PUCCH transmission. This avoids further MAC-CE transmissions to update spatial relations for the PUCCH transmission and a reduction in overhead.

In single DCI multi-TRP operation, the PUCCH may be associated with one TRP. The association may be defined at the PUCCH resource set level/PUCCH resource group level/PUCCH resource level by a new parameter associatedTRP-PUCCH. Alternatively, the TRP associated with the PUCCH may be configured/updated via the MAC-CE. If the PUCCH resource is indicated by the DCI, the parameter associatedTRP-PUCCH may also be included in the DCI as a new field. In another example, the TRP associated with the PUCCH may be implicitly represented by the PUCCH resource group ID or the PUCCH resource set ID.

The association between the PUCCH and TRP in this section (Section 1) is not limited to default beam operation for the PUCCH—the association may be also applied in other scenarios for PUCCH transmission. The association may be defined at the PUCCH resource set level/PUCCH resource group level/PUCCH resource level or in the PUCCH spatial relation information.

The default spatial relation/default pathloss reference signal for the PUCCH may be determined according to the associated TRP. The association between the PUCCH and TRP, i.e., associatedTRP-PUCCH, may be linked with a TRP, for example, via a TRP ID. The TRP ID may be the logical or physical cell ID, for example. Alternatively, the association between the PUCCH and TRP may be linked with one TRP, for example, through the CORESET, CORESET pool, TCI state, etc. as described in the following sections.

1.1 Spatial Relation Determined Based on Explicit Association Between CORESET and TRP For single DCI multi-TRP operation, the CORESET may also be associated with one TRP. The CORESET pool may also be defined for single DCI multi-TRP operation. The association between the CORESET and TRP may be defined by an RRC parameter, for example, singleDCI-COR ESETPoolIndex. If singleDCI-CORESETPoolIndex is set to 0, the CORESET is sent from TRP #A; if singleDCI-CORESETPoolIndex is set to 1, the CORESET is sent from TRP #B.

For PUCCH transmission, the PUCCH may be associated with a different CORESET pool via associatedTRP-PUCCH. If associatedTRP-PUCCH is set to 0, then the PUCCH is associated with CORESET pool index #0, i.e. TRP #A; if it is set to 1, then the PUCCH is associated with TRP #B.

In this case, if enableDefaultBeamPlForPUCCH is enabled, and neither the spatial relation nor the pathloss reference signal is configured for the PUCCH, the default spatial relation/pathloss reference signal for PUCCH is applied and may be determined as below:

Alt 1: the default PUCCH spatial relation/pathloss reference signal may follow the TCI/QCL assumption of one CORESET. The default spatial relation/pathloss reference signal of the PUCCH may follow the TCI state/QCL assumption of the lowest indexed CORESET among those CORESETs whose configured singleDCI-CORESETPoolIndex is the same as the CORESET pool associated with the PUCCH, in the latest slot in which one or more CORESETs whose configured singleDCI-CORESETPoolIndex is the same as the CORESET pool associated with the PUCCH are monitored by the UE. The 'latest slot' is prior to the PUCCH transmission. The associated CORESET pool with the PUCCH is indicated by associatedTRP-PUCCH, or the associated CORESET pool is the same as the scheduling CORESET if the PUCCH is indicated by the DCI.

For a PUCCH indicated by the DCI, the default spatial relation/pathloss reference signal may alternatively follow the TCI state/QCL assumption of the scheduling CORESET.

This association may be also applied to the case of dynamic switching between single TRP and multi-TRP operation.

Figure 7:
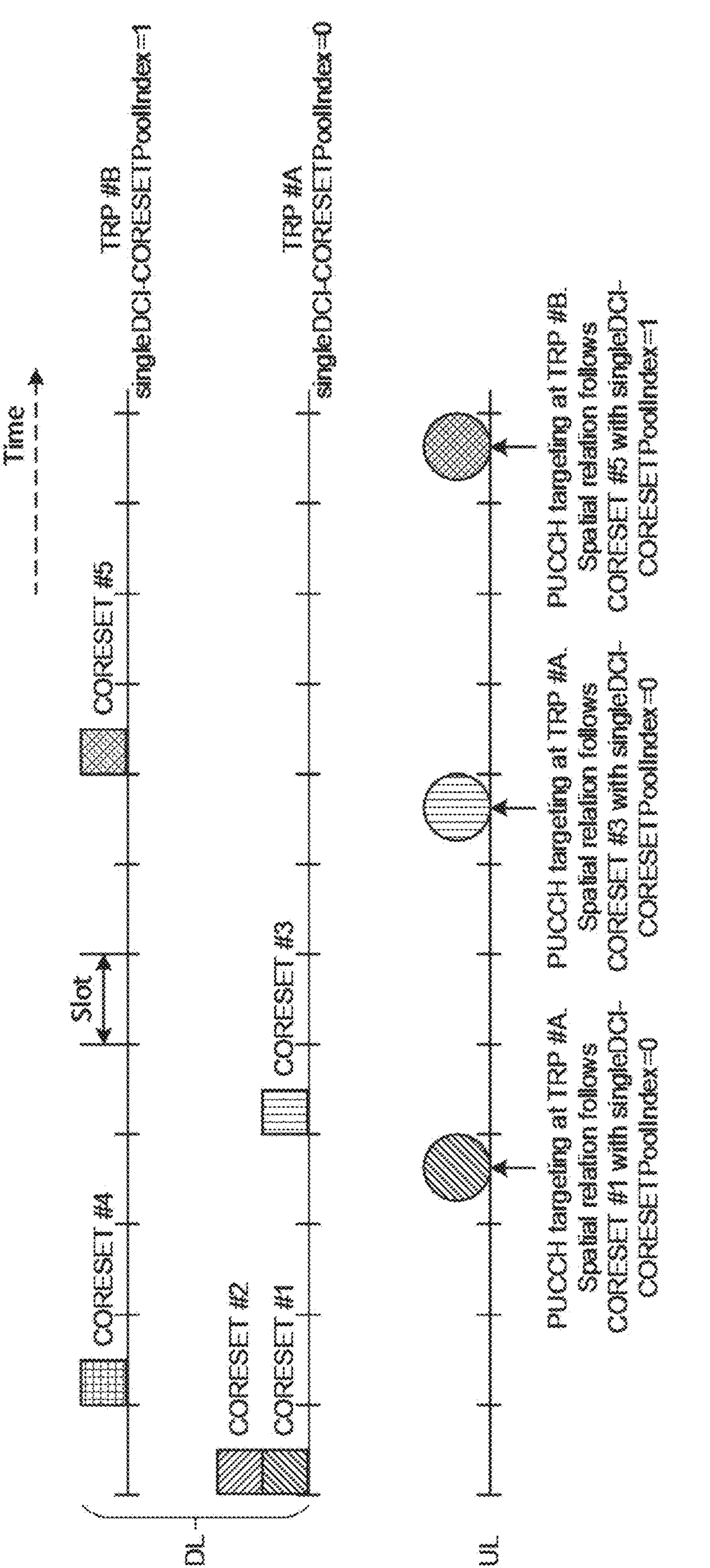
FIG. 7 illustrates a default spatial relation determination for a physical uplink control channel (PUCCH) in accordance with some embodiments.

FIG. 7 illustrates a default spatial relation determination for a PUCCH in accordance with some embodiments. In this case, the CORESET in a single DCI is associated with a TRP.

1.2 Spatial Relation Determined Based on Explicit Association Between CORESET (Multi-TCI States) and TRP For single DCI multi-TRP operation, if the CORESET is configured with multiple activated TCI states, then the TCI state of the CORESET is associated with one TRP. The TCI state may be associated with one TRP, for example, via a TRP ID, which, as above, may be the logical or physical cell ID. Alternatively, the CORESET pool may be defined, one CORESET pool may represent one TRP, and the association may be defined between the TCI state and the CORESET pool. In this case, a parameter associatedTRP-TCI may be introduced into TCI-State. Alternatively, the association between the TCI state and TRP may be configured/updated via a MAC-CE. In another alternative, the order of the TCI states of one CORESET may implicitly indicate the association between the TCI state and the TRP. For example, if one CORESET is configured with two active TCI states, then the first TCI state is associated with the first TRP, and the second TCI state is associated with the second TRP.

The CORESET may be configured with or without a CORESET pool index. In this case, if enableDefaultBeamPlForPUCCH is enabled, and neither the spatial relation nor the pathloss reference signal is configured for the PUCCH, the default spatial relation/pathloss reference signal for the PUCCH may be applied and determined as below:

Alt 1: the default PUCCH spatial relation/pathloss reference signal may follow one TCI/QCL assumption of one CORESET. The default spatial relation/pathloss reference signal of the PUCCH may follow the TCI state/QCL assumption, which is associated with the same TRP with the PUCCH, of the lowest indexed CORESET among those CORESETs that have at least one activated TCI state and the TCI state is associated with the same TRP as the PUCCH (explicitly via the associatedTRP-TCI of the TCI state, or implicitly via the order of the TCI state), in the latest slot in which one or more such CORESETs are monitored by the UE. The 'latest slot' is prior to the PUCCH transmission.

The associated TRP with PUCCH may be indicated by associatedTRP-PUCCH. Alternatively, the associated CORESET pool may be the same as the scheduling CORESET if the PUCCH is indicated by a DCI. For a PUCCH indicated by a DCI, the default spatial relation/pathloss reference signal may alternatively follow the TCI state/QCL assumption, which is associated with the same TRP with the PUCCH, of the scheduling CORESET.

Alt 2: the default PUCCH spatial relation/pathloss reference signal may follow one TCI state. The default spatial relation/pathloss reference signal of the PUCCH may follow the TCI state/QCL assumption with the lowest TCI state ID among those TCI states of the CORESETs, in which the TCI states are associated with the same TRP as the PUCCH (explicitly via the associatedTRP-TCI of the TCI state, or implicitly via the order of the TCI state), in the latest slot in which at least one CORESET, which has at least one TCI state associated with the same TRP as the PUCCH, is monitored by the UE. The 'latest slot' is prior to the PUCCH transmission.

The associated TRP with the PUCCH may be indicated by the associatedTRP-PUCCH. Alternatively, the associated CORESET pool may be the same as the scheduling CORESET if the PUCCH is indicated by a DCI. For a PUCCH indicated by a DCI, the default spatial relation/pathloss reference signal may alternatively follow the TCI state/QCL assumption, which is associated with the same TRP with PUCCH, of the scheduling CORESET.

This may be also applied to the case of dynamic switching between single TRP and multi-TRP operation.

Figure 8:
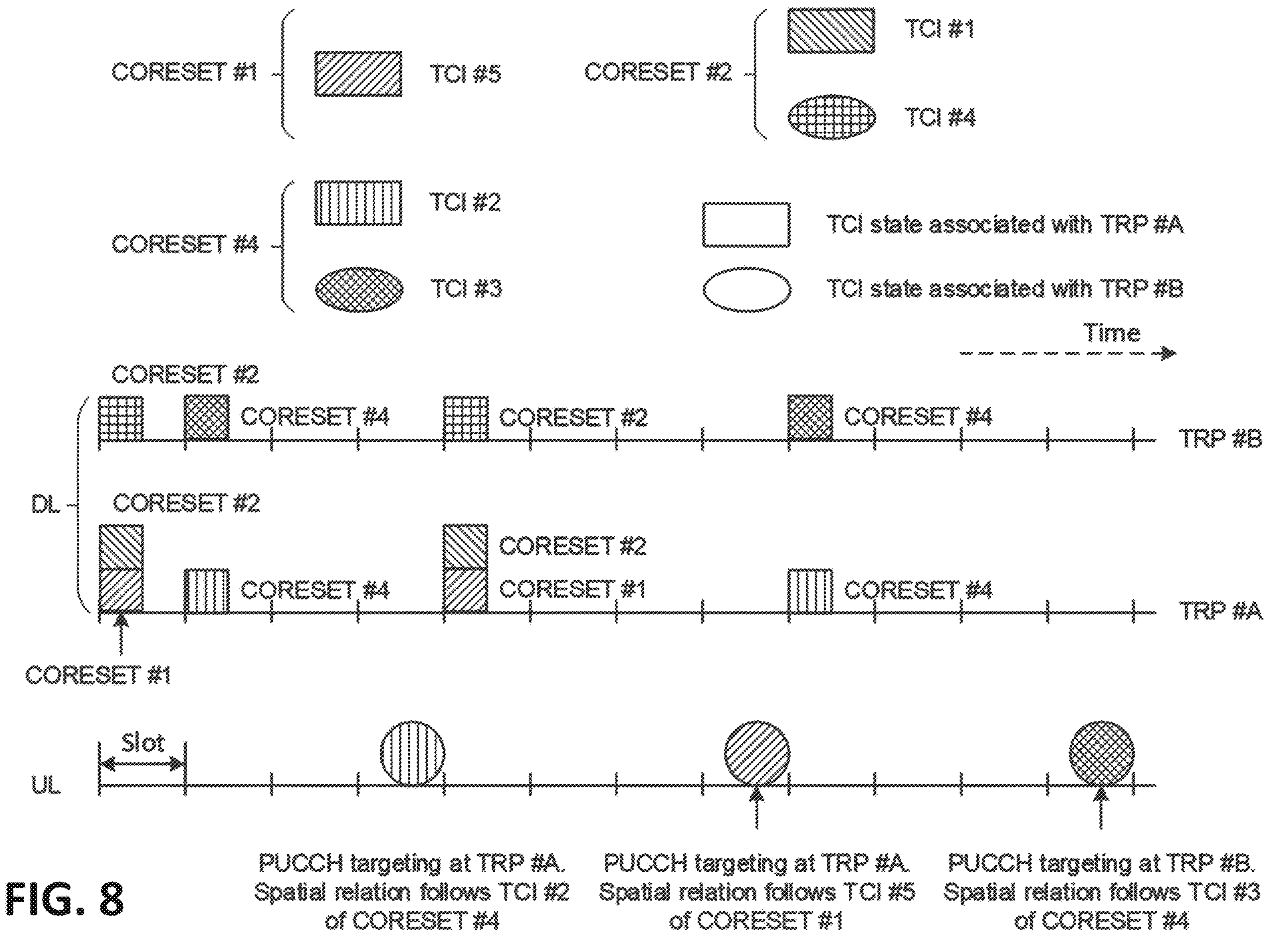
FIG. 8 illustrates a PUCCH default spatial relation based on control resource set (CORESET) Transmission Configuration Indication (TCI) state and TRP in accordance with some embodiments.
Figure 9:
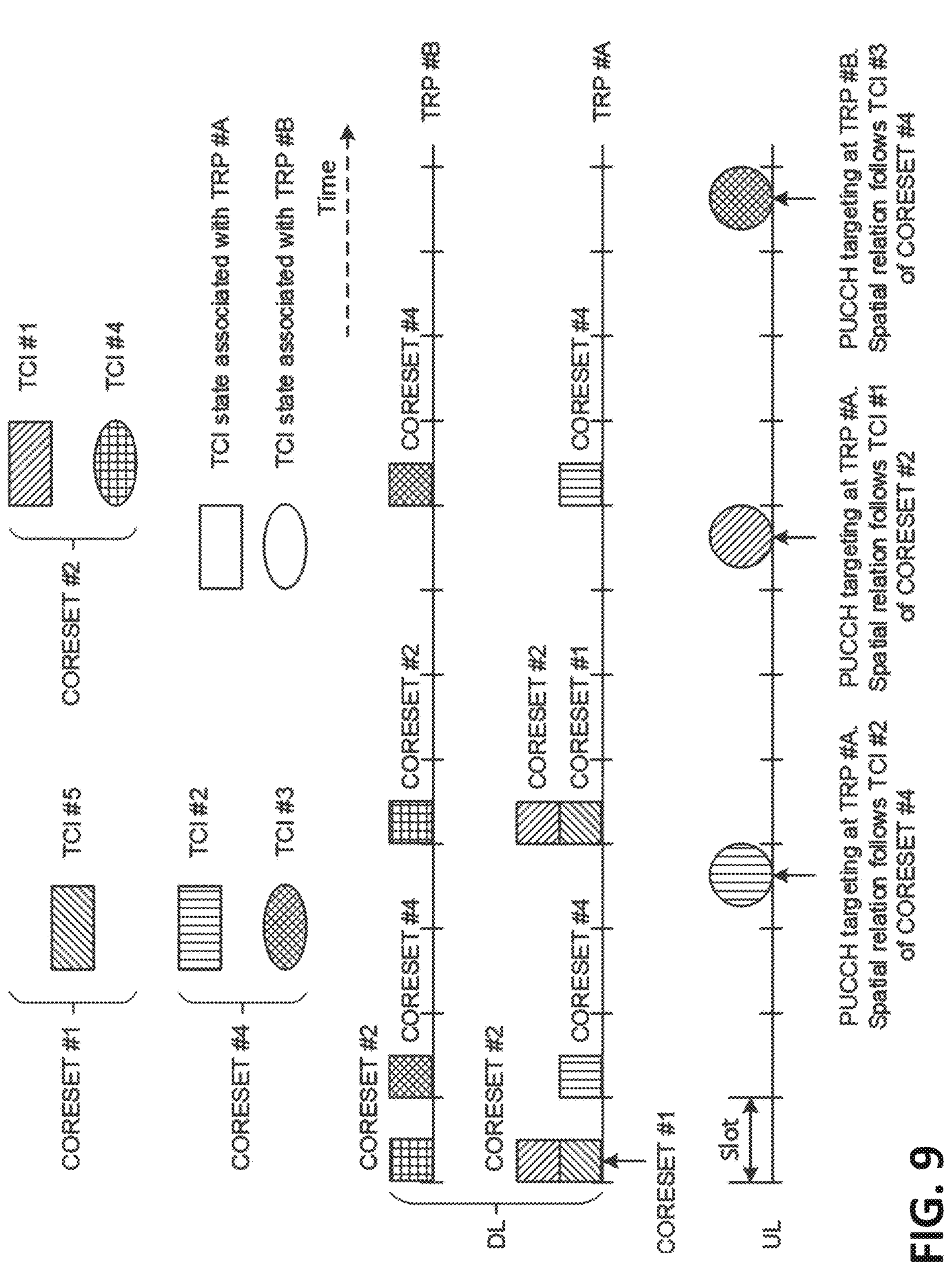
FIG. 9 illustrates another PUCCH default spatial relation based on CORESET TCI state and TRP in accordance with some embodiments.

FIG. 8 illustrates a PUCCH default spatial relation based on CORESET TCI state and TRP in accordance with some embodiments. FIG. 9 illustrates another PUCCH default spatial relation based on CORESET TCI state and TRP in accordance with some embodiments. In particular, FIG. 8 illustrates an example of the operation of Alt 1 and FIG. 9 illustrates an example of the operation of Alt 2.

Figure 10:
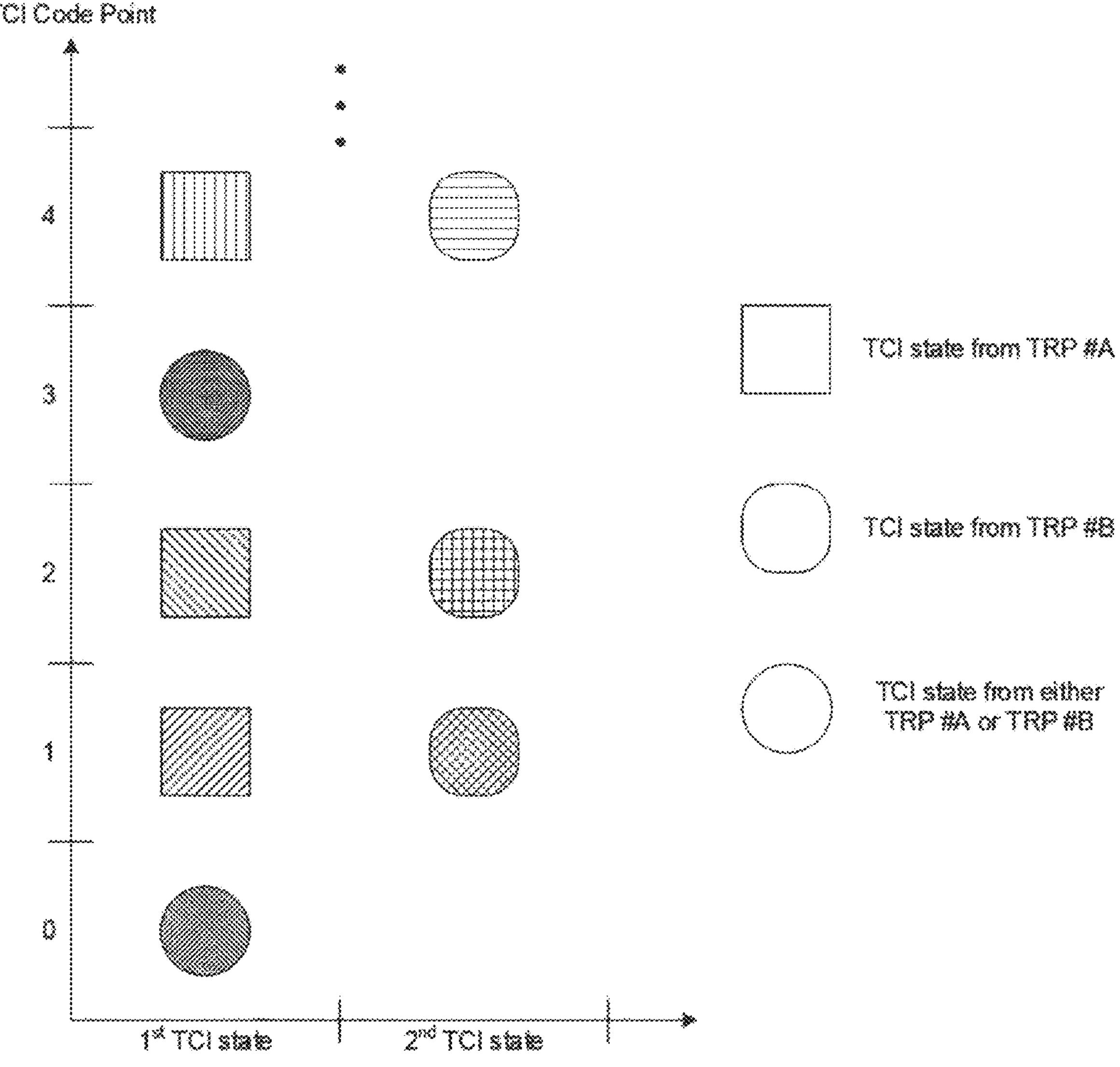
FIG. 10 illustrates an example of association between TRP and TCI state in accordance with some embodiments.

1.3 Spatial Relation Determined Based on Implicit Association Between TCI State and TRP With single DCI multi-TRP operation, for the TCI state of the PDSCH, at least one TCI codepoint includes multiple TCI states. Some restrictions are introduced for the TCI states of the PDSCH. The order of the TCI states may implicitly indicate the association between the TRP and the TCI state. In an example, for those TCI code points that include multiple TCI states, the first TCI states may be associated to the same TRP, and the second TCI states may be associated with another TRP. For example, for TC State $ID_{i,j}$, for all the code points that include multiple TCI states, TCI State $ID_{i,1}$ may be associated with TRP #A, and TCI State $ID_{i,2}$ may be associated with TRP #B. FIG. 10 illustrates an example of association between TRP and TCI state in accordance with some embodiments. In particular, FIG. 10 illustrates an example of implicit association between TCI states and TRP.

For a PUCCH, the association between the TRP and PUCCH may be defined as following: if a parameter associatedTRP-PUCCH is set to 0, the PUCCH is associated with the first TCI state in those TCI codepoints containing multiple TCI states, i.e., TRP #A; if set to 1, the PUCCH is associated with the second TCI state, i.e. TRP #B.

In this case, if enableDefaultBeamPlForPUCCH is enabled, and neither the spatial relation nor the pathloss reference signal is configured for a PUCCH, the default spatial relation/pathloss reference signal for the PUCCH may be applied and determined as below:

Alt 1: the default PUCCH spatial relation/pathloss reference signal dynamically may follow the indicated TCI state. The default spatial relation/pathloss reference signal of the PUCCH may follow one of the indicated TCI states/QCL assumptions for PDSCH reception in the latest slot where the PDSCH reception with multiple TCI states is performed. Whether the first or the second TCI state is followed may be further indicated by the parameter associatedTRP-PUCCH in the RRC or DCI. For a PUCCH indicated by a DCI, the default spatial relation/pathloss reference signal may alternatively follow the TCI state/QCL assumption of the scheduling CORESET.

Alt 2: the default PUCCH spatial relation/pathloss reference signal semi-statically may follow one TCI state indicated by one TCI state codepoint. The default spatial relation/pathloss reference signal of the PUCCH may follow one of the TCI states corresponding to the lowest codepoint among those TCI codepoints containing multiple TCI states that are activated for a PDSCH. Whether the first or the second TCI state is followed is further indicated by the parameter associatedTRP-PUCCH in the RRC or DCI. For a PUCCH indicated by a DCI, the default spatial relation/pathloss reference signal may alternatively follow the TCI state/QCL assumption of the scheduling CORESET.

Figure 11:
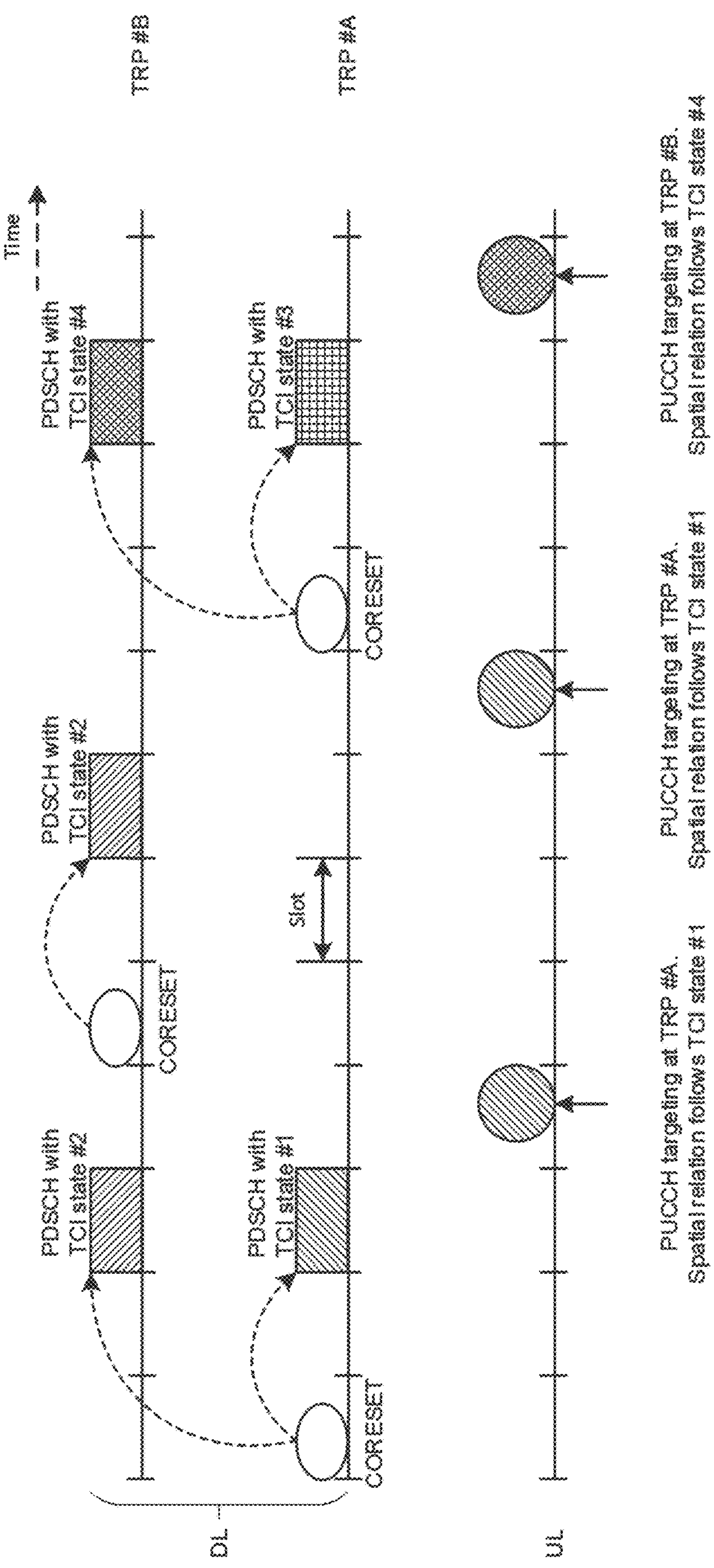
FIG. 11 illustrates an example of PUCCH default spatial relation with implicit association in accordance with some embodiments.

FIG. 11 illustrates an example of PUCCH default spatial relation with implicit association in accordance with some embodiments. FIG. 12 illustrates another example of PUCCH default spatial relation with implicit association in accordance with some embodiments. In particular, FIG. 11 illustrates an example of the above Alt 1 and FIG. 12 illustrates an example of the above Alt 2 for implicit association between the TCI and TRP.

1.4 Spatial relation determined based on explicit association between TCI state and TRP The downlink TCI state may be associated with one TRP. For example, the TCI state may be associated with one TRP, for example, via a TRP ID. Alternatively, a CORESET pool may be defined, one CORESET pool representing one TRP, and the association may be defined between the TCI state and the CORESET pool. A parameter associatedTRP-TC may be introduced into TCI-State. Alternatively, the association between the TCI state and TRP may be configured/updated via a MAC-CE. In another example, the order of the TCI states may implicitly indicate the association between the TRP and the TC state if one codepoint indicates multiple TCI states.

Figure 13:
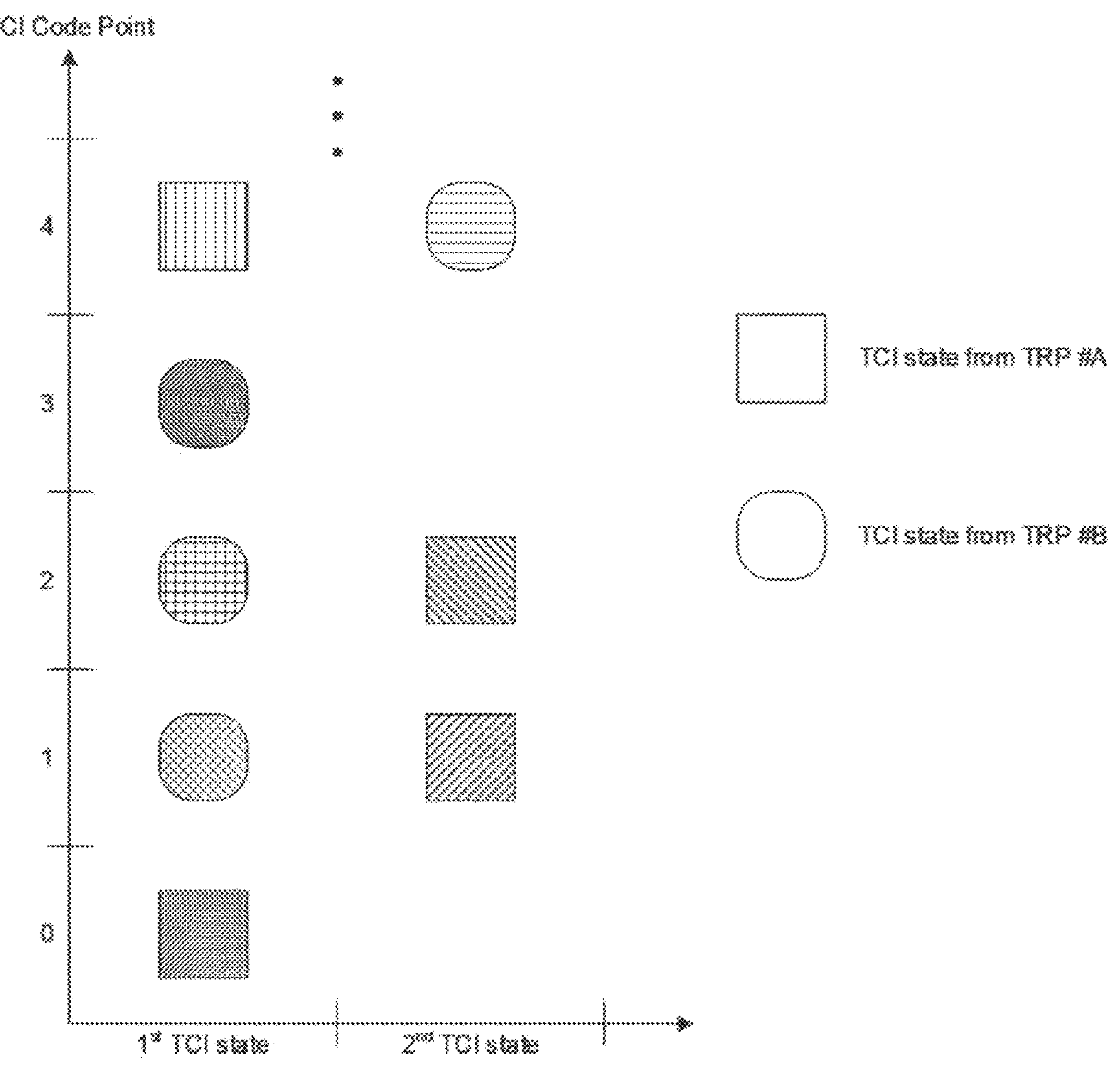
FIG. 13 illustrates an example of PUCCH default spatial relation with explicit association in accordance with some embodiments.

FIG. 13 illustrates an example of PUCCH default spatial relation with explicit association in accordance with some embodiments. FIG. 13 shows an example of explicit association between the TCI state and TRP. In this case, if enableDefaultBeamPlForPUCCH is enabled, and neither the spatial relation nor the pathloss reference signal is configured for the PUCCH, the default spatial relation/pathloss reference signal for the PUCCH is applied and is determined as below:

Alt 1: the default PUCCH spatial relation/pathloss reference signal dynamically may follow the indicated TCI state. The default spatial relation/pathloss reference signal of the PUCCH may follow the indicated TCI state/QCL assumptions for PDSCH reception in the latest slot where the PDSCH reception with one TCI state, whose associatedTRP-TCI has the same value as associatedTRP-PUCCH, is performed. For a PUCCH indicated by a DCI, the default spatial relation/pathloss reference signal may alternatively follow the TCI state/QCL assumption of the scheduling CORESET.

Alt 2: the default PUCCH spatial relation/pathloss reference signal semi-statically may follow one TCI state indicated by one TCI state codepoint. The default spatial relation/pathloss reference signal of the PUCCH may follow the TCI state with the lowest TCI state ID among those TCI states whose associatedTRP-TCI has the same value as associatedTRP-PUCCH. For a PUCCH indicated by a DCI, the default spatial relation/pathloss reference signal may alternatively follow the TCI state/QCL assumption of the scheduling CORESET. In another example, the default spatial relation/pathloss reference signal of the PUCCH may follow one TCI state indicated by the lowest TCI state code point containing multiple TCI states. The TCI state may be associated with the same TRP as the PUCCH.

This may also be applied to the case of dynamic switching between single TRP and multi-TRP operation.

Figure 14:
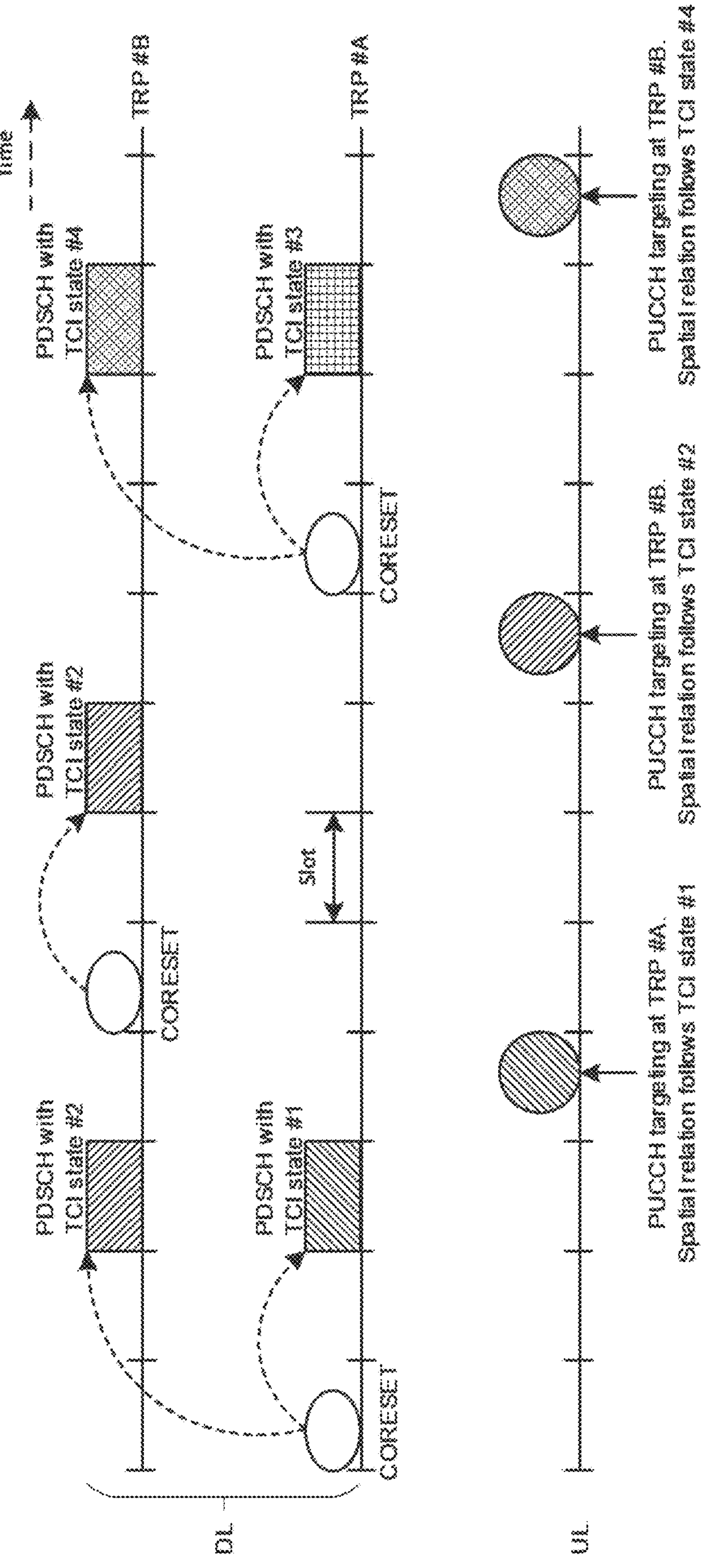
FIG. 14 illustrates another example of PUCCH default spatial relation with explicit association in accordance with some embodiments.
Figure 15:
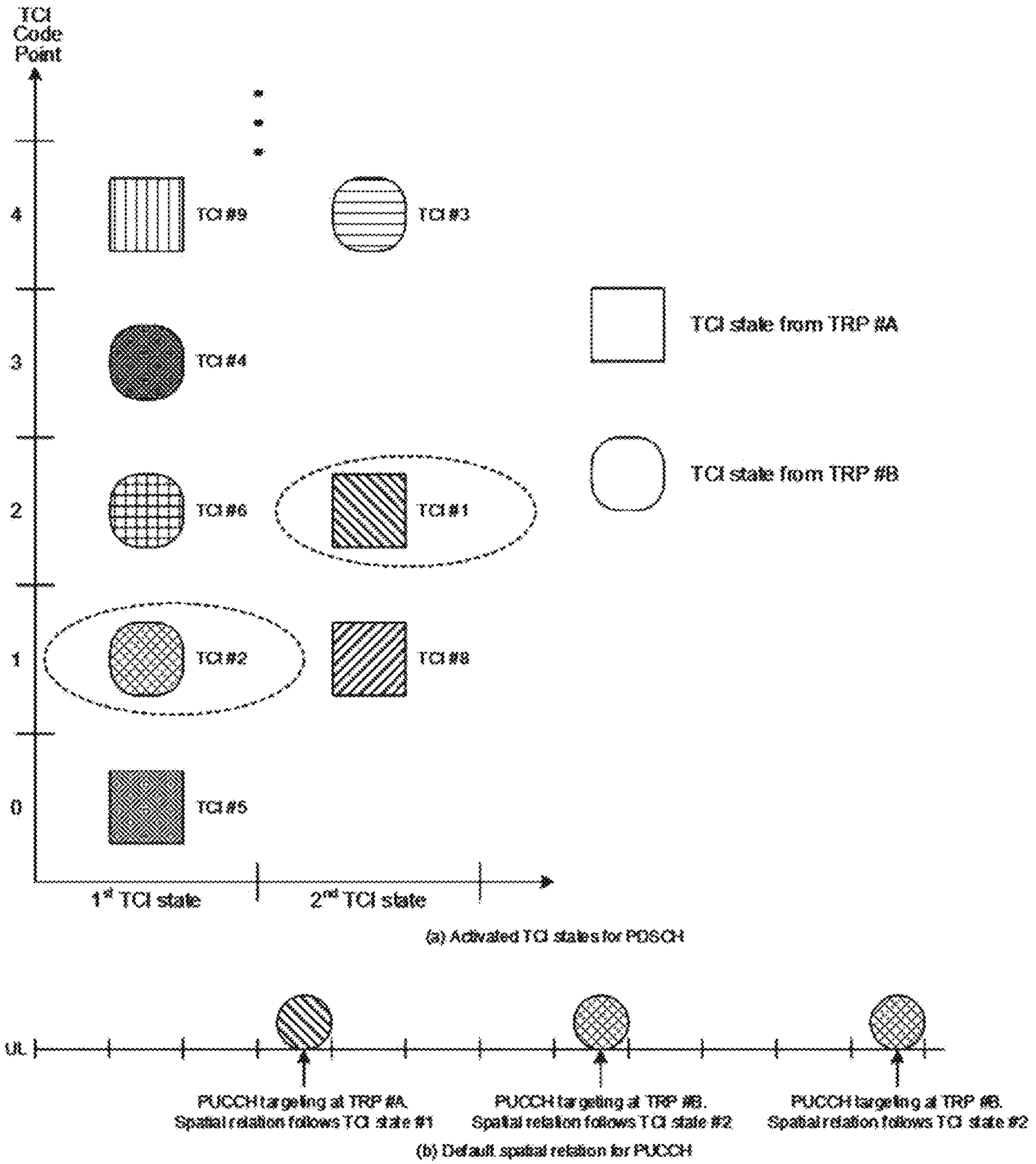
FIG. 15 illustrates another example of PUCCH default spatial relation with explicit association in accordance with some embodiments.

FIG. 14 illustrates another example of PUCCH default spatial relation with explicit association in accordance with some embodiments. FIG. illustrates another example of PUCCH default spatial relation with explicit association in accordance with some embodiments. In particular, FIG. 14 illustrates an example of the above Alt 1 with explicit association between TCI and TRP and FIG. 15 illustrates an example of the above Alt 2 for explicit association between the TCI and TRP.

2. Multiple Spatial Relations Associated One PUCCH Resource

In single DCI multi-TRP operation, if one PUCCH resource is configured with multiple spatial relations, in order to reduce overhead, the default beams/spatial relations may be applied for PUCCH transmission. A new RRC parameter may be introduced, e.g. enableMultipleDefaultBeam-PUCCH, indicating whether multiple default spatial relations/beams for a PUCCH transmission is enabled. If this parameter is enabled, then the spatial relations and pathloss reference signals are not configured for the PUCCH. Alternatively, the spatial relations and pathloss reference signals may be configured, but are instead ignored. In this way, the gNB may avoid further MAC-CE transmissions to update the spatial relations for PUCCH transmission and the overhead may be reduced. The parameter enableMultipleDefaultBeam-PUCCH may be included in UplinkConfig, PUCCH-Config or PUCCH-Resource. If the parameter enableMultipleDefaultBeam-PUCCH is included in UplinkConfig or PUCCH-Config, all the PUCCH resources are enabled with multiple default spatial relations. If the parameter enableMultipleDefaultBeam-PUCCH is included in PUCCH-Resource, this PUCCH resource is enabled with multiple default spatial relations. The parameter enableMultipleDefaultBeam-PUCCH may also be defined at the PUCCH resource set level/PUCCH resource group level.

When multiple spatial relations are associated with one PUCCH resource, the spatial relation may be associated with different TRPs. In an example, the order of the (default) spatial relations may implicitly represent the associated TRP. For example, the first (default) spatial relation is associated with the first TRP, and the second (default) spatial relation is associated with the second TRP. In another example, the PUCCH may be explicitly associated with multiple TRPs via new RRC parameters.

The association between the PUCCH and TRP in this section (Section 2) is not limited to default beam operation for the PUCCH; it may be also applied in other scenarios for PUCCH transmission. The association may be defined at the PUCCH resource set level/PUCCH resource group level/PUCCH resource level or in the PUCCH spatial relation info.

The default spatial relations/default pathloss reference signals for PUCCH may be determined as described in the following sections.

2.1 Spatial Relations Determined Based on Association Between CORESET and TRP

For single DCI multi-TRP operation, the CORESET may also be associated with one TRP. The CORESET pool may also be defined for single DCI multi-TRP operation. The association between the CORESET and TRP may be defined by an RRC parameter, for example, singleDCI-CORESETPoolIndex; if singleDCI-CORESETPoolIndex is set to 0, the CORESET is sent from TRP #A, if singleDCI-CORESETPoolIndex is set to 1, the CORESET is sent from TRP #B.

In this case, if enableMultipleDefaultBeam-PUCCH is enabled, and neither the spatial relation nor the pathloss reference signal is configured for the PUCCH, the default spatial relations/pathloss reference signals for the PUCCH may be applied and determined as below:

Alt 1: the multiple default PUCCH spatial relations/pathloss reference signals independently follow the TCI/QCL assumption of one CORESET. The first default spatial relation/pathloss reference signal of the PUCCH may follow the TCI state/QCL assumption of the lowest indexed CORESET among those CORESETs associated with the first TRP, in the latest slot in which one or more CORESETs associated with the first TRP are monitored by the UE. The second default spatial relation/pathloss reference signal of the PUCCH may follow the TCI state/QCL assumption of the lowest indexed CORESET among those CORESETs associated with the second TRP, in the latest slot in which one or more CORESETs associated with the second TRP are monitored by the UE.

Figure 16:
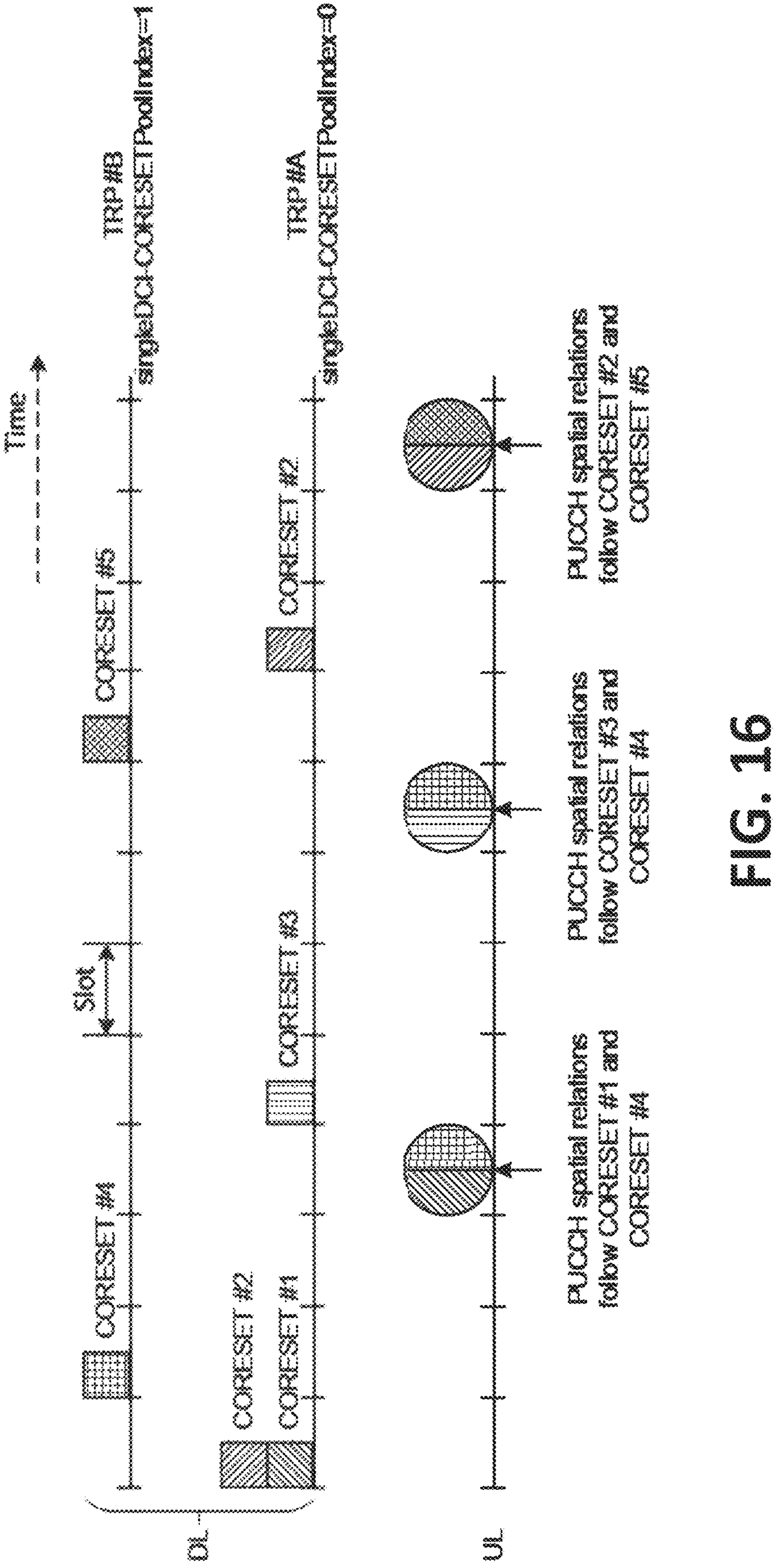
FIG. 16 illustrates another example of a PUCCH with multiple spatial relations in accordance with some embodiments.

FIG. 16 illustrates another example of a PUCCH with multiple spatial relations in accordance with some embodiments. In particular, in FIG. 14, the PUCCH has multiple spatial relations determined according to association between the CORESET and TRP.

2.2 Spatial Relations Determined Based on Association Between CORESET (Multiple TCI States) and TRP For single DCI multi-TRP operation, if the CORESET is configured with multiple activated TCI states, then TCI state of the CORESET is associated with one TRP. The TCI state may be associated with one TRP, for example, via the TRP ID. Alternatively, the CORESET pool may be defined, one CORESET pool may represent one TRP, and the association may be defined between the TCI state and the CORESET pool. A parameter associatedTRP-TCI may be introduced into TCI-State. Alternatively, the association between the TCI state and TRP may be configured/updated via a MAC-CE. In another alternative, the order of the TCI states of one CORESET may implicitly indicate the association between the TCI state and the TRP. For example, if one CORESET is configured with two active TCI states, then the first TCI state is associated with the first TRP, and the second TCI state is associated with the second TRP.

The CORESET may be configured with or without the CORESET pool index. In this case, if enableMultipleDefaultBeam-PUCCH is enabled, and neither the spatial relation nor the pathloss reference signal is configured for the PUCCH, the default spatial relations/pathloss reference signals for the PUCCH may be applied and determined as below:

Alt 1: the multiple default PUCCH spatial relations/pathloss reference signals independently follow one TCI/QCL assumption of one CORESET. The first default spatial relation/pathloss reference signal of the PUCCH may follow the TCI state/QCL assumption, which is associated with the first TRP, of the lowest indexed CORESET among those CORESETs that has at least one TCI state associated with the first TRP, in the latest slot in which one or more such CORESETs are monitored by the UE. The second default spatial relation/pathloss reference signal of the PUCCH may follow the TCI state/QCL assumption, which is associated with the second TRP, of the lowest indexed CORESET among those CORESETs that has at least one TCI state associated with the second TRP, in the latest slot in which one or more CORESETs associated with the second TRP are monitored by the UE.

Alt 2: the multiple default PUCCH spatial relations/pathloss reference signals sequentially follow the TCIs/QCL assumptions of one CORESET. The default spatial relations/pathloss reference signals of the PUCCH sequentially may follow the TCI states/QCL assumptions of the lowest indexed CORESET among those CORESETs that are configured with multiple activated states associated with the different TRPs, in the latest slot in which one or more such CORESETs are monitored by the UE.

Alt 3: the multiple default PUCCH spatial relations/pathloss reference signals sequentially follow the TCIs/QCL assumptions of the scheduling CORESET. The default spatial relations/pathloss reference signals of the PUCCH sequentially follow the TCI states/QCL assumptions of the scheduling CORESET, if the scheduling CORESET is configured with multiple active TCI states.

Note: for Alt. 2/Alt. 3, the PUCCH may be configured with association with the TRP or without association with the TRP. The TCI states of the CORESET may be configured with association with the TRP or without association with TRP. The association includes explicit association or implicit association.

Figure 17:
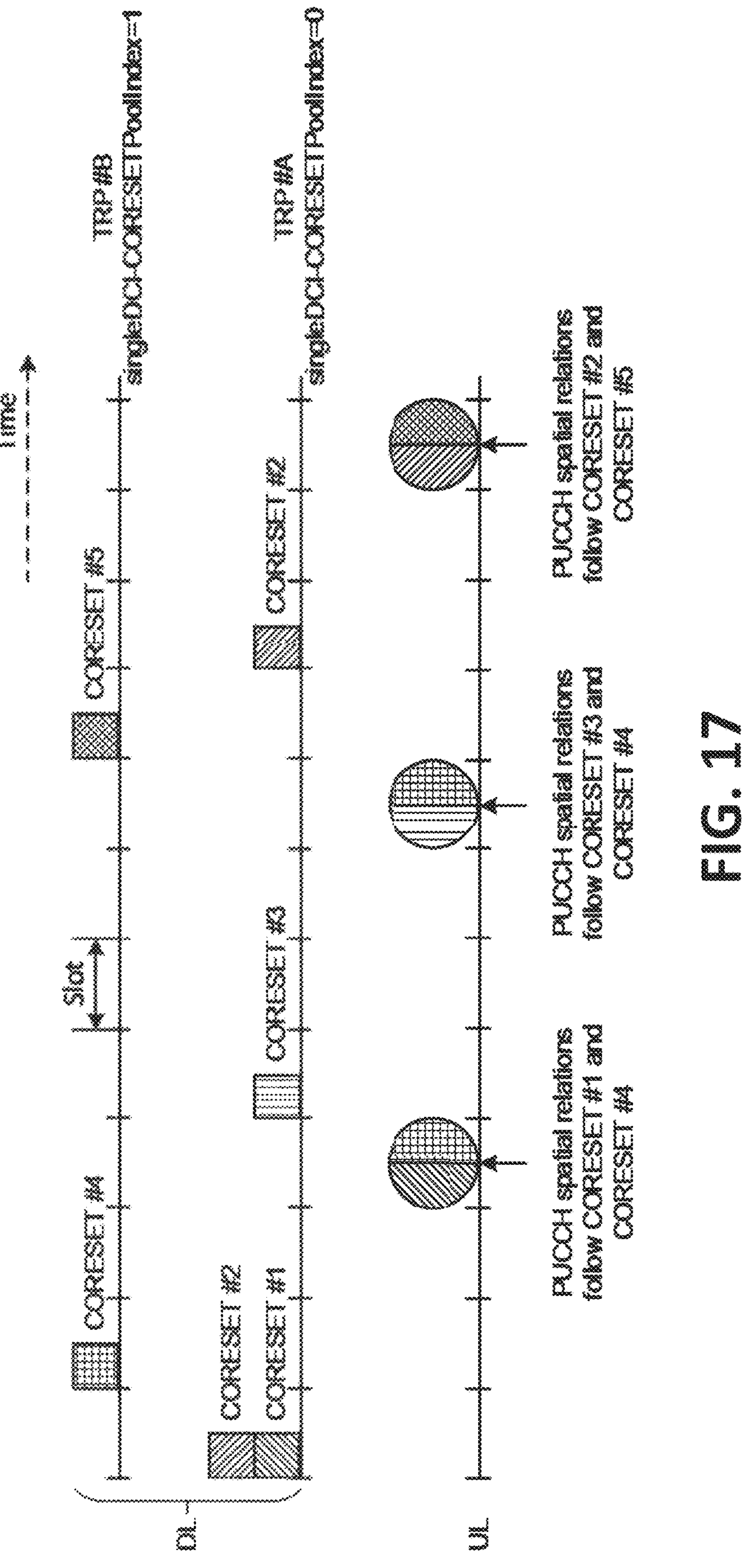
FIG. 17 illustrates another example of a PUCCH with multiple spatial relations in accordance with some embodiments.
Figure 18:
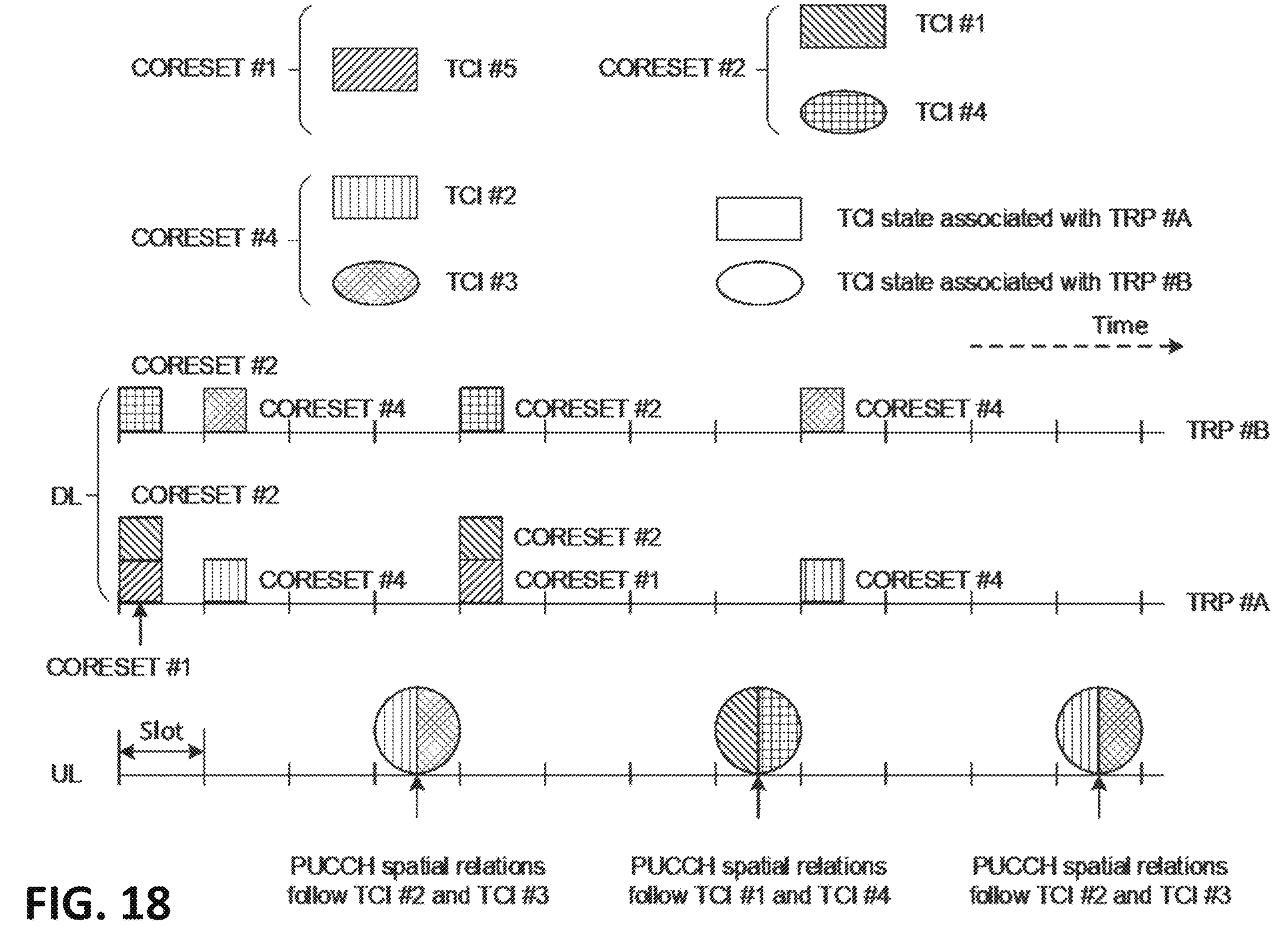
FIG. 18 illustrates another example of a PUCCH with multiple spatial relations in accordance with some embodiments.

FIG. 17 illustrates another example of a PUCCH with multiple spatial relations in accordance with some embodiments. FIG. 18 illustrates another example of a PUCCH with multiple spatial relations in accordance with some embodiments. In particular, FIG. 17 illustrates an example of the above Alt 1 with association between the CORESET TCI and TRP and FIG. 18 illustrates an example of the above Alt 2 for association between the CORESET TCI and TRP.

2.3 Spatial Relations Determined Based on Association Between TCI State and TRP

In an embodiment, for single DCI multi-TRP operation, if at least one TCI code point indicates multiple TCI states, the default spatial relations/pathloss reference signals for PUCCH may be determined as below:

Alt 1: the multiple default PUCCH spatial relations/pathloss reference signals dynamically follow the indicated TCI states of the PDSCH. The default spatial relations/pathloss reference signals of the PUCCH sequentially follow the indicated TCI states/QCL assumption for PDSCH reception in the latest slot in which the PDSCH is received with multiple TCI states indicated by one TCI codepoint.

Alt 2: the multiple default PUCCH spatial relations/pathloss reference signals semi-statically follow the multiple TCI states indicated by one TCI state codepoint. The default spatial relations/pathloss reference signals of PUCCH sequentially follow the TCI states corresponding to the lowest codepoint among the TCI codepoints containing multiple TCI states that are activated for the PDSCH Alt 3: the multiple default PUCCH spatial relations/pathloss reference signals are semi-statically and independently derived. If the TCI states are configured with explicit association with the TRP, then the first default spatial relations/pathloss reference signals of the PUCCH may follow the TCI state with the lowest TCI state ID among those TCI states associated with the first TRP; the second default spatial relations/pathloss reference signals of PUCCH may follow the TCI state with the lowest TCI state ID among those TCI states associated with the second TRP. In this embodiment, the PUCCH may be configured with association with the TRP or without association with the TRP. The TCI states may be configured with association with the TRP or without association with the TRP. The association includes explicit association or implicit association.

Figure 19:
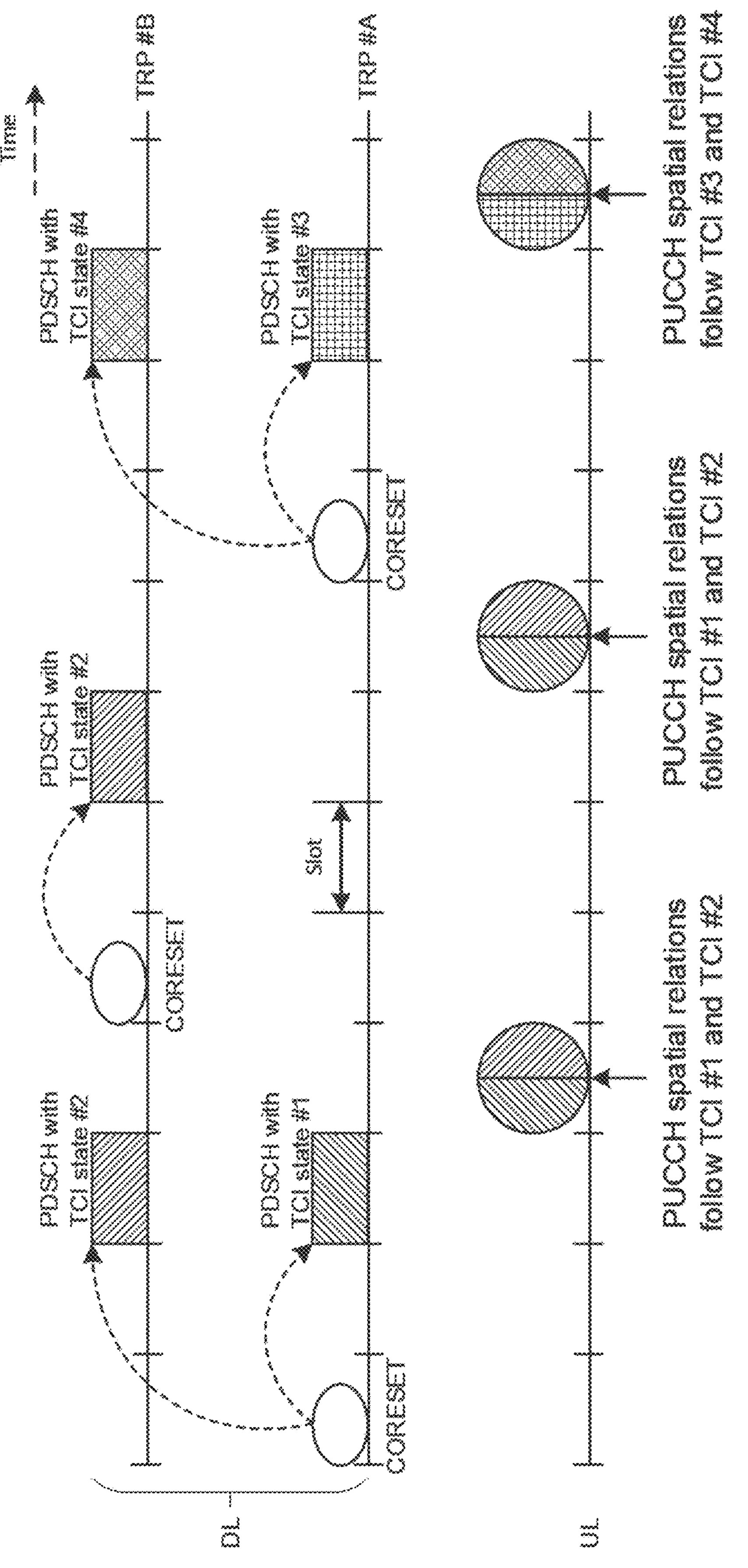
FIG. 19 illustrates another example of a PUCCH with multiple spatial relations in accordance with some embodiments.
Figure 20:
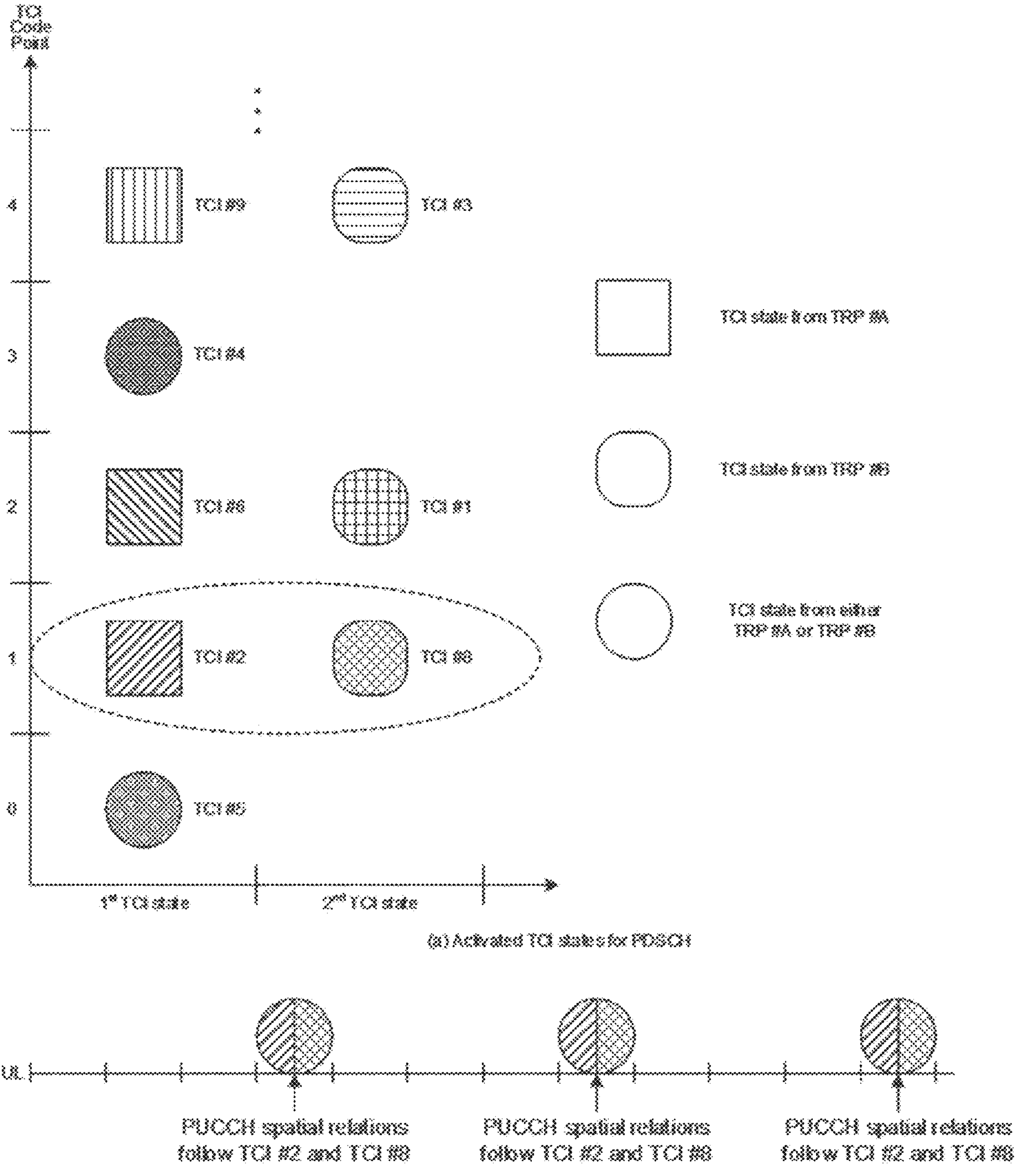
FIG. 20 illustrates another example of a PUCCH with multiple spatial relations in accordance with some embodiments.

FIG. 19 illustrates another example of a PUCCH with multiple spatial relations in accordance with some embodiments. FIG. 20 illustrates another example of a PUCCH with multiple spatial relations in accordance with some embodiments. In particular, FIG. 19 illustrates an example of the above Alt 1 with multiple spatial relations determined according to association between the TCI and TRP and FIG. 20 illustrates an example of the above Alt 2 for multiple spatial relations determined according to association between the TCI and TRP.

The methods in Section 1 and Section 2 may be used jointly. For example, in the system if some PUCCH resources are associated with only one spatial relation, and some PUCCH resources are associated with multiple spatial relations, then a method from Section 1 may be used to derive the default spatial relation for those PUCCH with one spatial relation and a method from Section 2 may be used to derive the default spatial relations for those PUCCH with multiple spatial relations.

Default SRS Spatial Relation in Multi-TRP with Single DCI

1. SRS Configuration with Multiple Spatial Relations

For SRS transmission in a multi-TRP with a single DCI, one SRS resource may be configured with multiple spatial relations/Tx beams. The SRS resource is transmitted with repetitions, and the different spatial relation may be applied for the repetitions, e.g., targeting at different TRPs. FIG. 21(*a*) illustrates an example of an SRS with multiple spatial relations with sequential mapping in accordance with some embodiments. FIG. 21(*b*) illustrates an example of an SRS with multiple spatial relations with cyclical mapping in accordance with some embodiments. That is, FIG. 21(*a*) shows a sequential mapping between the SRS spatial relation and SRS repetitions; FIG. 21(*b*) shows a cyclic mapping between the SRS spatial relation and SRS repetitions. The TRP may not trigger SRS transmission and one purpose of the SRS is to derive the spatial relation for a PUSCH transmission.

All the SRS resources or a part of SRS resources within one SRS resource set may be configured with multiple spatial relations. In the SRS resource set, multiple pathloss reference signals may also be configured targeting at different TRPs. An example of the RRC configuration for an SRS resource with multiple spatial relations may be:

```
SRS-Resource ::=                SEQUENCE {
...
...
  resourceType                  CHOICE {
    aperiodic                   SEQUENCE {
      ...
    },
    semi-persistent              SEQUENCE {
      periodicityAndOffset-sp      SRS-PeriodicityAndOffset,
      ...
    },
    periodic                    SEQUENCE {
      periodicityAndOffset-p       SRS-PeriodicityAndOffset,
      ...
    }
  },
  sequenceId                   INTEGER (0..1023),
  spatialRelationInfo           SRS-SpatialRelationInfo   OPTIONAL,   -- Need R
  spatialRelationInfo-List       SEQUENCE (SIZE(1..maxNrofSRS-
spatialRelationInfo-1)) OF SRS-SpatialRelationInfo             OPTIONAL
  ...,
  [[
  resourceMapping-r16            SEQUENCE {
    startPosition-r16            INTEGER (0..13),
    nrofSymbols-r16               ENUMERATED {n1, n2, n4},
    repetitionFactor-r16          ENUMERATED {n1, n2, n4}
  }                                  OPTIONAL   -- Need R
  ]]
}
```

As shown, the parameter additionalSpatialRelationInfo may be introduced in the RRC configuration to optionally indicate the second spatial relation for SRS.

FIG. 22 illustrates an example of a semi-persistent SRS activation/deactivation MAC CE with multiple spatial relations in accordance with some embodiments. The fields of the MAC-CE may be defined as below:

M: This field indicates whether multiple spatial relations are configured for one SRS resource. If this field is set to '1', then multiple spatial relations are configured for SRS resource i, e.g., the octets for $F_{i,0}$ and $F_{i,1}$ are present. If this field is set to '0', then only one spatial relation is configured for SRS resource i, e.g., the octet for $F_{i,1}$ is not present.

$F_{i,j}$: This field indicates the type of a resource used as a spatial relationship j for SRS resource i within SP SRS Resource Set indicated with SP SRS Resource Set ID field. $F_{0,0}$ refers to the first spatial relation for the first SRS resource within the resource set, $F_{0,1}$ refers to the second spatial relation for the first SRS resource within the resource set, $F_{1,0}$ refers to the first spatial relation for the second SRS resource within the resource set, $F_{1,1}$ refers to the second spatial relation for the second SRS resource within the resource set, and so on. The field is set to 1 to indicate a NZP CSI-RS resource index is used, and set to 0 to indicate either the SSB index or SRS resource index is used. The length of the field is 1 bit. This field is only present if MAC CE is used for activation, e.g., the A/D field is set to 1;

Resource $ID_{i,j}$: This field contains an identifier of the resource used for a spatial relationship j derivation for SRS resource i. Resource $ID_{0,0}$ refers to the first spatial relation for the first SRS resource within the resource set, Resource $ID_{0,1}$ refers to the second spatial relation for the first SRS resource within the resource set, Resource $ID_{1,0}$ refers to the first spatial relation for the second SRS resource within the resource set, Resource $ID_{1,1}$ refers to the second spatial relation for the second SRS resource within the resource set, and so on. If $F_{i,j}$ is set to 0, and the first bit of this field is set to 1, the remainder of this field contains SSB-Index as specified in TS 38.331. If $F_{i,j}$ is set to 0, and the first bit of this field is set to 0, the remainder of this field contains SRS-ResourceId as specified in TS 38.331. The length of the field is 7 bits. This field is only present if the MAC CE is used for activation, e.g., the A/D field is set to 1;

Resource Serving Cell $ID_{i,j}$: This field indicates the identity of the Serving Cell on which the resource used for the spatial relationship j derivation for SRS resource i is located. The length of the field is 5 bits;

Resource BWP $ID_{i,j}$: This field indicates a UL BWP as the codepoint of the DCI bandwidth part indicator field as specified in TS 38.212, on which the resource used for the spatial relationship j derivation for SRS resource i is located. The length of the field is 2 bits;

The other fields are the same with those fields as described previously.

FIG. 23 illustrates an example of an aperiodic SRS spatial relation indication MAC CE in accordance with some embodiments. The field definitions are the same as above, except the field of AP SRS Resource Set ID which indicates an aperiodic SRS resource set. In a DCI, the codepoint of the SRI field may indicate multiple spatial relations. For example, if the SRI indicates SRS resource #2, then the multiple spatial relations of SRS resource #2 are indicated.

2. Single Spatial Relation Associated with One SRS Resource

In single DCI multi-TRP operation, one SRS resource is associated with only one spatial relation. In order to reduce overhead, the default beam/spatial relation may be applied for SRS transmission. The existing parameter, e.g., enableDefaultBeamPlForSRS, can be reused to indicate whether default spatial relation/beam for SRS transmission is enabled. If this parameter is enabled, then the spatial relations and pathloss reference signals are not configured for the SRS. In this case, further MAC-CE transmissions to update the spatial relations for SRS transmission may be avoided and the overhead may be reduced.

In a single DCI multi-TRP, the SRS is associated with one TRP. The association may be defined at the SRS resource set level/SRS resource level by a new parameter associatedTRP-SRS. Alternatively, the associated TRP with SRS may be configured/updated via a MAC-CE. If the SRS resource is triggered by a DCI, the parameter associatedTRP-SRS may also be included in the DCI as a new field. In another example, the associated TRP with the SRS may be implicitly represented by the SRS resource set ID.

The association between the SRS and TRP in this section (Section 2) is not limited to default beam operation for the SRS. It may be also applied in other scenarios for SRS transmission, such as codebook/non-codebook-based transmission, etc. The association may be defined at the SRS resource set level/SRS resource level or in the SRS spatial relation info.

The default spatial relation/default pathloss reference signal for the SRS may be determined according to the associated TRP. The association between the SRS and TRP, e.g., associatedTRP-SRS, may be linked with a TRP, for example, via TRP ID (the TRP ID may be logical or physical cell ID). Alternatively, the association between the SRS and TRP may be linked with one TRP, for example, through the CORESET, CORESET pool, TCI state, etc. as described in the following sections. In some cases, the default beam operation may not be applicable for SRS transmission for beam management. In other cases, the TRP may not trigger SRS transmission and, as above, one purpose of SRS is to derive the spatial relation for a PUSCH transmission. If there is no SRS transmission, then the default SRS spatial relation is derived assuming the SRS would be transmitted in the first slot of the PUSCH transmission.

2.1 Spatial Relation Determined Based on Explicit Association Between CORESET and TRP For single DCI multi-TRP operation, the CORESET may also be associated with one TRP. The CORESET pool may also be defined for a single DCI multi-TRP. The association between the CORESET and TRP may be defined by a RRC parameter, for example, singleDCI-CORESETPoolIndex. If singleDCI-CORESETPoolIndex is set to 0, the CORESET is sent from TRP #A; if singleDCI-CORESETPoolIndex is set to 1, the CORESET is sent from TRP #B.

For SRS transmission, the SRS is associated with different CORESET pools via associatedTRP-SRS. If associatedTRP-SRS is set to 0, then the SRS is associated with CORESET pool index #0, e.g., TRP #A; if associatedTRP-SRS is set to 1, then the SRS is associated with TRP #B.

In this case, if enableDefaultBeamPlForSRS is enabled, and neither the spatial relation nor the pathloss reference signal is configured for SRS transmission, the default spatial relation/pathloss reference signal for the SRS may be applied and determined as below:

Alt 1: the default SRS spatial relation/pathloss reference signal may follow the TCI/QCL assumption of one CORESET: the default spatial relation/pathloss reference signal of the SRS may follow the TCI state/QCL assumption of the lowest indexed CORESET among those CORESETs whose configuredsingleDCI-CORESETPoolIndex is the same as the CORESET pool associated with the SRS, in the latest slot in which one or more CORESETs whose configured singleDCI-CORESETPoolIndex is the same as the CORESET pool associated with the SRS are monitored by the UE. The 'latest slot' is prior to the SRS transmission.

The associated CORESET pool with the SRS is indicated by associatedTRP-SRS. Alternatively, the associated CORESET pool is the same as the scheduling CORESET if the SRS is triggered by a DCI.

For an SRS triggered by a DCI, the default spatial relation/pathloss reference signal may alternatively follow the TCI state/QCL assumption of the scheduling CORESET.

Figure 24:
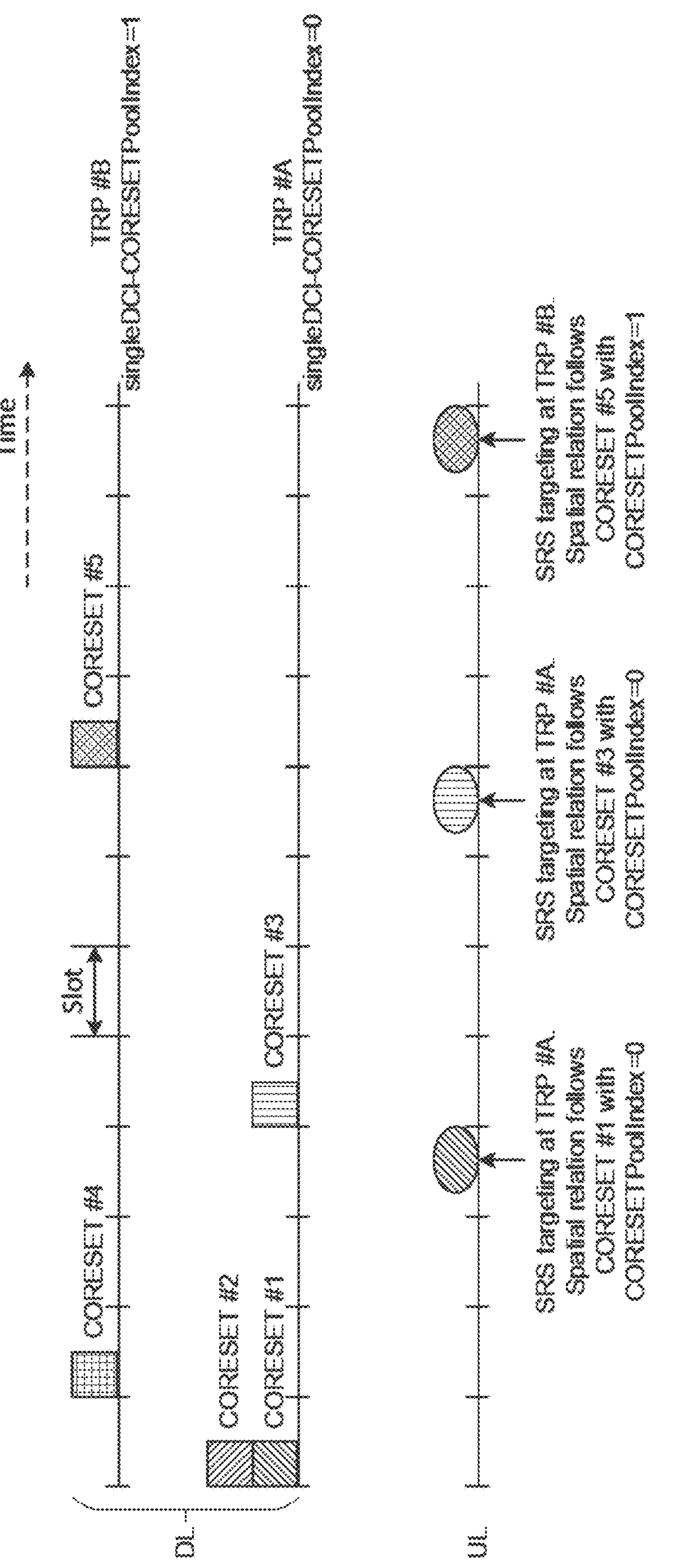
FIG. 24 illustrates an example of an SRS default spatial relation according to a CORESET in accordance with some embodiments.

This may be also applied to the case of dynamic switching between single TRP and multi-TRP operation. FIG. 24 illustrates an example of an SRS default spatial relation according to a CORESET in accordance with some embodiments. In particular, FIG. 24 shows an example of the SRS default spatial relation determination when the CORESET in a single DCI is associated with a TRP.

2.2 Spatial Relation Determined Based on Explicit Association Between CORESET (Multi-TC States) and TRP For single DCI multi-TRP operation, if the CORESET is configured with multiple activated TCI states, then the TCI state of the CORESET is associated with one TRP. The TCI state may be associated with one TRP, for example, via a TRP ID (which may be the logical or physical cell ID). Alternatively, a CORESET pool may be defined, one CORESET pool may represent one TRP, and the association may be defined between the TCI state and the CORESET pool. A parameter associatedTRP-TCI is introduced into TCI-State. Alternatively, the association between the TCI state and TRP may be configured/updated via a MAC-CE. In another alternative, the order of the TCI states of one CORESET may implicitly indicate the association between the TCI state and the TRP. For example, if one CORESET is configured with two active TCI states, then the first TCI state is associated with the first TRP, and the second TCI state is associated with the second TRP.

The CORESET may be configured with or without a CORESET pool index.

In this case, if enableDefaultBeamPlForSRS is enabled, and neither the spatial relation nor the pathloss reference signal is configured for SRS, the default spatial relation/pathloss reference signal for SRS may be applied and determined as below:

Alt 1: the default SRS spatial relation/pathloss reference signal may follow one TCI/QCL assumption of one CORESET: the default spatial relation/pathloss reference signal of the SRS may follow the TCI state/QCL assumption, which is associated with the same TRP with the SRS, of the lowest indexed CORESET among those CORESETs that has at least one activated TCI state and the TCI state is associated with the same TRP as the SRS (explicitly via associatedTRP-TCI of the TCI state, or implicitly via the order of the TCI state), in the latest slot in which one or more such CORESETs are monitored by the UE. The 'latest slot' is prior to the SRS transmission. The associated TRP with SRS may be indicated by associatedTRP-SRS. Alternatively, the associated CORESET pool may be the same as the scheduling CORESET if the SRS is triggered by a DCI. For an SRS triggered by a DCI, alternatively the default spatial relation/pathloss reference signal may follow the TCI state/QCL assumption, which is associated with the same TRP with the SRS, of the scheduling CORESET.

Alt 2: the default SRS spatial relation/pathloss reference signal may follow one TCI state: the default spatial relation/pathloss reference signal of the SRS may follow the TCI state/QCL assumption with the lowest TCI state ID among those TCI states of the CORESETs, in which the TCI state are associated with the same TRP as the SRS, (explicitly via associatedTRP-TCI of the TCI state, or implicitly via the order of the TCI state), in the latest slot in which at least one CORESET, which has at least one TCI state associated with the same TRP as the SRS, is monitored by the UE. The 'latest slot' is prior to the SRS transmission. The associated TRP with the SRS is indicated by associatedTRP-SRS. Alternatively, the associated CORESET pool may be the same as the scheduling CORESET if the SRS is triggered by a DCI. For an SRS triggered by a DCI, the default spatial relation/pathloss reference signal may alternatively follow the TCI state/QCL assumption, which is associated with the same TRP with the SRS, of the scheduling CORESET.

Figure 25:
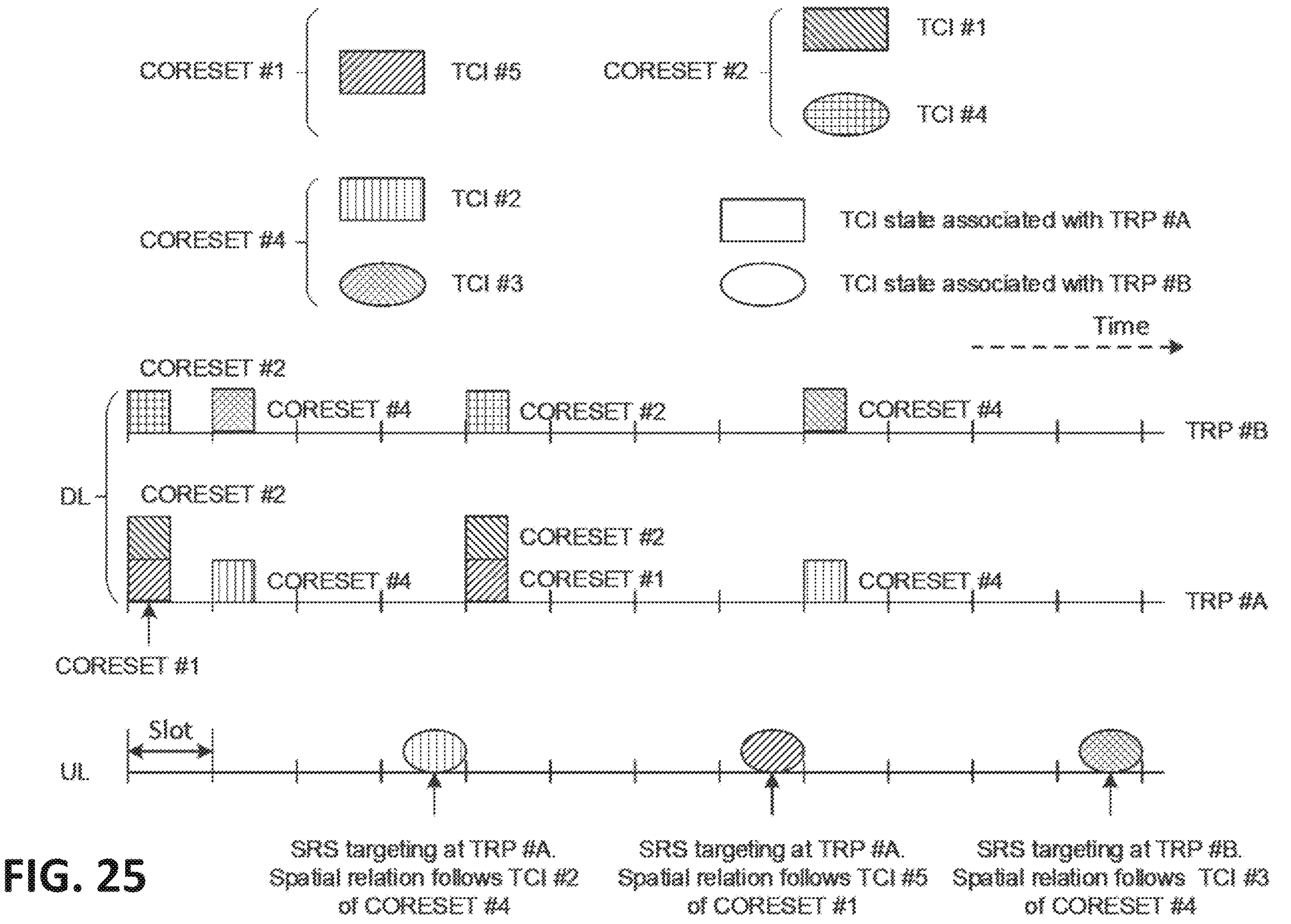
FIG. 25 illustrates an example of an SRS default spatial relation according to a CORESET TCI state and TRP in accordance with some embodiments.
Figure 26:
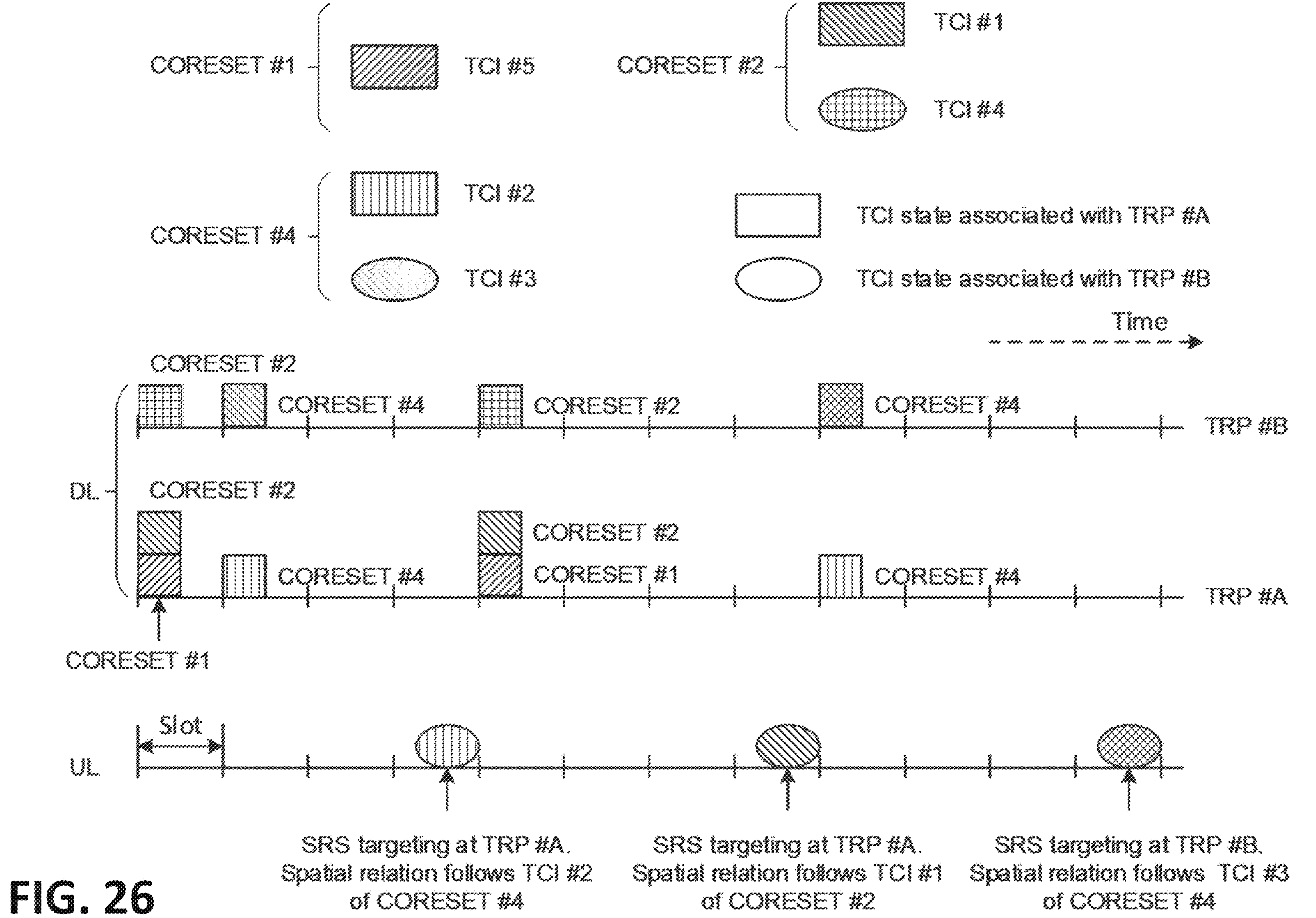
FIG. 26 illustrates another example of an SRS default spatial relation according to a CORESET TCI state and TRP in accordance with some embodiments.

This may be also applied to the case of dynamic switching between single TRP and multi-TRP operation. FIG. 25 illustrates an example of an SRS default spatial relation according to a CORESET TCI state and TRP in accordance with some embodiments. FIG. 26 illustrates another example of an SRS default spatial relation according to a CORESET TCI state and TRP in accordance with some embodiments. In particular, FIG. 25 illustrates the Alt 1 operation above while FIG. 26 illustrates the Alt 2 operation.

Figure 27:
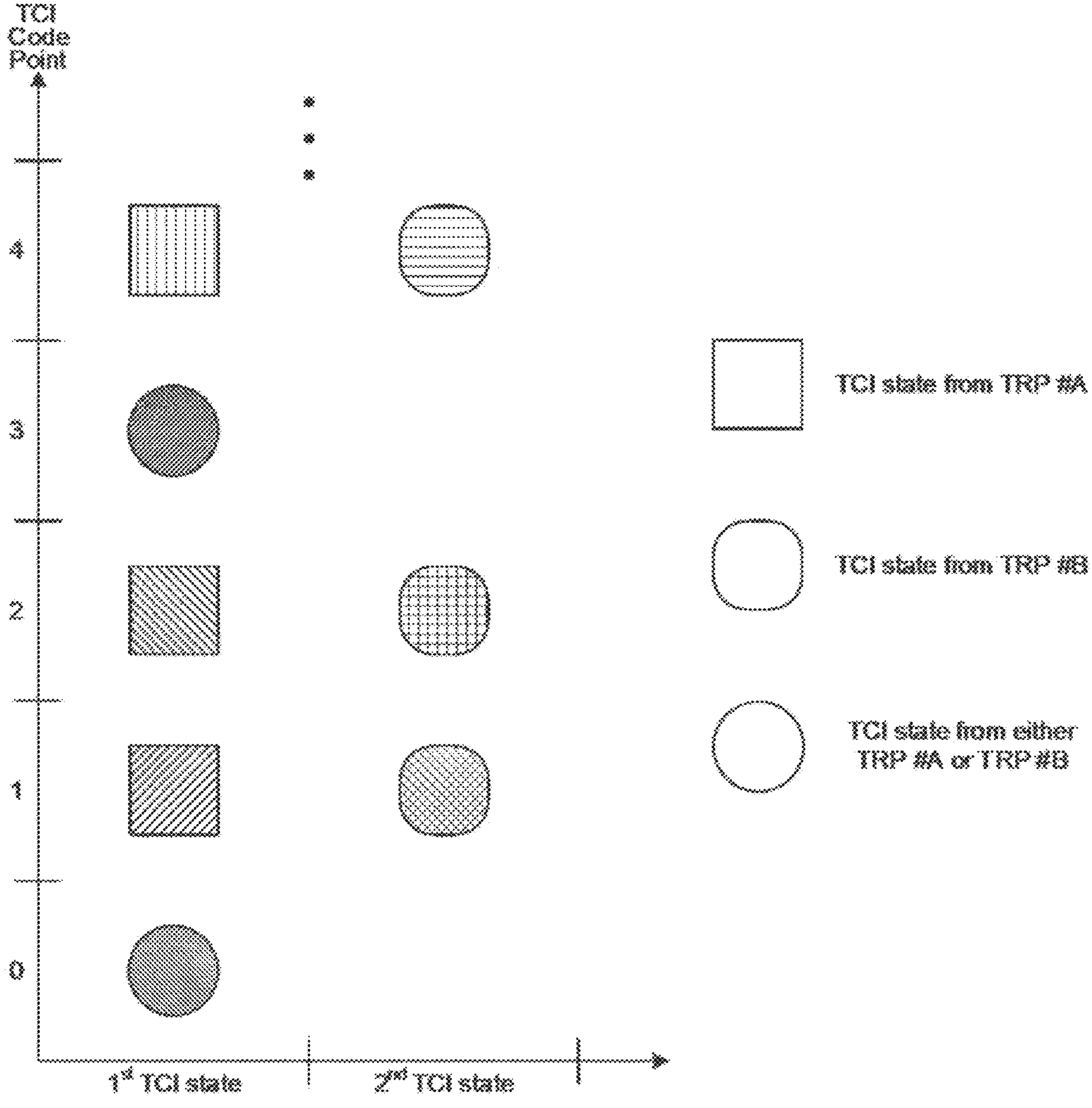
FIG. 27 illustrates an example of implicit association between TCI states and TRP in accordance with some embodiments.

2.3 Spatial Relation Determined Based on Implicit Association Between ICI Stale and TRP With single DCI multi-TRP operation, for the TCI state of the PDSCH, at least one TCI codepoint includes multiple TCI states. Some restrictions may be introduced for the TCI states of the PDSCH. The order of the TCI states may implicitly indicate the association between the TRP and the TCI state. In an example, for those TCI code points that include multiple TCI states, the first TCI states may be associated to the same TRP, and the second TCI states may be associated with another TRP. For example, for TCI State $ID_{i,j}$ as shown above, for all code points that include multiple TCI states, TCI State $ID_{i,1}$ is associated with TRP #A, and TCI State $ID_{i,2}$ is associated with TRP #B. FIG. 27 illustrates an example of implicit association between TCI states and TRP in accordance with some embodiments.

For SRS, the association between the TRP and SRS may be defined as following: if the parameter associatedTRP-SRS is set to 0, the SRS is associated with the first TCI state in those TCI codepoints containing multiple TCI states, e.g. TRP #A; if associatedTRP-SRS is set to 1, the SRS is associated with the second TCI state, e.g. TRP #B.

In this case, if enableDefaultBeamPlForSRS is enabled, and neither the spatial relation nor the pathloss reference signal is configured for the SRS, the default spatial relation/pathloss reference signal for SRS may be applied and determined as below:

Alt 1: the default SRS spatial relation/pathloss reference signal dynamically may follow the indicated TCI state: the default spatial relation/pathloss reference signal of the SRS may follow one of the indicated TCI states/QCL assumptions for PDSCH reception in the latest slot where the PDSCH reception with multiple TCI states is performed. Whether the first or the second TCI state is followed is further indicated by the parameter associatedTRP-SRS in an RRC message or DCI. For an SRS triggered by a DCI, the default spatial relation/pathloss reference signal may alternatively follow the TCI state/QCL assumption of the scheduling CORESET.

Alt 2: the default SRS spatial relation/pathloss reference signal semi-statically may follow one TCI state indicated by one TCI state codepoint: the default spatial relation/pathloss reference signal of the SRS may follow one of the TCI-states corresponding to the lowest codepoint among those TCI codepoints containing multiple TCI states which are activated for the PDSCH. Whether the first or the second TCI state is followed may be further indicated by the parameter associatedTRP-SRS in an RRC message or a DCI. For an SRS triggered by a DCI, alternatively the default spatial relation/pathloss reference signal may follow the TCI state/QCL assumption of the scheduling CORESET.

Figure 28:
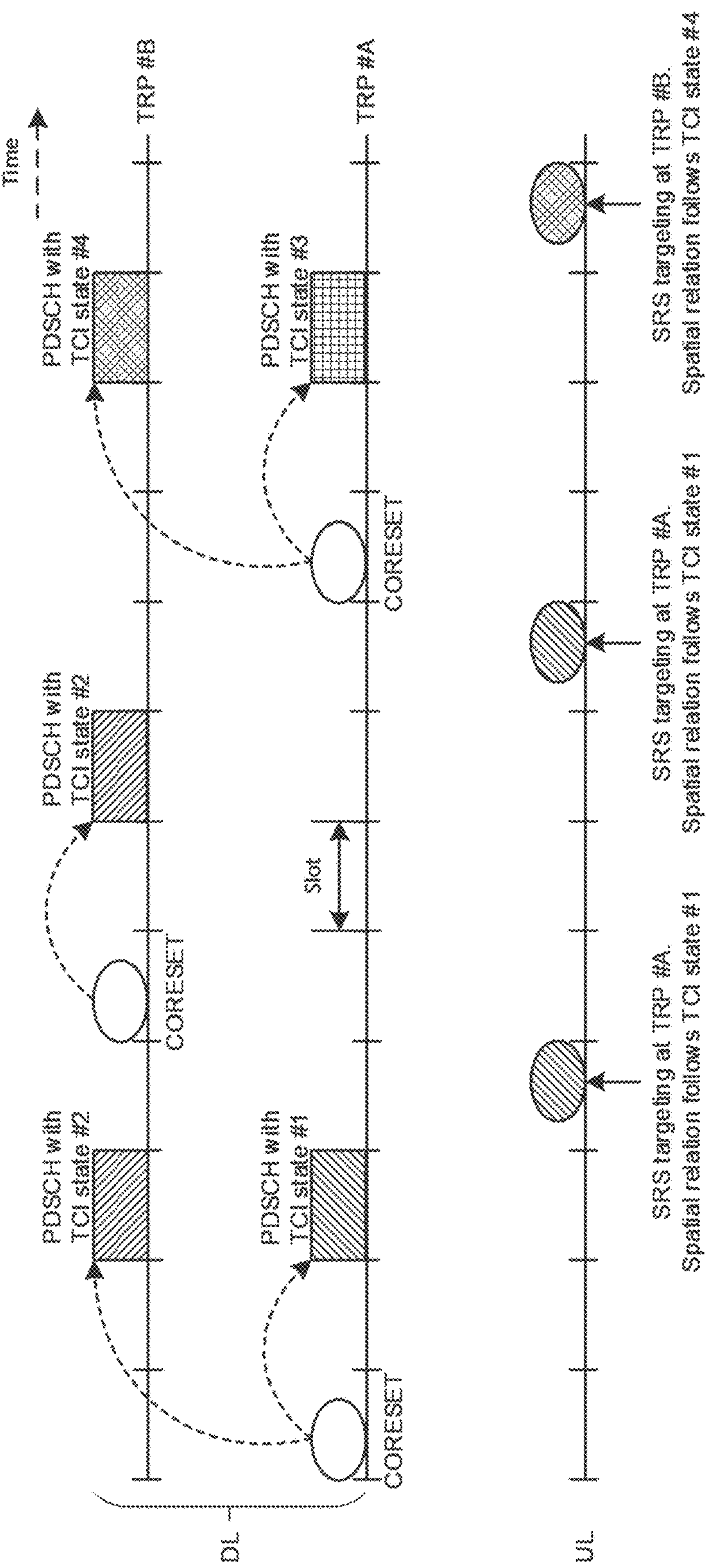
FIG. 28 illustrates an example of an SRS default spatial relation according to implicit association between TCI and TRP in accordance with some embodiments.
Figure 29:
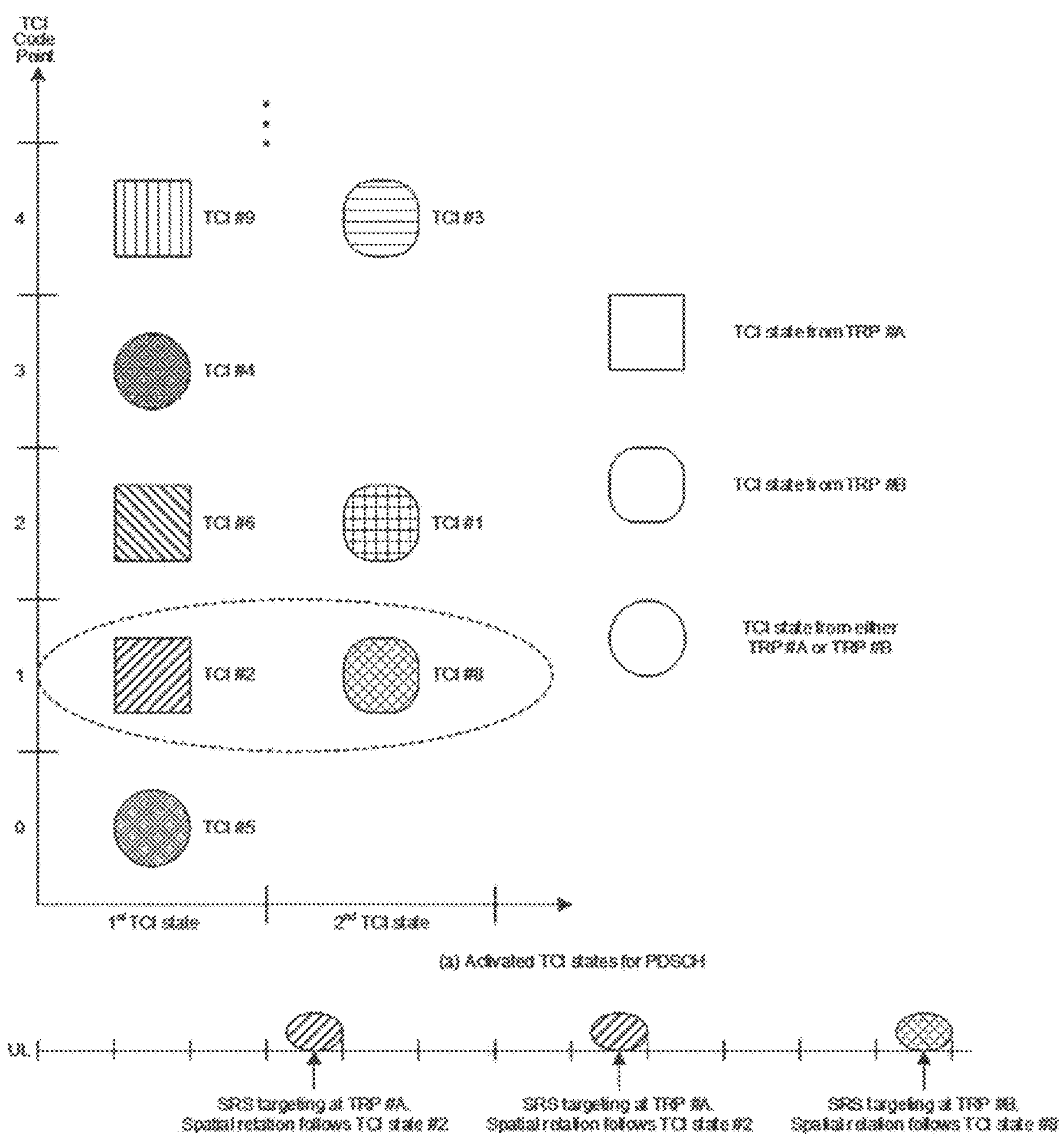
FIG. 29 illustrates another example of an SRS default spatial relation according to implicit association between TCI and TRP in accordance with some embodiments.

FIG. 28 illustrates an example of an SRS default spatial relation according to implicit association between TCI and TRP in accordance with some embodiments. FIG. 29 illustrates another example of an SRS default spatial relation according to implicit association between TCI and TRP in accordance with some embodiments. In particular, FIG. 28 illustrates the Alt 1 operation above while FIG. 29 illustrates the Alt 2 operation.

Figure 30:
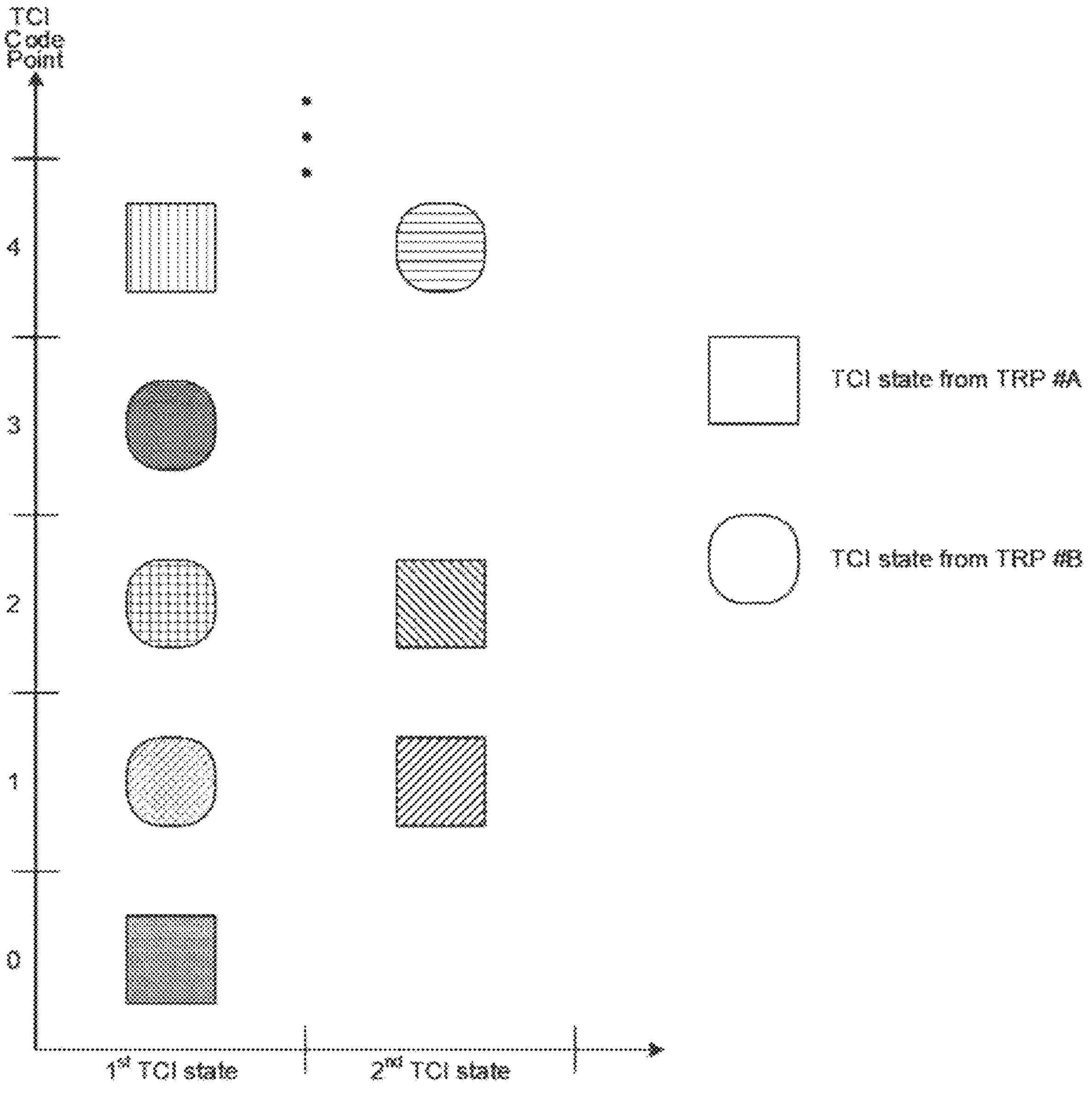
FIG. 30 illustrates an example of explicit association between TCI state and TRP in accordance with some embodiments.

2.4 Spatial Relation Determined Based on Explicit Association Between TCI State and TRP The downlink TCI state may be associated with one TRP. For example, the TCI state may be associated with one TRP, for example, via the TRP ID (the logical or physical cell ID). Alternatively, the CORESET pool may be defined, one CORESET pool represent one TRP, and the association may be defined between the TCI state and the CORESET pool. A parameter associatedTRP-TCI may be introduced into TCI-State. Alternatively, the association between TCI state and TRP may be configured/updated via a MAC-CE. In another example, the order of the TCI states may implicitly indicate the association between the TRP and the TCI state if one codepoint indicates multiple TCI states. FIG. 30 illustrates an example of explicit association between TCI state and TRP in accordance with some embodiments.

In this case, if enableDefaultBeamPlForSRS is enabled, and neither the spatial relation nor the pathloss reference signal is configured for SRS, the default spatial relation/pathloss reference signal for SRS may be applied and determined as below:

Alt 1: the default SRS spatial relation/pathloss reference signal dynamically may follow the indicated TCI state: the default spatial relation/pathloss reference signal of the SRS may follow the indicated TCI state/QCL assumptions for PDSCH reception in the latest slot where the PDSCH reception with one TCI state, whose associatedTRP-TCI has the same value as associatedTRP-SRS, is performed. For an SRS triggered by a DC, the default spatial relation/pathloss reference signal may alternatively follow the TCI state/QCL assumption of the scheduling CORESET.

Alt 2: the default SRS spatial relation/pathloss reference signal semi-statically may follow one TCI state indicated by one TCI state codepoint: the default spatial relation/pathloss reference signal of an SRS may follow the TCI-state with the lowest TCI state ID among those TCI states whose associatedTRP-TCI has the same value as associatedTRP-SRS. For an SRS indicated by a DCI, the default spatial relation/pathloss reference signal may alternatively follow the TCI state/QCL assumption of the scheduling CORESET. In another example, the default spatial relation/pathloss reference signal of the SRS may follow one TCI state indicated by the lowest TCI state code point containing multiple TCI states. The TCI state is associated with the same TRP as the SRS.

Figure 31:
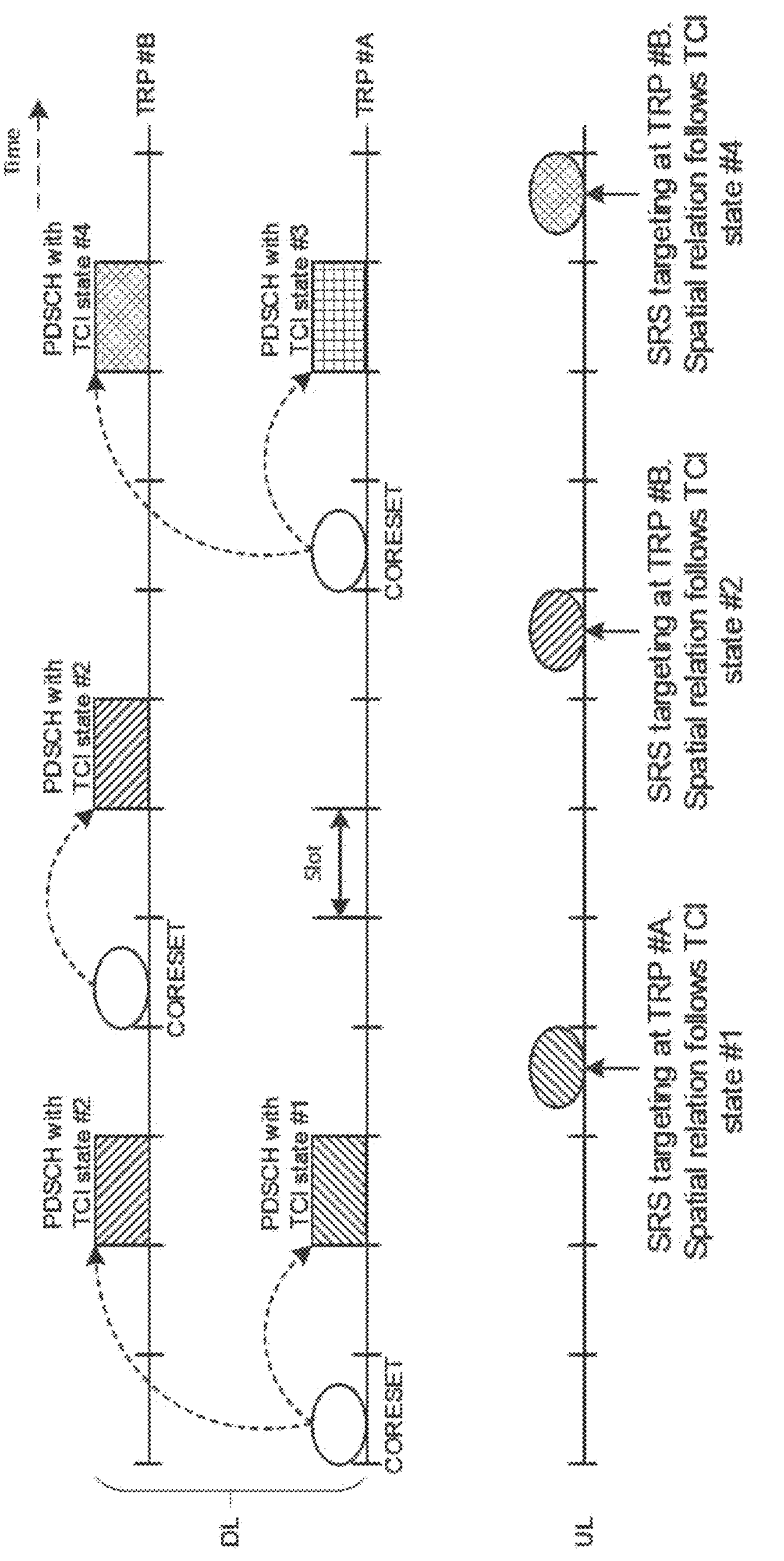
FIG. 31 illustrates an example of an SRS default spatial relation according to explicit association between TCI and TRP in accordance with some embodiments.
Figure 32:
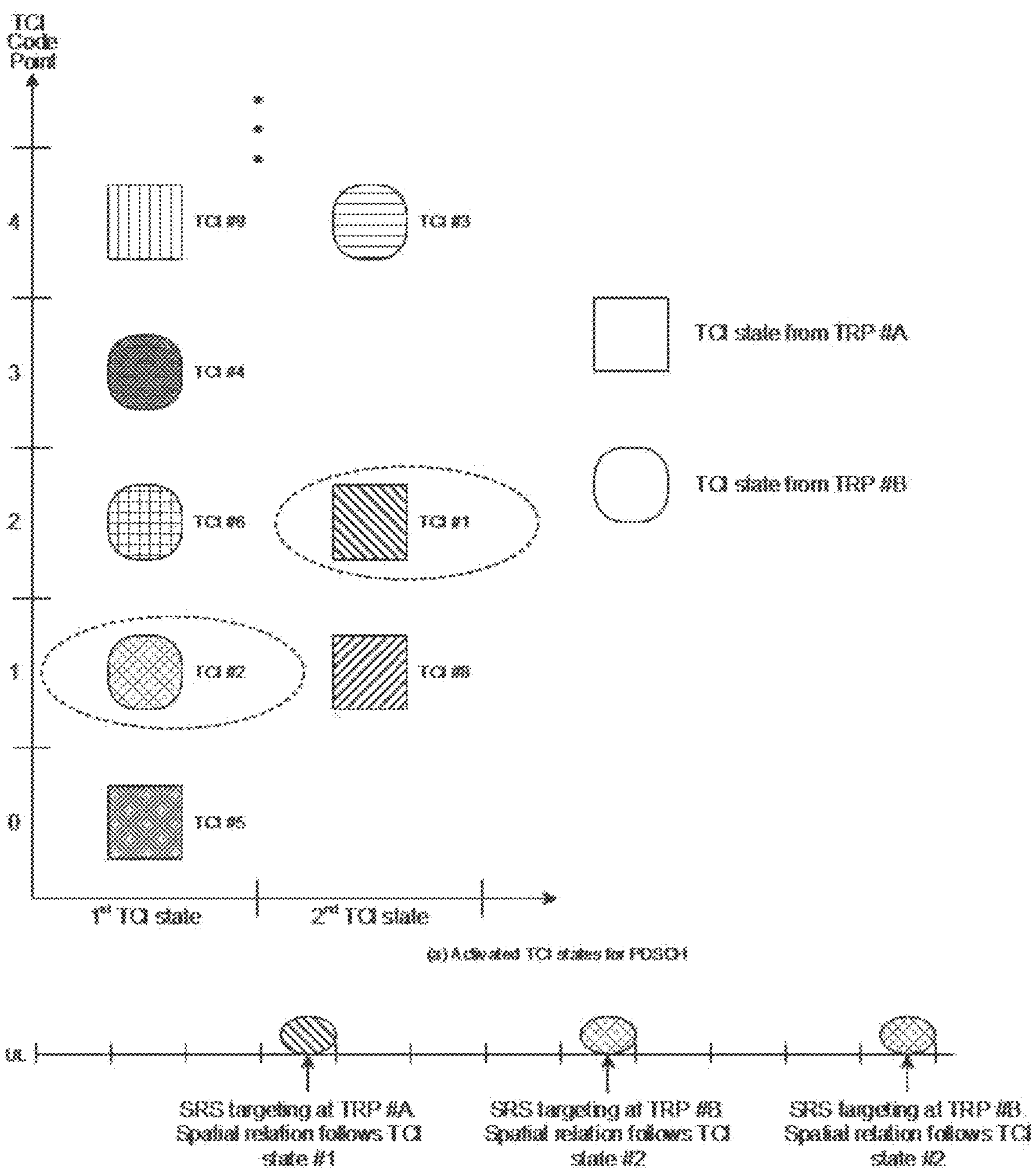
FIG. 32 illustrates another example of an SRS default spatial relation according to explicit association between TCI and TRP in accordance with some embodiments.

This may be also applied to the case of dynamic switching between single TRP and multi-TRP operation. FIG. 31 illustrates an example of an SRS default spatial relation according to explicit association between TCI and TRP in accordance with some embodiments. FIG. 32 illustrates another example of an SRS default spatial relation according to explicit association between TCI and TRP in accordance with some embodiments. In particular, FIG. 31 illustrates the Alt 1 operation above while FIG. 32 illustrates the Alt 2 operation.

3. Multiple Spatial Relations Associated One SRS Resource

In a single DCI multi-TRP, if one SRS resource is configured with multiple spatial relations, in order to reduce overhead the default beams/spatial relations may be applied for SRS transmission. A new RRC parameter may be introduced, e.g., enableMultipleDefaultBeam-SRS, indicating whether multiple default spatial relations/beams for SRS transmission is enabled. If this parameter is enabled, then the spatial relations and pathloss reference signals are not configured for SRS transmission. Alternatively, the spatial relations and pathloss reference signals may be configured but may be ignored. In this way, further MAC-CE transmissions to update the spatial relations for SRS transmission may be avoided and the overhead may be reduced. The parameter enableMultipleDefaultBeam-SRS may be defined at the SRS resource set level/SRS resource level.

When multiple spatial relations are associated with one SRS resource, the spatial relation may be associated with different TRPs. In an example, the order of the (default) spatial relations may implicitly represent the associated TRP. For example, the first (default) spatial relation may be associated with the first TRP, and the second (default) spatial relation may be associated with the second TRP. In another example, the SRS may be explicitly associated with multiple TRPs via new RRC parameters.

The association between the SRS and TRP in this section (Section 3) is not limited to default beam operation for the SRS. The association may be also applied in other scenarios for SRS transmission, such as codebook/non-codebook-based transmission, etc. The association may be defined at the SRS resource set level/SRS resource level or in the SRS spatial relation info.

The default spatial relations/default pathloss reference signals for the SRS may be determined as described in the following sections. The default beam operation may not be applicable for SRS transmission for beam management. The TRP may not trigger SRS transmission and, as above, one purpose of the SRS is to derive the spatial relation for the PUSCH transmission. If there is no SRS transmission, then the default SRS spatial relation is derived assuming the SRS would be transmitted in the first slot of the PUSCH transmission.

3.1 Spatial Relations Determined Based on Association Between CORESET and TRP

For single DCI multi-TRP operation, the CORESET may also be associated with one TRP. The CORESET pool may also be defined for single DCI multi-TRP operation. The association between CORESET and TRP may be defined by an RRC parameter, for example, singleDCI-CORESETPoolIndex; if singleDCI-CORESETPoolIndex is set to 0, the CORESET is sent from TRP #A, if it is set to 1, the CORESET is sent from TRP #B.

In this case, if enableMultipleDefaultBeam-SRS is enabled, and neither the spatial relation nor the pathloss reference signal is configured for SRS, the default spatial relations/pathloss reference signals for SRS is applied and is determined as below:

Alt 1: the multiple default SRS spatial relations/pathloss reference signals independently follow the TCI/QCL assumption of one CORESET: the first default spatial relation/pathloss reference signal of the SRS may follow the TCI state/QCL assumption of the lowest indexed CORESET among those CORESETs associated with the first TRP, in the latest slot in which one or more CORESETs associated with the first TRP are monitored by the UE.

Figure 33:
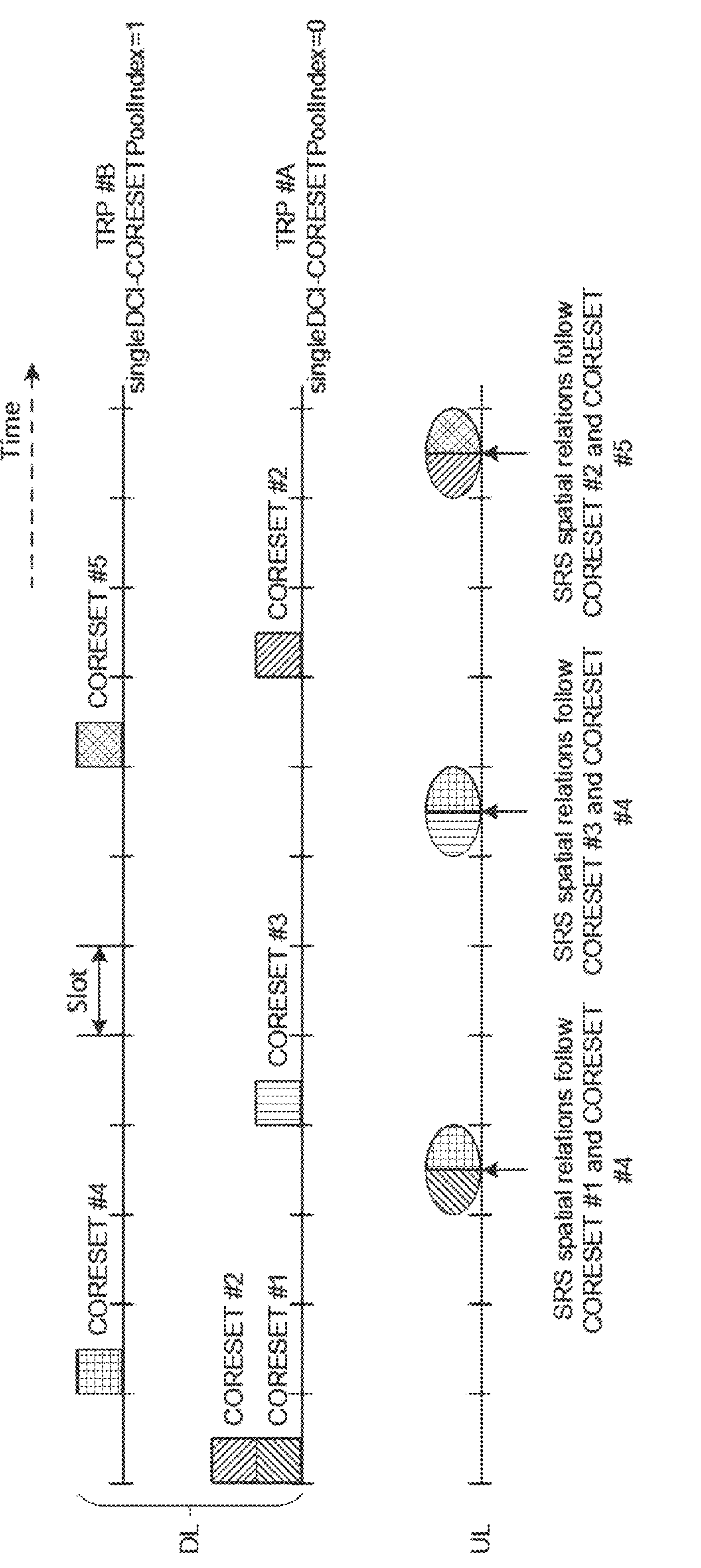
FIG. 33 illustrates an example of an SRS with multiple spatial relations determined according to association between CORESET and TRP in accordance with some embodiments.

The second default spatial relation/pathloss reference signal of SRS should follow the TCI state/QCL assumption of the lowest indexed CORESET among those CORESETs associated with the second TRP, in the latest slot in which one or more CORESETs associated with the second TRP are monitored by the UE. FIG. 33 illustrates an example of an SRS with multiple spatial relations determined according to association between CORESET and TRP in accordance with some embodiments.

3.2 Spatial Relations Determined Based on Association Between CORESET (Multiple TCI States) and TRP For single DCI multi-TRP operation, if the CORESET is configured with multiple activated TCI states, then the TCI state of the CORESET is associated with one TRP. The TCI state may be associated with one TRP, for example, via TRP ID (e.g., the logical or physical cell ID). Alternatively, the CORESET pool may be defined, one CORESET pool represent one TRP, and the association may be defined between the TCI state and the CORESET pool. A parameter associatedTRP-TCI may be introduced into TCI-State. Alternatively, the association between the TCI state and TRP may be configured/updated via a MAC-CE. In another alternative, the order of the TCI states of one CORESET may implicitly indicate the association between the TCI state and the TRP. For example, if one CORESET is configured with two active TCI states, then the first TCI state is associated with the first TRP, and the second TCI state is associated with the second TRP.

The CORESET may be configured with or without CORESET pool index. In this case, if enableMultipleDefaultBeam-SRS is enabled, and neither the spatial relation nor the pathloss reference signal is configured for SRS operation, the default spatial relations/pathloss reference signals for SRS operation may be applied and determined as below:

Alt 1: the multiple default SRS spatial relations/pathloss reference signals independently follow one TCI/QCL assumption of one CORESET: the first default spatial relation/pathloss reference signal of the SRS may follow the TCI state/QCL assumption, which is associated with the first TRP, of the lowest indexed CORESET among those CORESETs that has at least one TCI state associated with the first TRP, in the latest slot in which one or more such CORESETs are monitored by the UE. The second default spatial relation/pathloss reference signal of SRS may follow the TCI state/QCL assumption, which is associated with the second TRP, of the lowest indexed CORESET among those CORESETs that has at least one TCI state associated with the second TRP, in the latest slot in which one or more CORESETs associated with the second TRP are monitored by the UE.

Alt 2: the multiple default SRS spatial relations/pathloss reference signals sequentially follow the TCIs/QCL assumptions of one CORESET: the default spatial relations/pathloss reference signals of the SRS sequentially may follow the TCI states/QCL assumptions of the lowest indexed CORESET among those CORESETs that are configured with multiple activated states associated with the different TRPs, in the latest slot in which one or more such CORESETs are monitored by the UE.

Alt 3: the multiple default SRS spatial relations/pathloss reference signals sequentially follow the TCIs/QCL assumptions of the scheduling CORESET: the default spatial relations/pathloss reference signals of the SRS sequentially follow the TCI states/QCL assumptions of the scheduling CORESET, if the scheduling CORESET is configured with multiple active TCI states.

Figure 34:
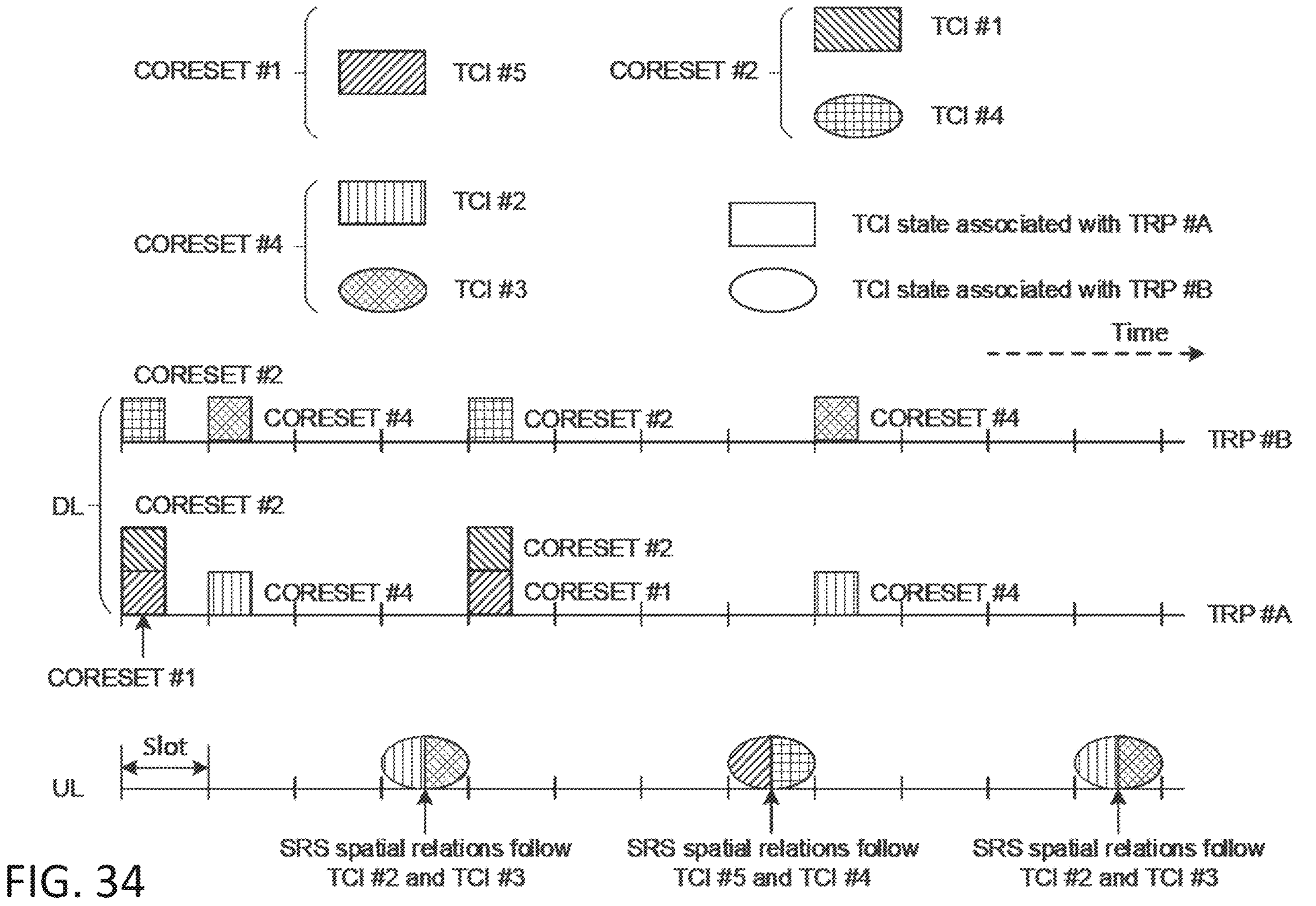
FIG. 34 illustrates an example of an SRS with multiple spatial relations determined according to association between CORESET TCI and TRP in accordance with some embodiments.
Figure 35:
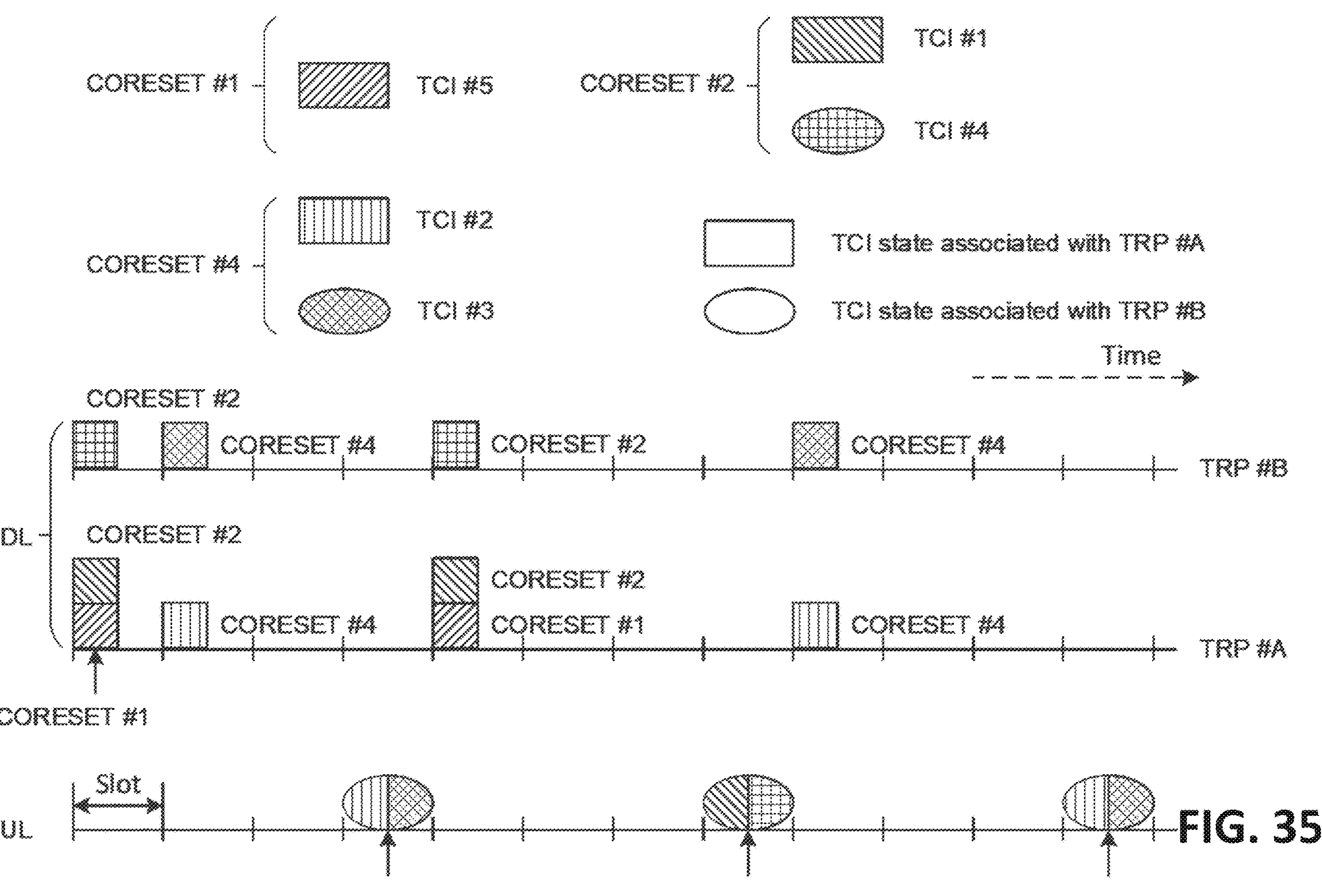
FIG. 35 illustrates another example of an SRS with multiple spatial relations determined according to association between CORESET TCI and TRP in accordance with some embodiments.

For Alt. 2/Alt. 3, the SRS may be configured with association with the TRP or without association with the TRP. The TCI states of the CORESET may be configured with association with the TRP or without association with the TRP. The association includes explicit association or implicit association. FIG. 34 illustrates an example of an SRS with multiple spatial relations determined according to association between CORESET TCI and TRP in accordance with some embodiments. FIG. 35 illustrates another example of an SRS with multiple spatial relations determined according to association between CORESET TCI and TRP in accordance with some embodiments. In particular, FIG. 34 illustrates the Alt 1 operation above while FIG. 35 illustrates the Alt 2 operation.

3.3 Spatial Relations Determined Based on Association Between TCI State and TRP

For single DCI multi-TRP operation, if at least one TCI code point indicates multiple TCI states, the default spatial relations/pathloss reference signals for the SRS may be determined as below:

Alt 1: the multiple default SRS spatial relations/pathloss reference signals dynamically follow the indicated TCI states of PDSCH: the default spatial relations/pathloss reference signals of the SRS sequentially follow the indicated TCI states/QCL assumption for PDSCH reception in the latest slot in which the PDSCH is received with multiple TCI states indicated by one TCI codepoint.

Alt 2: the multiple default SRS spatial relations/pathloss reference signals semi-statically follow the multiple TCI states indicated by one TCI state codepoint: the default spatial relations/pathloss reference signals of the SRS sequentially follow the TCI states corresponding to the lowest codepoint among the TCI codepoints containing multiple TCI states that are activated for the PDSCH.

Alt 3: the multiple default SRS spatial relations/pathloss reference signals are semi-statically and independently derived: if the TCI states are configured with explicit association with the TRP, then the first default spatial relations/pathloss reference signals of the SRS may follow the TCI state with the lowest TCI state ID among those TCI states associated with the first TRP; the second default spatial relations/pathloss reference signals of the SRS may follow the TCI state with the lowest TCI state ID among those TCI states associated with the second TRP.

Figure 36:
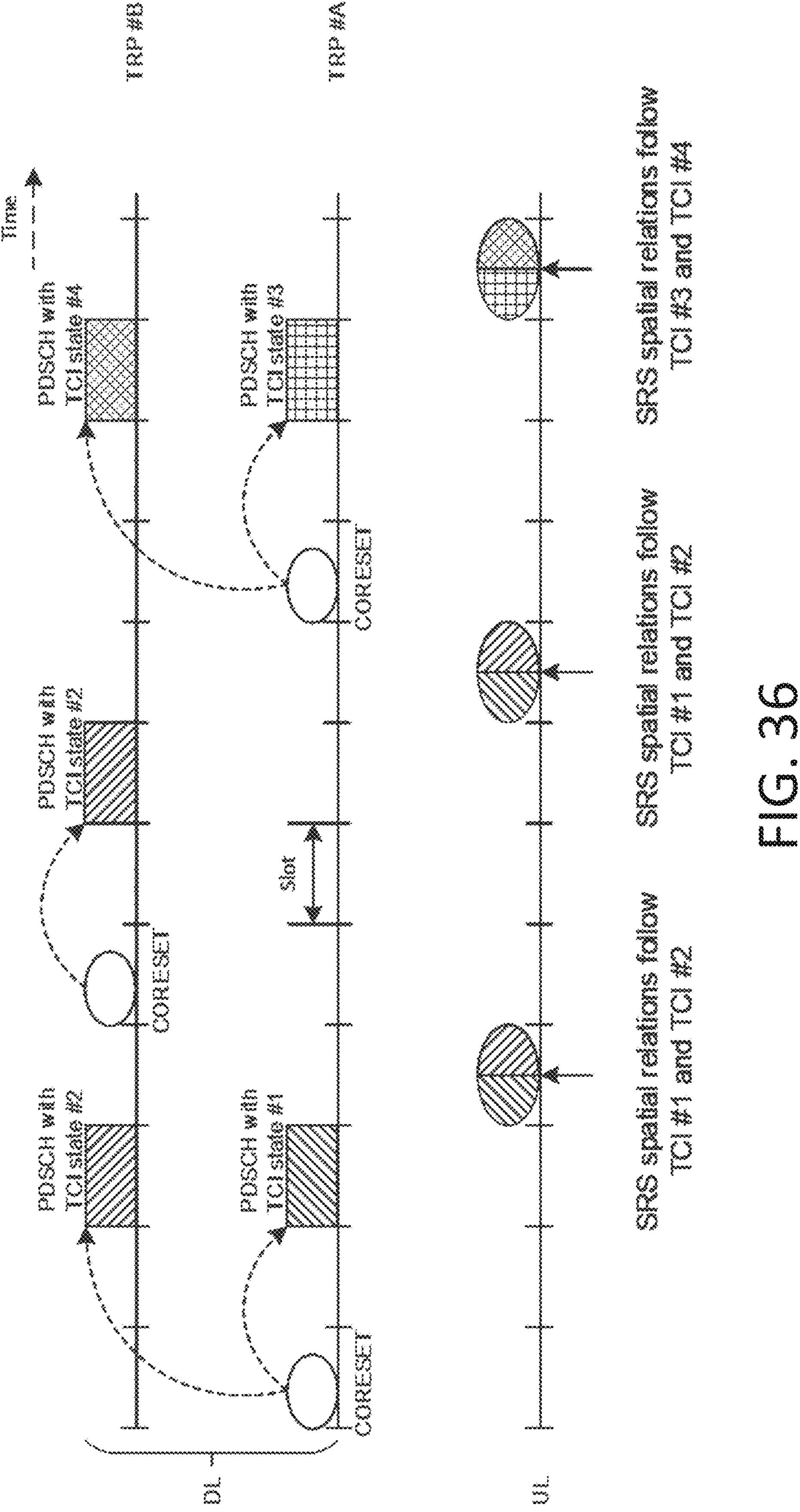
FIG. 36 illustrates an example of an SRS with multiple spatial relations determined according to association between TCI and TRP in accordance with some embodiments.
Figure 37:
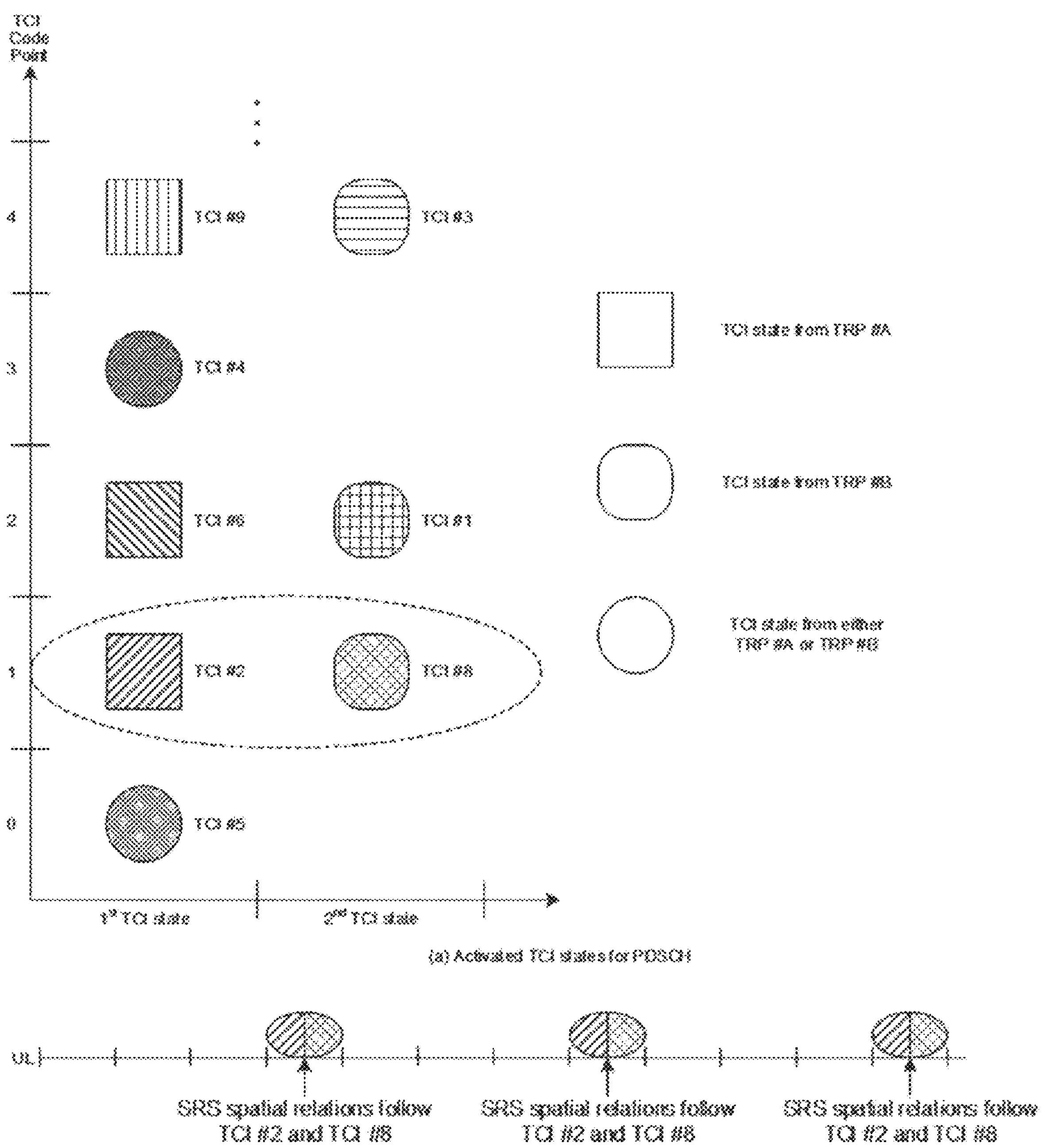
FIG. 37 illustrates another example of an SRS with multiple spatial relations determined according to association between TCI and TRP in accordance with some embodiments.

In this embodiment, the SRS may be configured with association with the TRP or without association with the TRP. The TCI states may be configured with association with the TRP or without association with the TRP. The association includes explicit association or implicit association. FIG. 36 illustrates an example of an SRS with multiple spatial relations determined according to association between TCI and TRP in accordance with some embodiments. FIG. 37 illustrates another example of an SRS with multiple spatial relations determined according to association between TCI and TRP in accordance with some embodiments. In particular, FIG. 36 illustrates the Alt 1 operation above while FIG. 37 illustrates the Alt 2 operation.

The methods in Section 2 and Section 3 may be used jointly. For example, in the system if some SRS resources are associated with only one spatial relation, and some SRS resources are associated with multiple spatial relations, then a method from Section 2 may be used to derive the default spatial relation for those SRS with one spatial relation while a method from Section 3 may be used to derive the default spatial relations for those SRS with multiple spatial relations.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus of a transmission-reception point (TRP), the apparatus comprising:

processing circuitry configured to:

determine that a single Downlink Control Information (DCI) is to be used for multi-TRP operation, for a plurality of TRPs that includes the TRP, with a user equipment (UE);

indicate, to the UE, a number of spatial relations used for a physical uplink control channel (PUCCH) transmission from the UE;

indicate, to the UE, a spatial relation between transmission of the PUCCH and reception of a control resource set (CORESET), the spatial relation dependent on a number of spatial relations used, the spatial relation based on an association that is dependent on which of a single spatial relation is used or multiple spatial relations are used, the association selected from a default association, an explicit association, and an implicit association between TRP and at least one of the CORESET or a Transmission Configuration Indication (TCI) state; and receive the PUCCH from the UE based on the spatial relation; and a memory configured to store the spatial relation.

2. The apparatus of claim 1, wherein for the single spatial relation, the processing circuitry is configured to indicate the default association by a radio resource control (RRC) parameter enableDefaultBeamPlForPUCCH.

3. The apparatus of claim 1, wherein for the single spatial relation, the processing circuitry is configured to indicate the spatial relation at one of a PUCCH resource set level, a PUCCH resource group level, or a PUCCH resource level by at least one of:

a radio resource control (RRC) parameter associatedTRP-PUCCH, a medium access control (MAC) control element (MAC-CE), a new RRC parameter associatedTRP-PUCCH in the single DCI, or implicit representation by a PUCCH resource group identification (ID) or PUCCH resource set ID.

4. The apparatus of claim 1, wherein for the single spatial relation, the processing circuitry is configured to, in response to a determination that default beam operation is enabled for PUCCH, avoid configuring the UE with spatial relations and pathloss reference signals for the PUCCH.

5. The apparatus of claim 1, wherein:

for the single spatial relation, each of a plurality of CORESETs is associated with a different TRP of the plurality of TRPs, a CORESET pool is defined for the single DCI multi-TRP operation, an association between each CORESET and TRP is defined by a radio resource control (RRC) parameter singleDCI-CORESETPoolIndex, and the PUCCH is associated with a particular CORESET pool via a RRC parameter associatedTRP-PUCCH, and a default spatial relation follows one of:

a TCI state assumption of a lowest indexed CORESET among CORESETs whose configured singleDCI-CORESETPoolIndex is the same as a CORESET pool associated with the PUCCH in a latest slot in which one or more CORESETs whose configured singleDCICORESETPoolIndex is the same as the CORESET pool associated with the PUCCH are to be monitored by the UE, or a TCI state of a scheduling CORESET.

6. The apparatus of claim 1, wherein for the single spatial relation, one of:

the CORESET is configured with multiple TCI states, each of the TCI states is associated with a particular TRP via a TRP identifier or each CORESET pool of a plurality of CORESET pools represents one of the TRPs, and the explicit association is between each TCI state and a corresponding CORESET pool, and the processing circuitry is configured to provide the association in a radio resource control (RRC) parameter associatedTRP-TCI in a TCI State or via a medium access control (MAC) control element (MAC-CE), or an order of the TCI states of the CORESET indicates an association between the TCI state and the particular TRP.

7. The apparatus of claim 1, wherein for the single spatial relation:

the processing circuitry is configured to indicate to the UE that the PUCCH is to follow a TCI state of a particular TRP of a CORESET having a lowest index in a latest slot in which one or more CORESETs are monitored by the UE or a TCI state with a lowest TCI state identifier (ID) among TCI states of the one or more CORESETs, association of the TCI state with the particular TRP is indicated via a radio resource control (RRC) parameter associatedTRP-TCI or via an order of the TCI state, and the TRP associated with PUCCH is indicated by a RRC parameter associatedTRP-PUCCH or a CORESET pool associated of a scheduling CORESET is the same as the scheduling CORESET if the PUCCH is indicated by the single DCI.

8. The apparatus of claim 1, wherein for the single spatial relation:

at least one TCI codepoint includes multiple TCI states, and an order of the TCI states implicitly indicates the association between the TRP and the TCI state.

9. The apparatus of claim 1, wherein:

for a default spatial relation of the single spatial relation to dynamically follow a particular TCI state, the processing circuitry is configured to indicate to the UE that the PUCCH is to follow the particular TCI state, among a plurality of TCI states, for physical downlink shared channel (PDSCH) reception in a latest slot in which PDSCH reception is to be performed by the UE, the particular TCI state indicated by a radio resource control (RRC) parameter associatedTRP-PUCCH or by the single DCI, or for the single spatial relation to semi-statically follow another particular TCI state indicated by a TCI state codepoint, the processing circuitry is configured to indicate to the UE that the PUCCH is to follow one of a set of TCI states corresponding to a lowest TCI codepoint among TCI codepoints containing multiple TCI states the particular TCI state as indicated by the RRC parameter associatedTRP-PUCCH or by the single DCI.

10. The apparatus of claim 1, wherein:

for a TCI association, one of:

each TCI state is associated with a different TRP via a TRP identification (ID), or each CORESET pool, of a plurality of CORESET pools, represents a different TRP, and each TCI state is associated with a different CORESET pool, and the processing circuitry is configured to indicate the TCI association to the UE in one of:

a radio resource control (RRC) parameter associatedTRP-TCI, a medium access control (MAC) control element (MAC-CE) to indicate the association between TCI state and TRP, or implicit representation by an order of the TCI states to indicate the association between the TCI state and TRP if one TCI codepoint indicates multiple TCI states.

11. The apparatus of claim 1, wherein:

for the single spatial relation to dynamically follow a particular TCI state, the processing circuitry is configured to indicate to the UE that the PUCCH is to follow the particular TCI state, among a plurality of TCI states, for physical downlink shared channel (PDSCH) reception in a latest slot in which PDSCH reception is to be performed by the UE, the particular TCI state indicated by a radio resource control (RRC) parameter associatedTRP-TCI that has a same value as an RRC parameter associatedTRP-PUCCH or by the single DCI, or for the single spatial relation to semi-statically follow another particular TCI state indicated by a TCI state codepoint, the processing circuitry is configured to indicate to the UE that the PUCCH is to follow one of a set of TCI states corresponding to a lowest TCI state identification (ID) among the TCI states whose RRC parameter associatedTRP-TCI has the same value as the RRC parameter associatedTRP-PUCCH or another TCI state indicated by a lowest TCI codepoint among TCI codepoints containing multiple TCI states whose RRC parameter associatedTRP-TCI has the same value as the RRC parameter associatedTRP-PUCCH.

12. The apparatus of claim 1, wherein at least one of:

the processing circuitry is configured to indicate to the UE that a PUCCH resource is configured with multiple spatial relations via a radio resource control (RRC) parameter enableMultipleDefaultBeam-PUCCH that, if enabled indicates spatial relations and pathloss reference signals are not configured for the PUCCH, or each CORESET, of a plurality of CORESETs, is associated a different TRP, and the processing circuitry is configured to indicate to the UE an association between the CORESETs and TRPs via a radio resource control (RRC) parameter singleDCI-CORESETPoolIndex.

13. The apparatus of claim 1, wherein for the single spatial relation, the processing circuitry is configured to indicate to the UE that the PUCCH is to follow a TCI state of a CORESET having a lowest index, among CORESETs associated with a particular TRP, in a latest slot in which one or more of the CORESETs associated with the particular TRP are monitored by the UE.

14. The apparatus of claim 1, wherein for the single spatial relation, one of:

the CORESET is configured with multiple TCI states, each of the TCI states is associated with a particular TRP via a TRP identifier or each CORESET pool of a plurality of CORESET pools represents one of the TRPs, and the explicit association is between each TCI state and a corresponding CORESET pool, and the processing circuitry is configured to provide the association in a radio resource control (RRC) parameter associatedTRP-TCI in a TCI State or via a medium access control (MAC) control element (MAC-CE), or an order of the TCI states of the CORESET indicates an association between the TCI state and the particular TRP.

15. The apparatus of claim 1, wherein for a default spatial relation, of the single spatial relation one of:

a first default spatial relation follows a first TCI state associated with a first TRP, of a lowest indexed CORESET among first CORESETs that have at least one TCI state associated with the first TRP, in a latest slot in which one or more first CORESETs are monitored by the UE, and a second default spatial relation follows a second TCI state associated with a second TRP, of a lowest indexed CORESET among second CORESETs that have at least one TCI state associated with the second TRP, in a latest slot in which one or more second CORESETs are monitored by the UE, the default spatial relation sequentially follows a TCI state associated with a lowest indexed CORESET among third CORESETs that have multiple TCI states associated with different TRPs, in a latest slot in which one or more third CORESETs are monitored by the UE, or the default spatial relation sequentially follows TCI states of a scheduling CORESET, if the scheduling CORESET is configured with multiple active TCI states.

16. The apparatus of claim 1, wherein for the single spatial relation if at least one TCI codepoint indicates multiple TCI states, one of:

multiple default spatial relations dynamically follow TCI states of a physical downlink shared channel (PDSCH), the default spatial relations of PUCCH sequentially follow the TCI states for PDSCH reception in a latest slot in which the PDSCH is received with multiple TCI states indicated by one of the at least one TCI codepoint, the multiple default spatial relations semi-statically follow TCI states corresponding to a lowest TCI codepoint among TCI codepoints containing multiple TCI states that are activated for the PDSCH, or the multiple default spatial relations are semi-statically and independently derived, if the TCI states of the PDSCH are explicitly associated with a TRP, then first default spatial relations of the PUCCH follow a TCI state with a first lowest TCI state identifier (ID) among TCI states associated with a first TRP and second default spatial relations of the PUCCH follow a TCI state with a second lowest TCI state ID among TCI states associated with a second TRP.

17. A non-transitory computer-readable storage medium that stores instructions for execution by one or more processors of transmission-reception point (TRP), the one or more processors to configure the TRP to, when the instructions are executed:

determine that a single Downlink Control Information (DCI) is to be used for multi-TRP operation, for a plurality of TRPs that includes the TRP, with a user equipment (UE);

indicate, to the UE, a number of spatial relations used for a from the UE;

indicate, to the UE, a spatial relation between transmission of a physical uplink control channel (PUCCH) and reception of a control resource set (CORESET), the spatial relation dependent on a number of spatial relations used, the spatial relation based on an association that is dependent on which of a single spatial relation is used or multiple spatial relations are used, the association selected from a default association, an explicit association, and an implicit association between TRP and at least one of a control resource set (CORESET) or a Transmission Configuration Indication (TCI) state; and receive the PUCCH from the UE based on the spatial relation.

18. The medium of claim 17, wherein:

for the single spatial relation, each of a plurality of CORESETs is associated with a different TRP of the plurality of TRPs, a CORESET pool is defined for the single DCI multi-TRP operation, an association between each CORESET and TRP is defined by a radio resource control (RRC) parameter singleDCI-CORESETPoolIndex, and the PUCCH is associated with a particular CORESET pool via a RRC parameter associatedTRP-PUCCH, and a default spatial relation follows one of:

a TCI state assumption of a lowest indexed CORESET among CORESETs whose configured singleDCI- CORESETPoolIndex is the same as a CORESET pool associated with the PUCCH in a latest slot in which one or more CORESETs whose configured singleDCICORESETPoolIndex is the same as the CORESET pool associated with the PUCCH are to be monitored by the UE, or a TCI state of a scheduling CORESET.

19. An apparatus of a user equipment (UE), the apparatus comprising:

processing circuitry configured to:

receive, from a transmission-reception point (TRP), an indication that a single Downlink Control Information (DCI) is to be used for multi-TRP operation, for a plurality of TRPs that includes the TRP;

receive, from the TRP, an indication of a number of spatial relations used for a physical uplink control channel (PUCCH) transmission from the UE;

receive, from the TRP, an indication of a spatial relation between transmission of the PUCCH and reception of a control resource set (CORESET), the spatial relation dependent on the number of spatial relations used, the spatial relation based on an association that is dependent on whether a single spatial relation is used or multiple spatial relations are used, the association selected from a default association, an explicit association, and an implicit association between TRP and at least one of the CORESET or a Transmission Configuration Indication (TCI) state; and transmit the PUCCH to the TRP based on the indicated spatial relation; and a memory configured to store the spatial relation.

20. The apparatus of claim 19, wherein:

for the single spatial relation, each of a plurality of CORESETs is associated with a different TRP of the plurality of TRPs, a CORESET pool is defined for the single DCI multi-TRP operation, an association between each CORESET and TRP is defined by a radio resource control (RRC) parameter singleDCI-CORESETPoolIndex, and the PUCCH is associated with a particular CORESET pool via a RRC parameter associatedTRP-PUCCH, and a default spatial relation follows one of:

a TCI state assumption of a lowest indexed CORESET among CORESETs whose configured singleDCI-CORESETPoolIndex is the same as a CORESET pool associated with the PUCCH in a latest slot in which one or more CORESETs whose configured singleDCICORESETPoolIndex is the same as the CORESET pool associated with the PUCCH are to be monitored by the UE, or a TCI state of a scheduling CORESET.

* * * * *